(12) United States Patent
Narikawa et al.

(10) Patent No.: US 7,453,651 B2
(45) Date of Patent: Nov. 18, 2008

(54) ZOOM LENS AND CAMERA WITH ZOOM LENS

(75) Inventors: Tetsuro Narikawa, Hamura (JP); Etsuro Kawakami, Hamura (JP)

(73) Assignee: Casio Computer Co., Ltd., Tokyo (JP)

( * ) Notice: Subject to any disclaimer, the term of this patent is extended or adjusted under 35 U.S.C. 154(b) by 99 days.

(21) Appl. No.: 11/702,994

(22) Filed: Feb. 6, 2007

(65) Prior Publication Data
US 2007/0201142 A1 Aug. 30, 2007

(30) Foreign Application Priority Data
Feb. 28, 2006 (JP) .............................. 2006-053981
Feb. 28, 2006 (JP) .............................. 2006-053982

(51) Int. Cl.
G02B 15/14 (2006.01)
(52) U.S. Cl. ...................................... 359/689; 359/680
(58) Field of Classification Search ................. 359/680, 359/686, 689
See application file for complete search history.

(56) References Cited

FOREIGN PATENT DOCUMENTS

| JP | 2002-228922 A | 8/2002 |
|---|---|---|
| JP | 2004-004765 A | 1/2004 |
| JP | 2004-056362 A | 2/2004 |

*Primary Examiner*—Darryl J Collins
(74) *Attorney, Agent, or Firm*—Frishauf, Holtz, Goodman & Chick, P.C.

(57) ABSTRACT

There is provided a zoom lens of variable power ratio of the order of 3 in which the whole of the zoom lens is made up of three lens elements groups and the power configuration of each of the groups has an arrangement of negative, positive and negative, whereby the reduction in overall length of its optical system is enabled, so that a compact zoom lens and a camera with it can be provided.

The zoom lens comprising, sequentially from an object side thereof, a first lens elements group has a negative refraction power as a whole, a second lens elements group has a positive refraction power as a whole and the third lens element group has a negative refraction power as a whole, and a variable power is realized by shifting the positions of the first and second lens elements group in the direction of an optical axis thereof.

16 Claims, 34 Drawing Sheets

(EMBODIMENT 5)

FIG. 8
(EMBODIMENT 1: WIDE-ANGLE END)
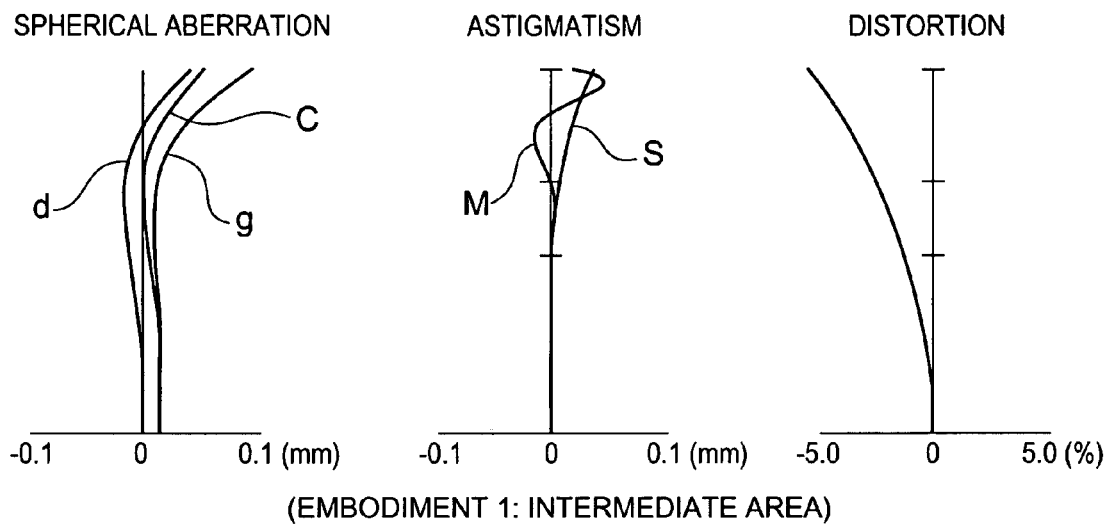
(EMBODIMENT 1: INTERMEDIATE AREA)
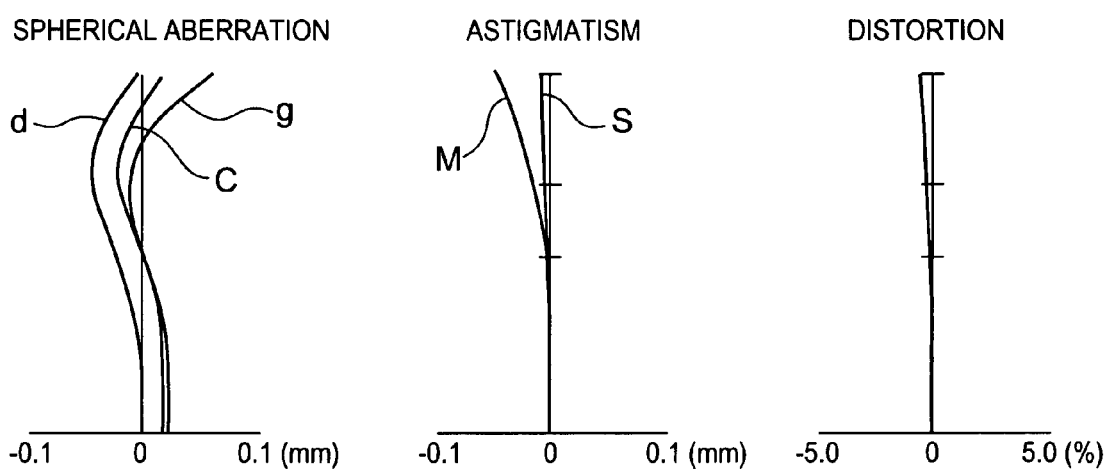
(EMBODIMENT 1: TELEPHOTO END)
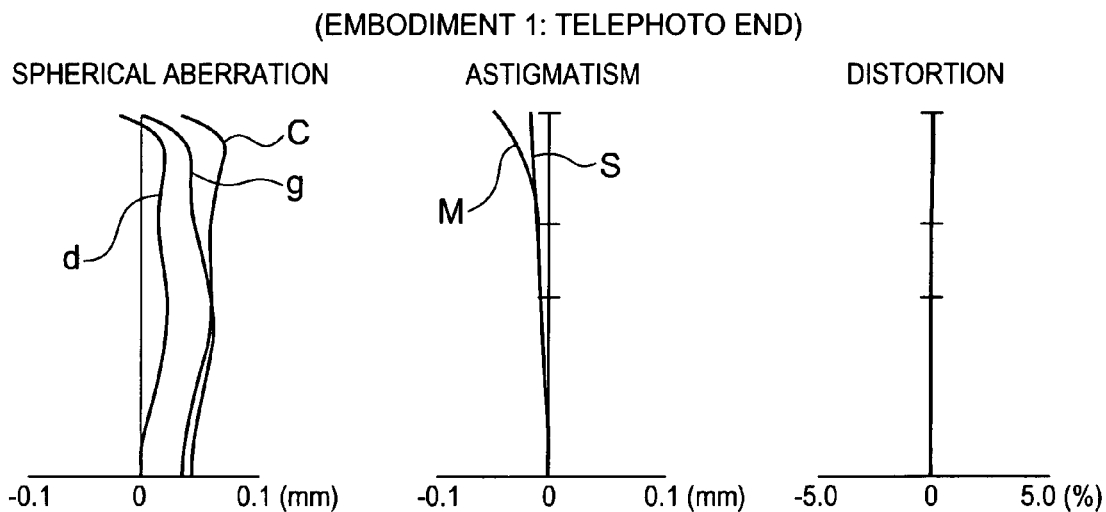

FIG. 9
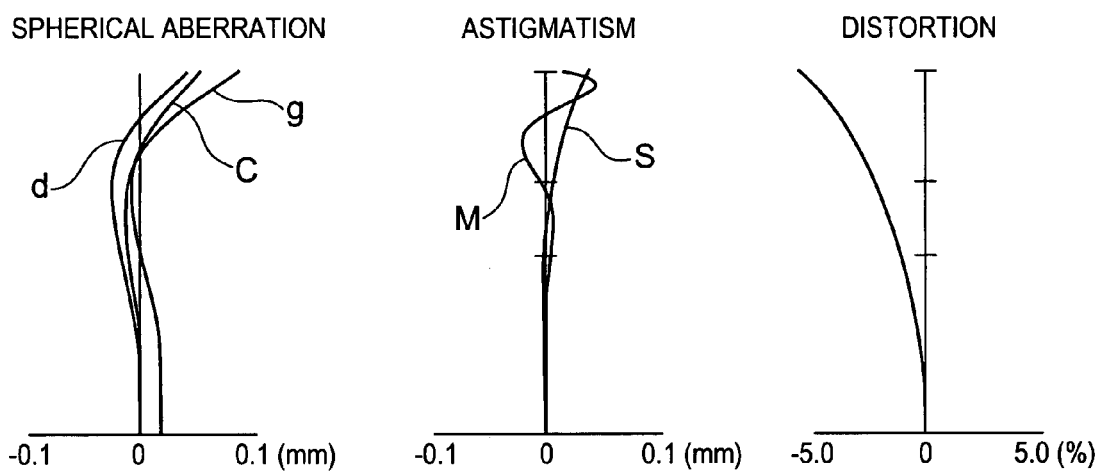
(EMBODIMENT 2: WIDE-ANGLE END)
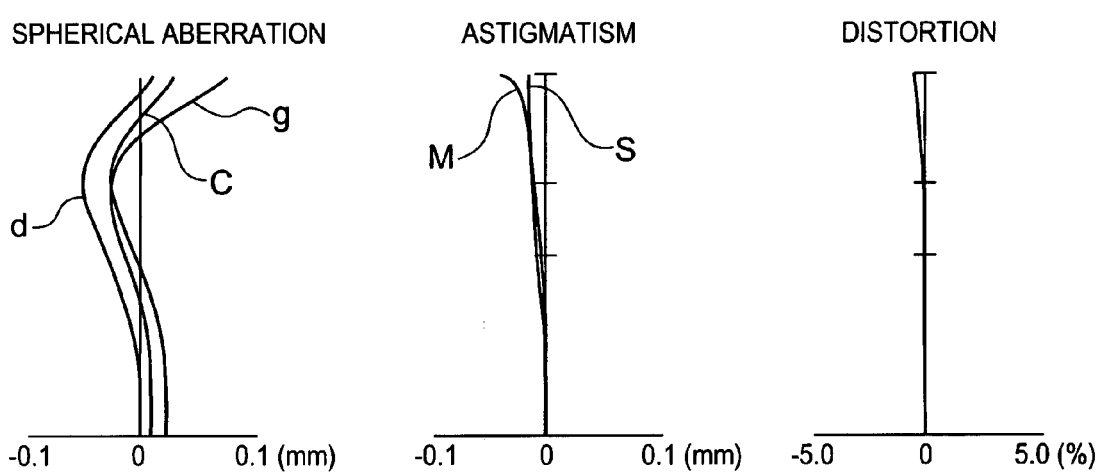
(EMBODIMENT 2: INTERMEDIATE AREA)
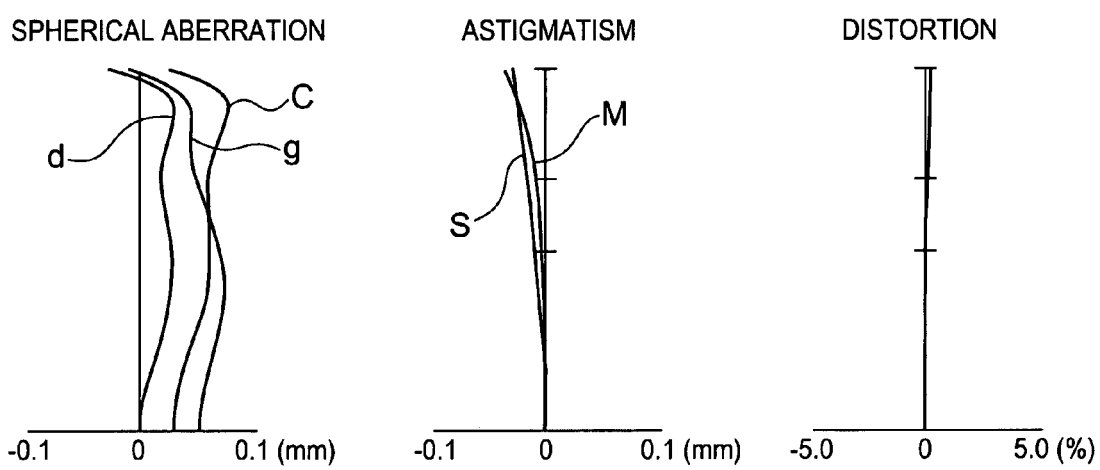
(EMBODIMENT 2: TELEPHOTO END)

FIG. 10
(EMBODIMENT 3: WIDE-ANGLE END)
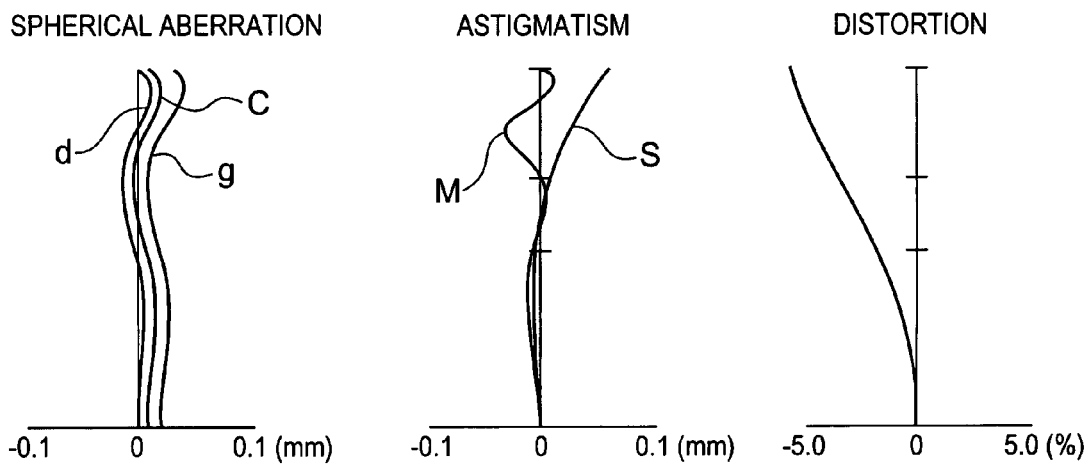
(EMBODIMENT 3: INTERMEDIATE AREA)
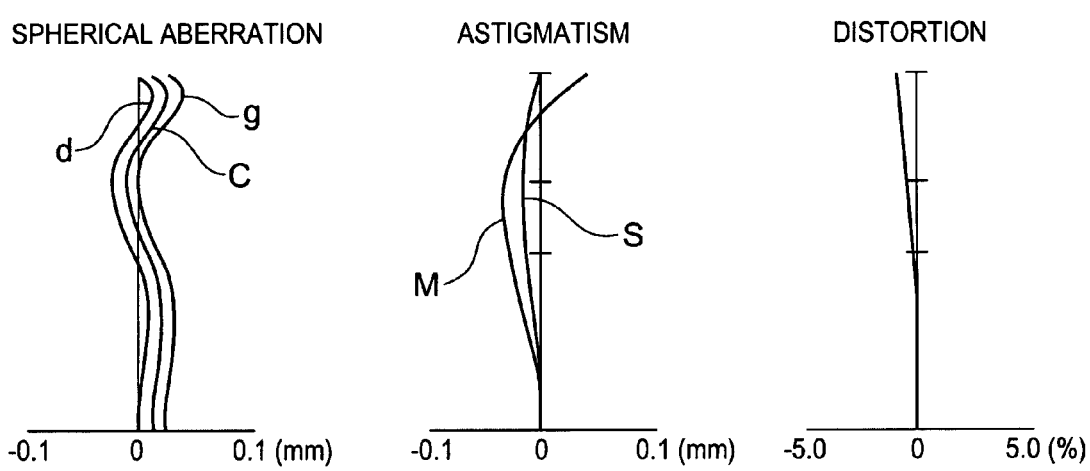
(EMBODIMENT 3: TELEPHOTO END)
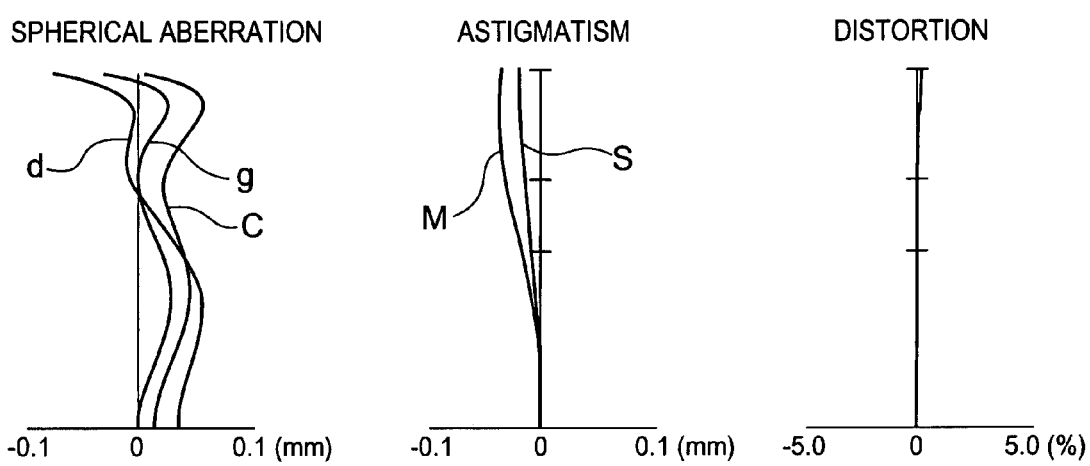

FIG. 11
(EMBODIMENT 4: WIDE-ANGLE END)
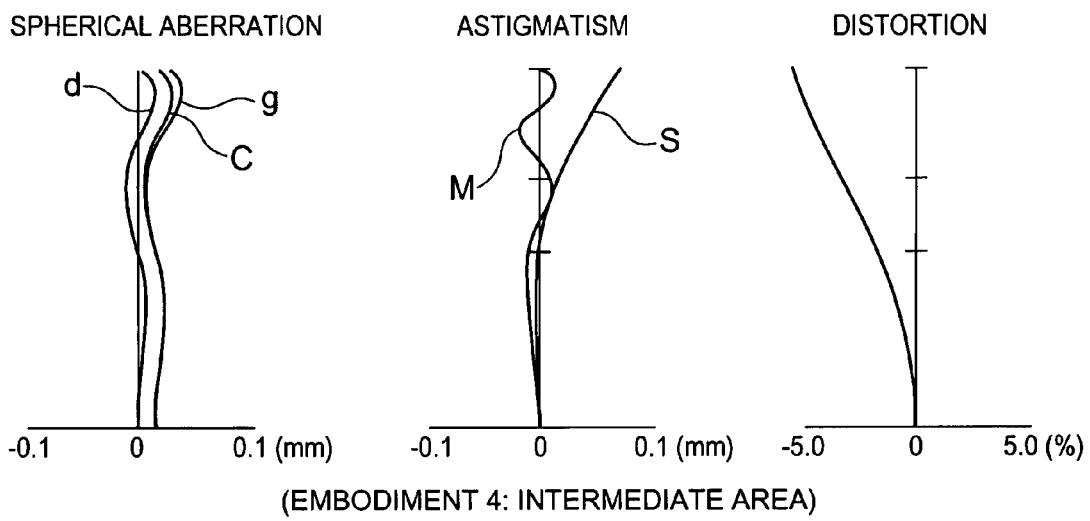
(EMBODIMENT 4: INTERMEDIATE AREA)
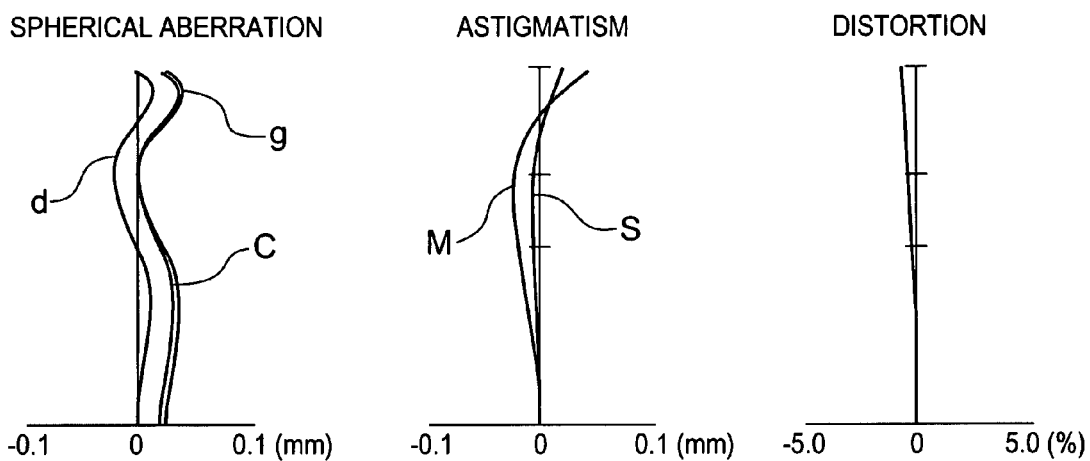
(EMBODIMENT 4: TELEPHOTO END)
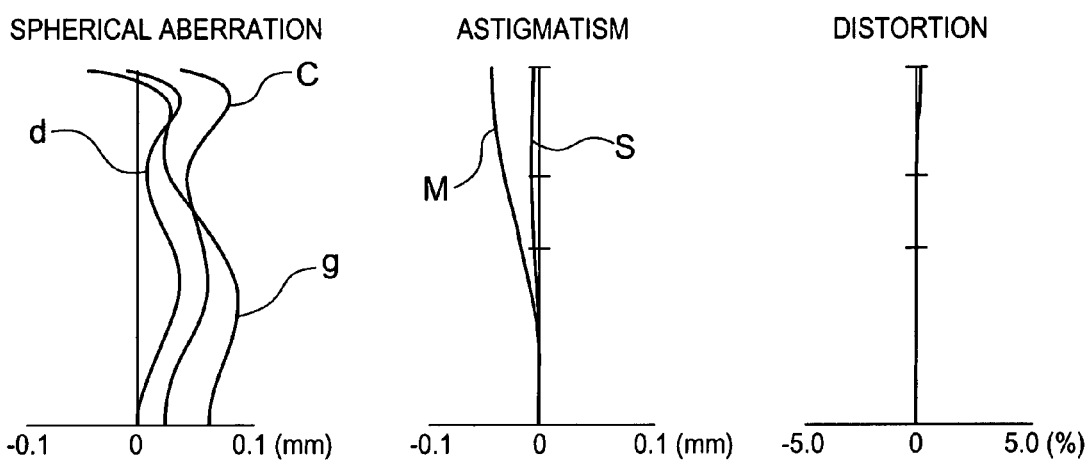

FIG. 12
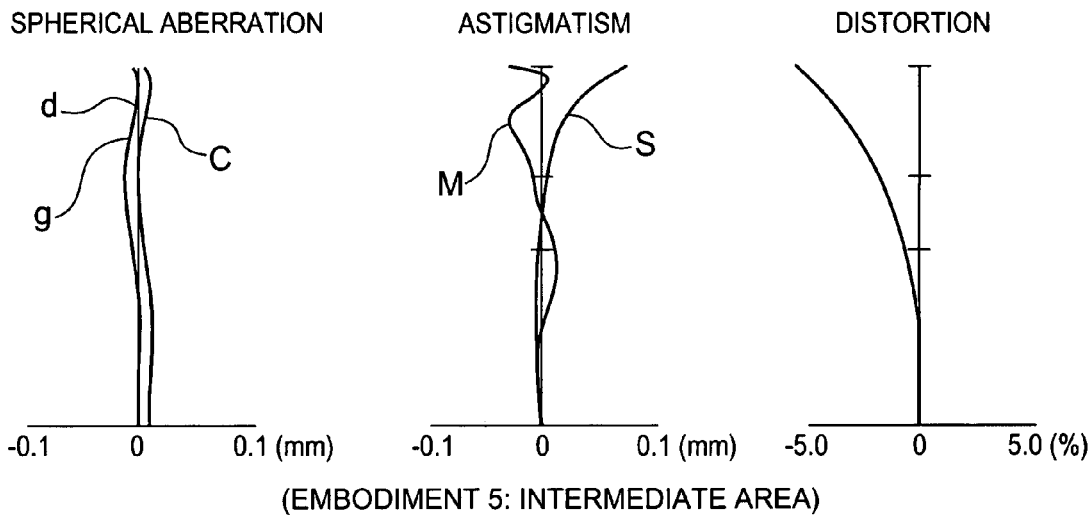
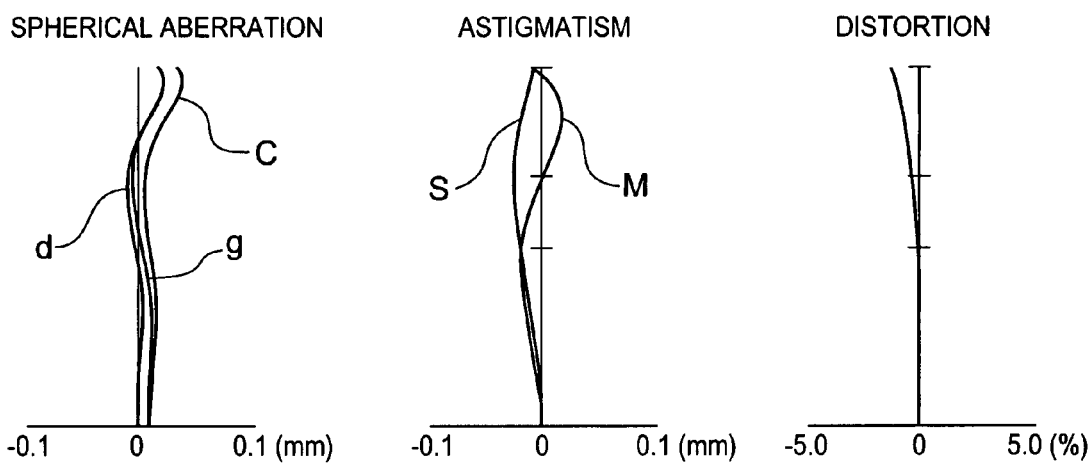
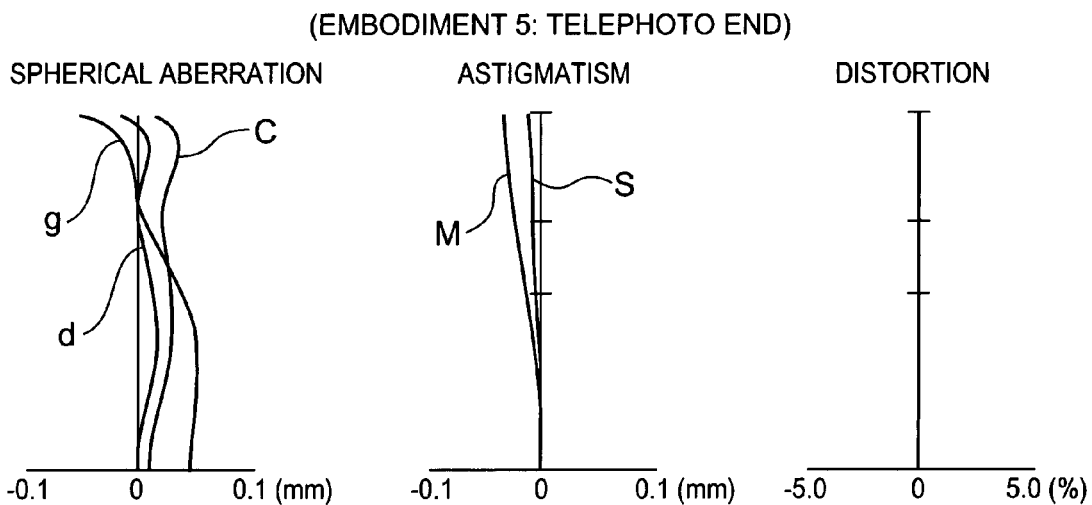

FIG. 13
(EMBODIMENT 6: WIDE-ANGLE END)
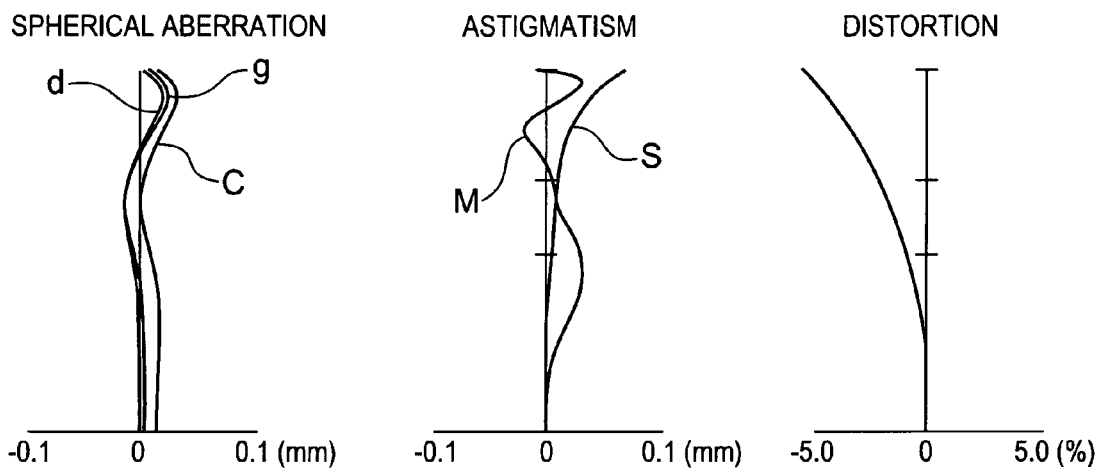
(EMBODIMENT 6: INTERMEDIATE AREA)
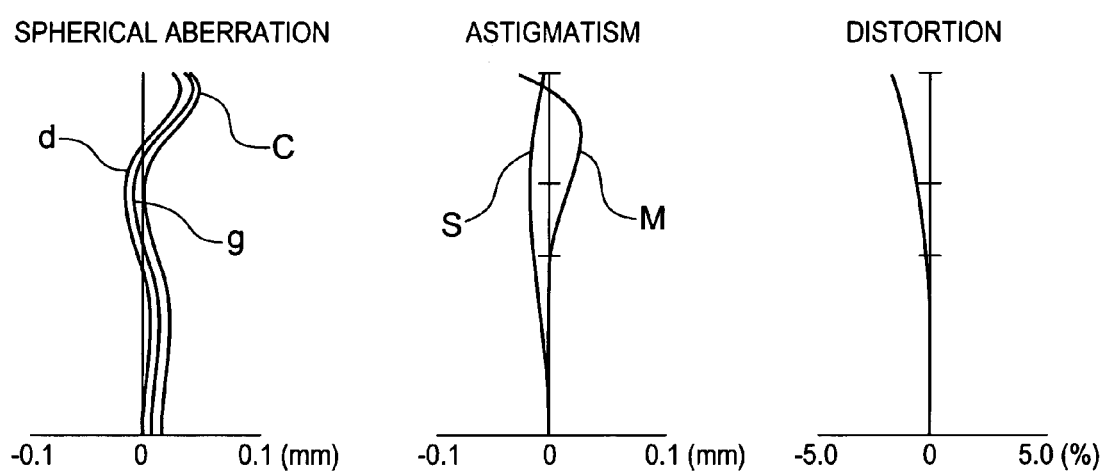
(EMBODIMENT 6: TELEPHOTO END)
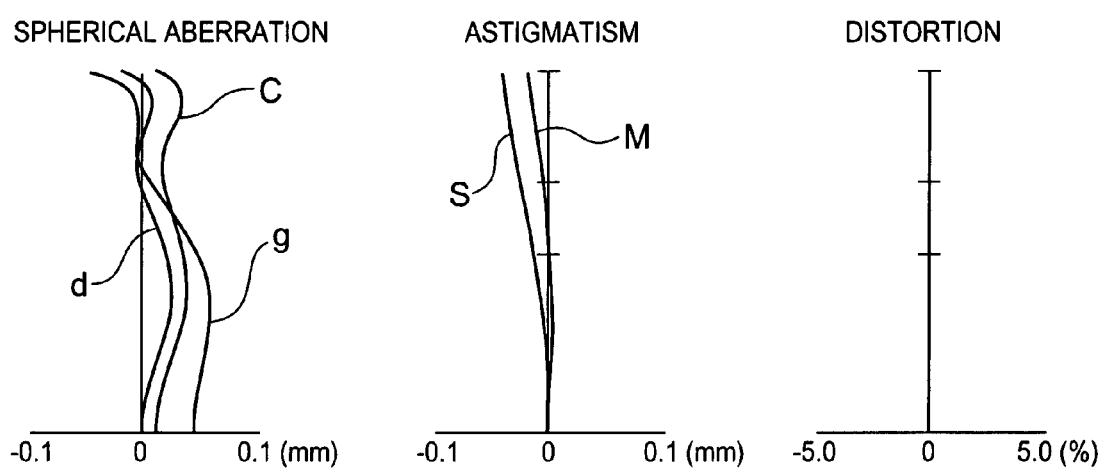

FIG. 14
(EMBODIMENT 7: WIDE-ANGLE END)
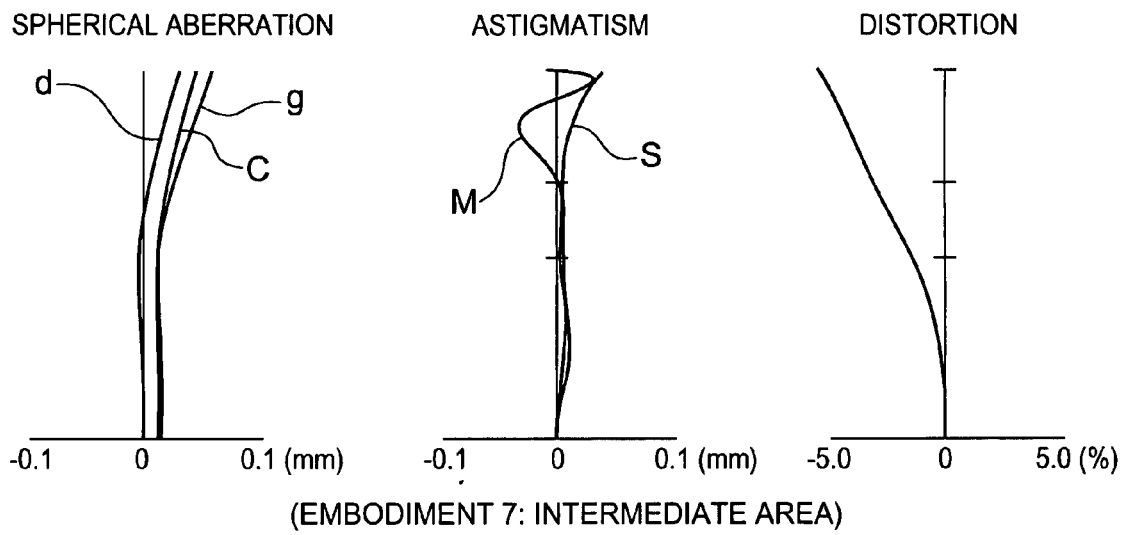
(EMBODIMENT 7: INTERMEDIATE AREA)
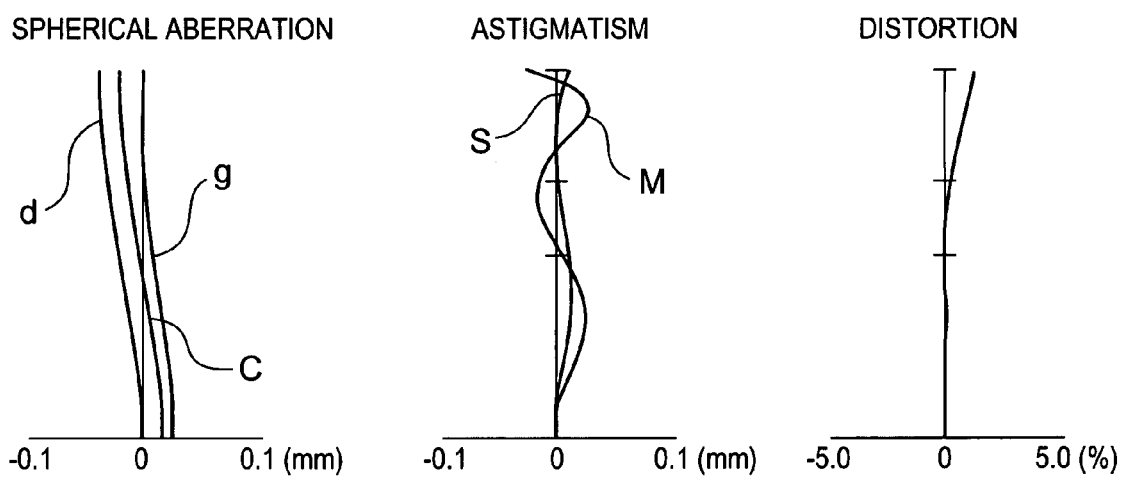
(EMBODIMENT 7: TELEPHOTO END)
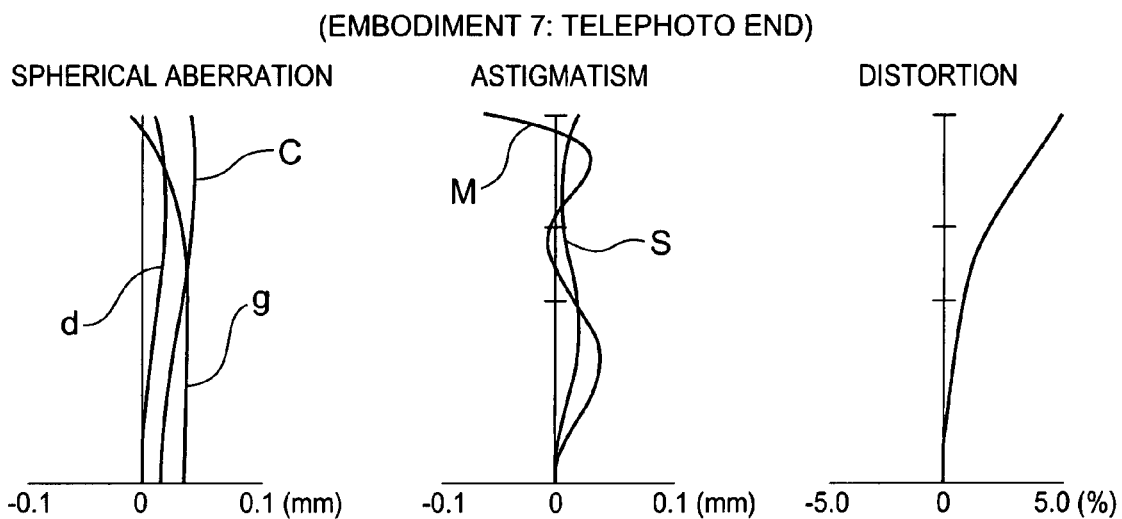

(EMBODIMENT 8)

(EMBODIMENT 9)

(EMBODIMENT 11)

(EMBODIMENT 16)

(EMBODIMENT 17)

FIG. 25
(EMBODIMENT 8: WIDE-ANGLE END)
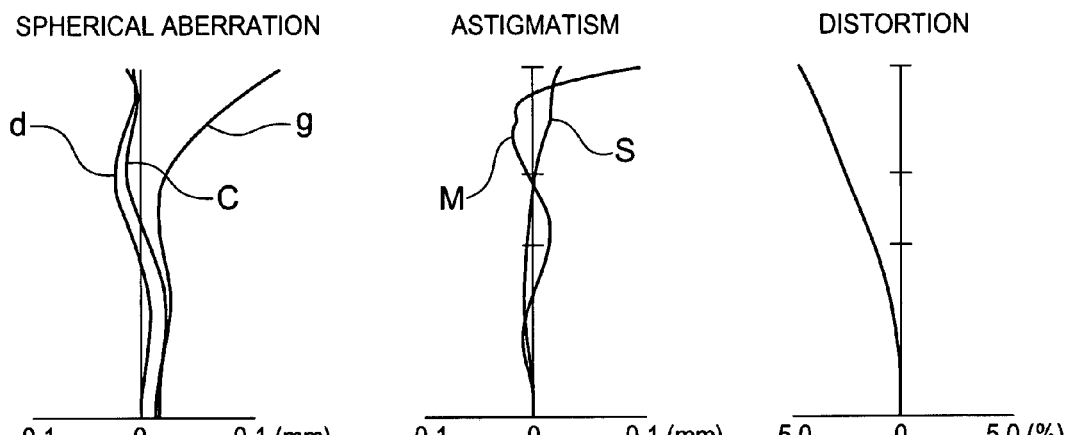
(EMBODIMENT 8: INTERMEDIATE AREA)
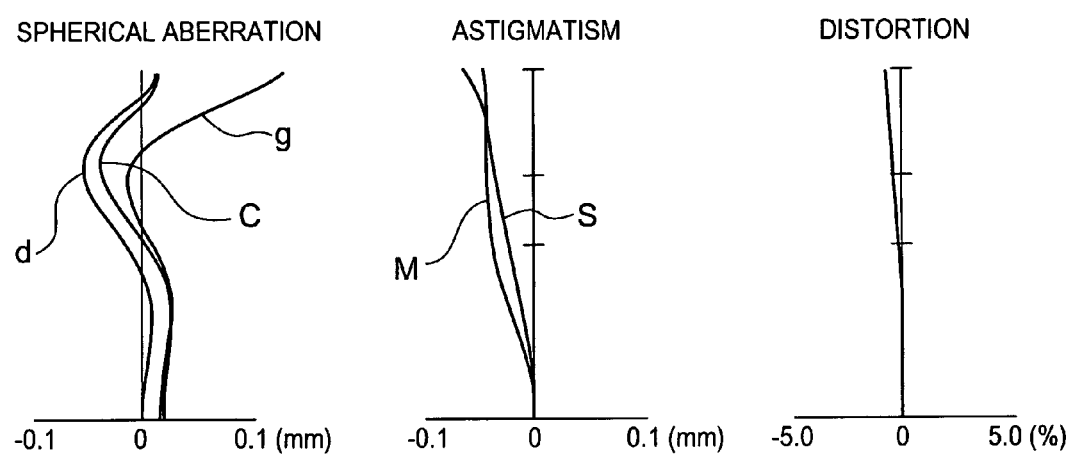
(EMBODIMENT 8: TELEPHOTO END)
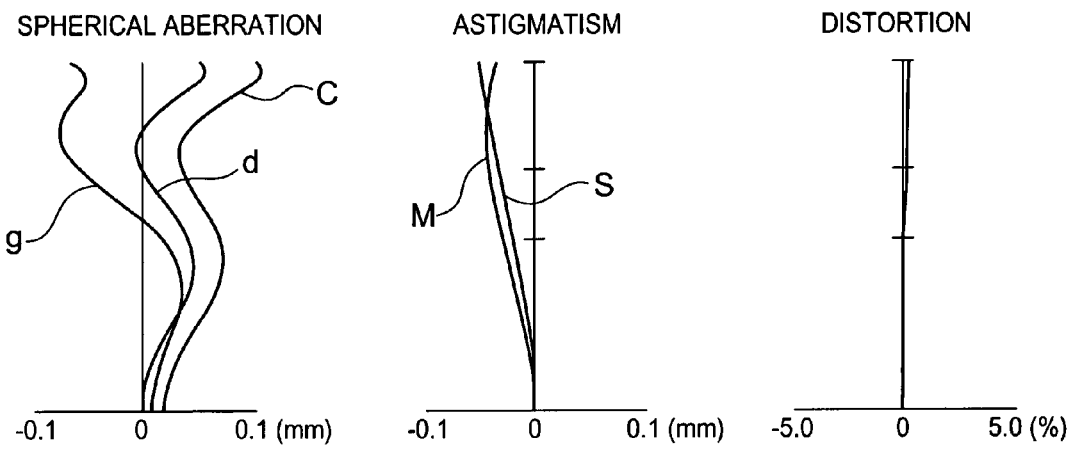

FIG. 26
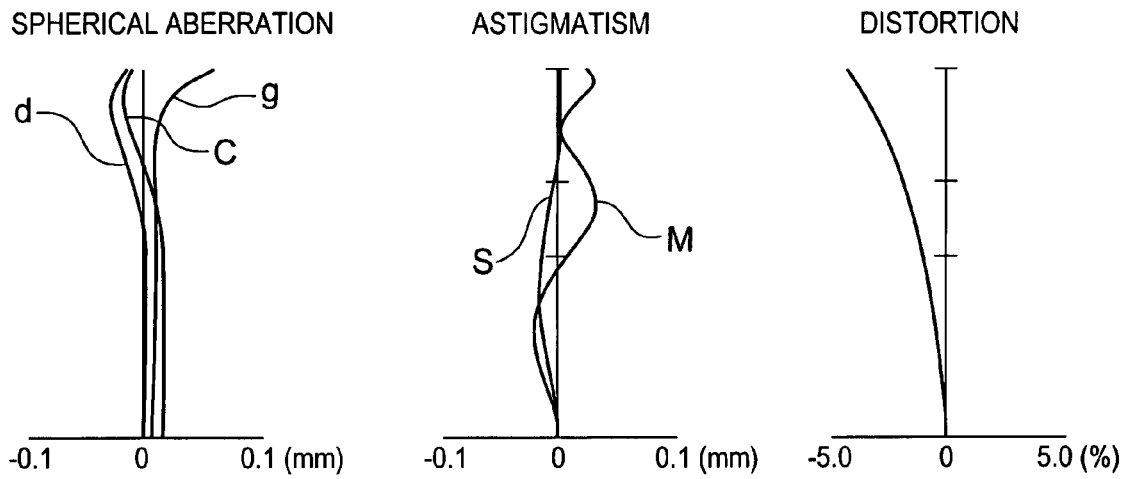
(EMBODIMENT 9: WIDE-ANGLE END)
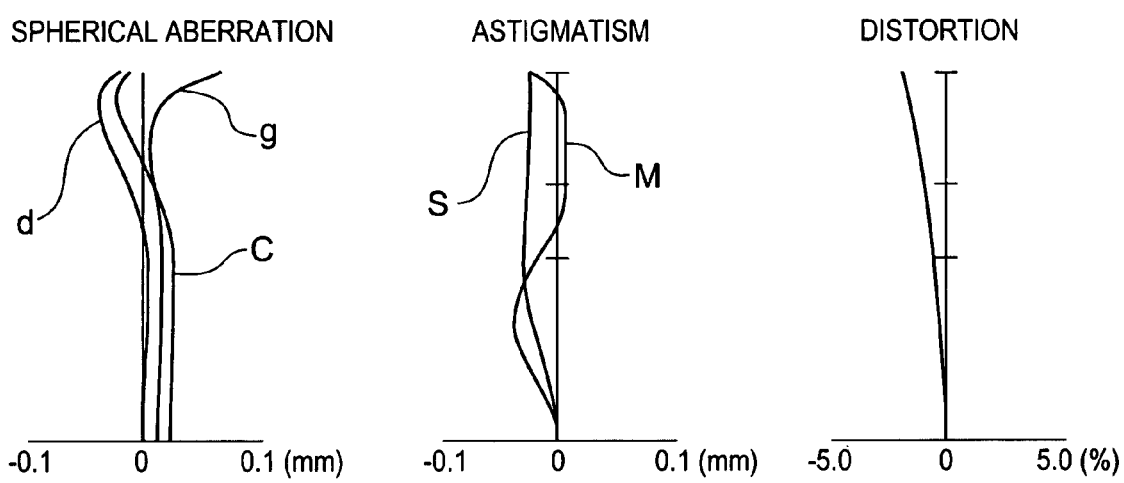
(EMBODIMENT 9: INTERMEDIATE AREA)
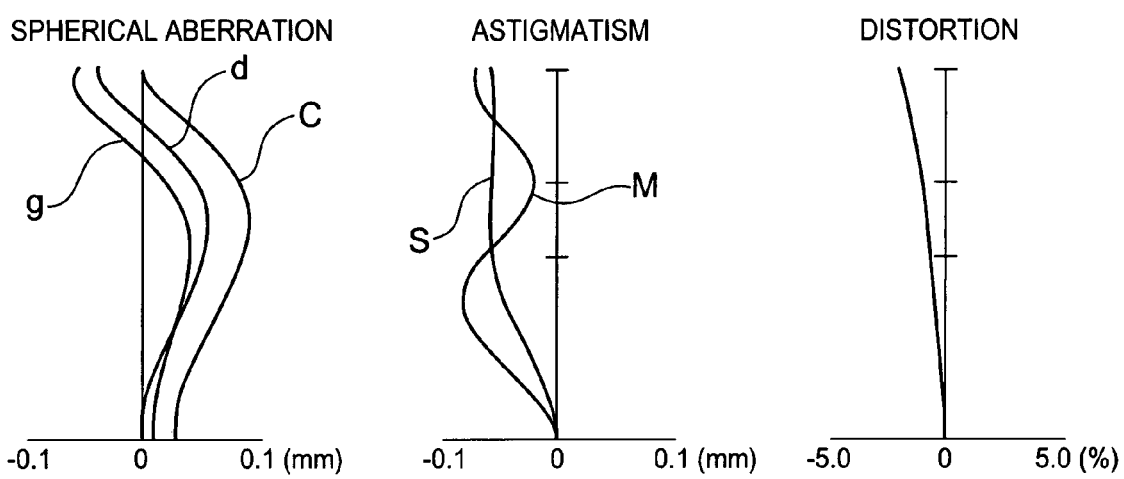
(EMBODIMENT 9: TELEPHOTO END)

FIG. 27
(EMBODIMENT 10: WIDE-ANGLE END)
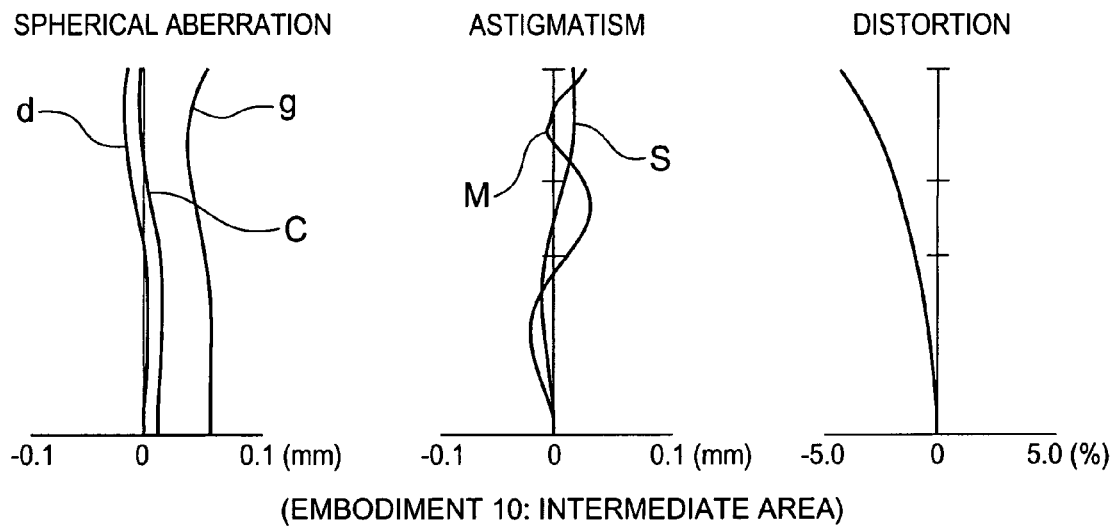
(EMBODIMENT 10: INTERMEDIATE AREA)
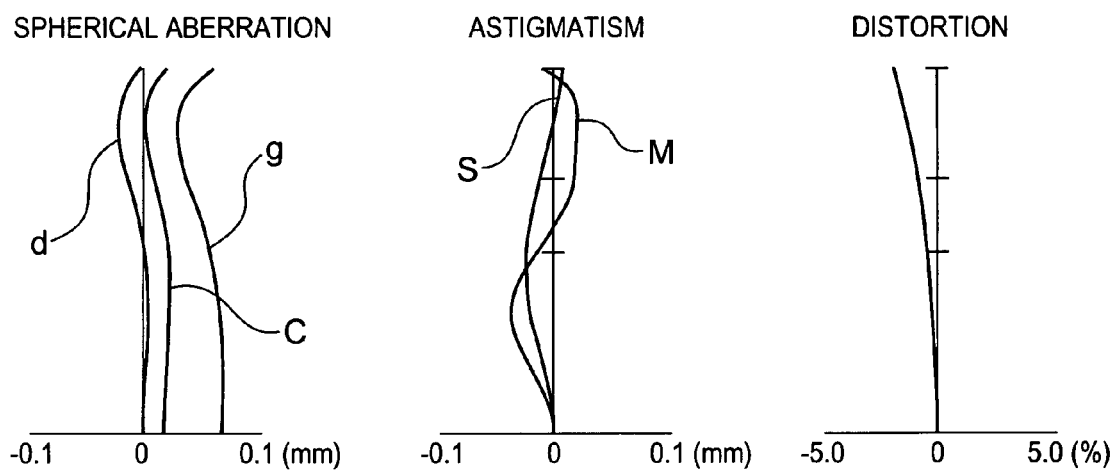
(EMBODIMENT 10: TELEPHOTO END)
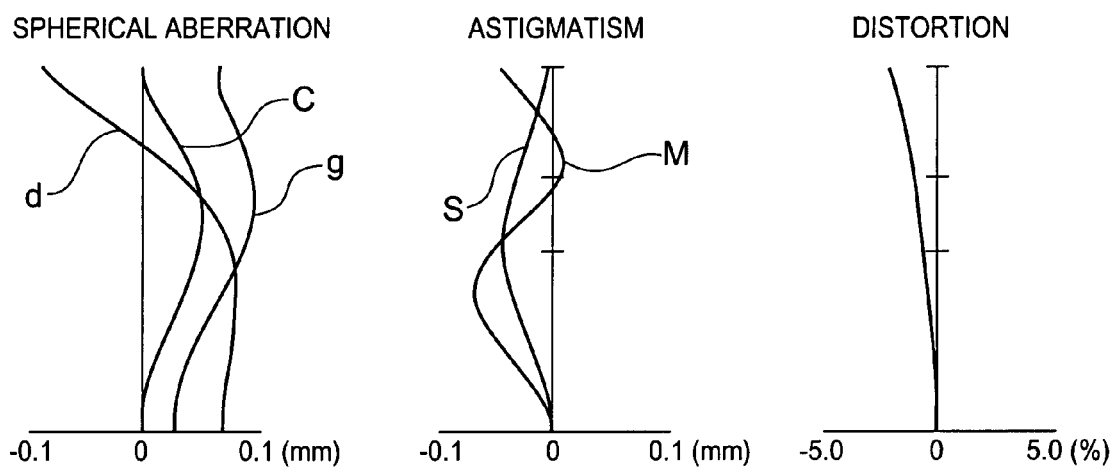

FIG. 28
(EMBODIMENT 11: WIDE-ANGLE END)
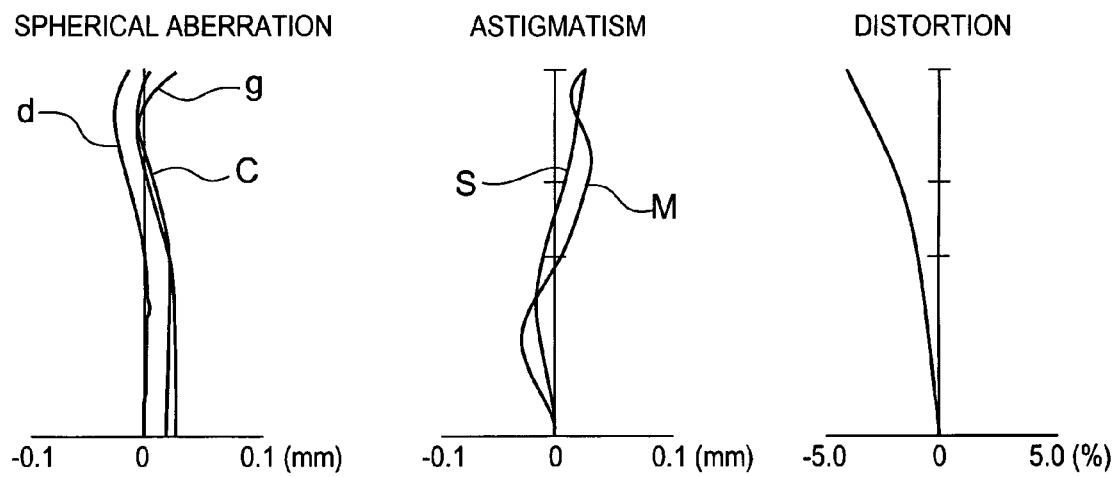
(EMBODIMENT 11: INTERMEDIATE AREA)
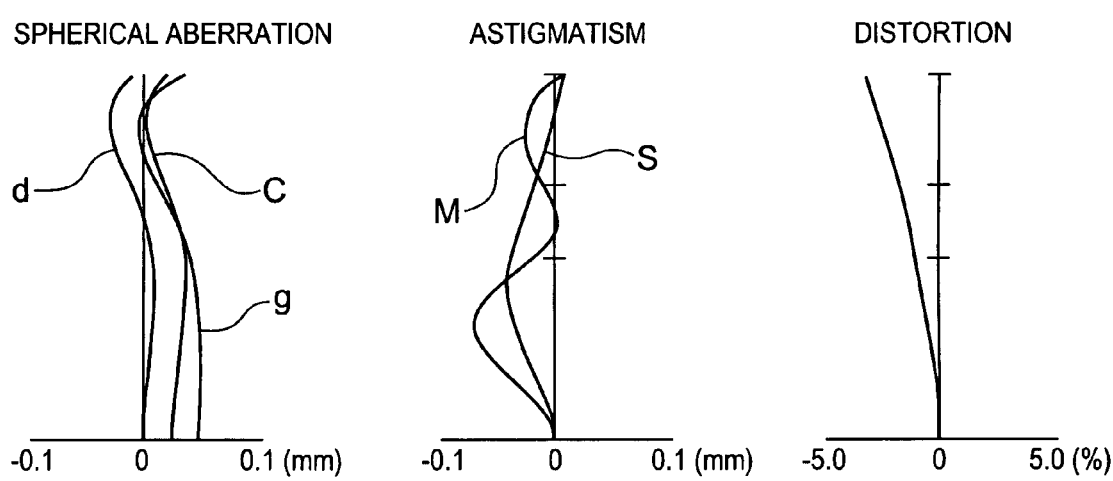
(EMBODIMENT 11: TELEPHOTO END)
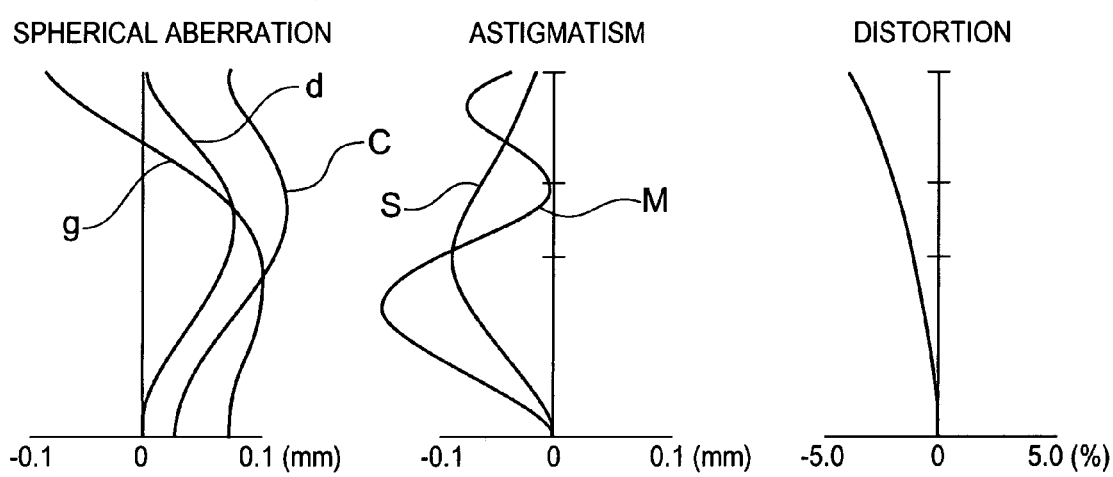

FIG. 29
(EMBODIMENT 12: WIDE-ANGLE END)
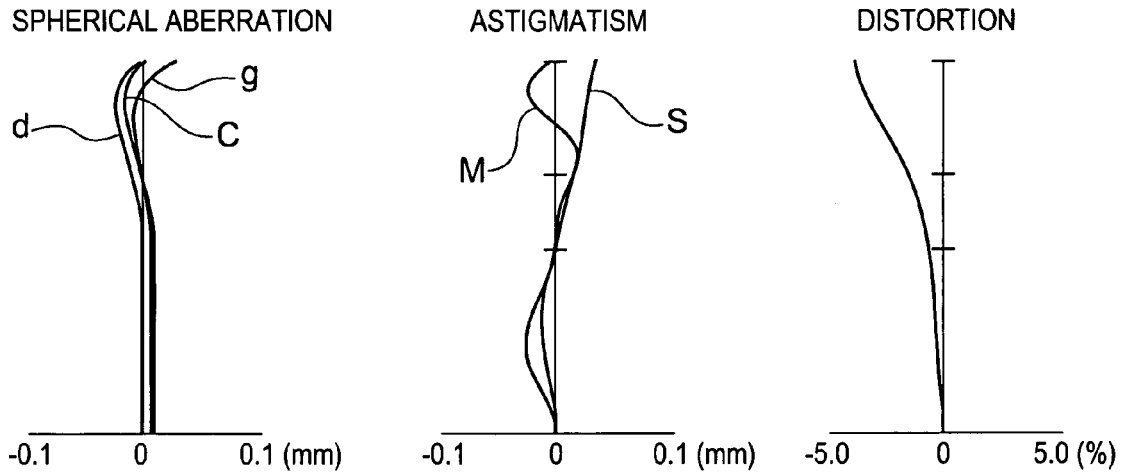
(EMBODIMENT 12: INTERMEDIATE AREA)
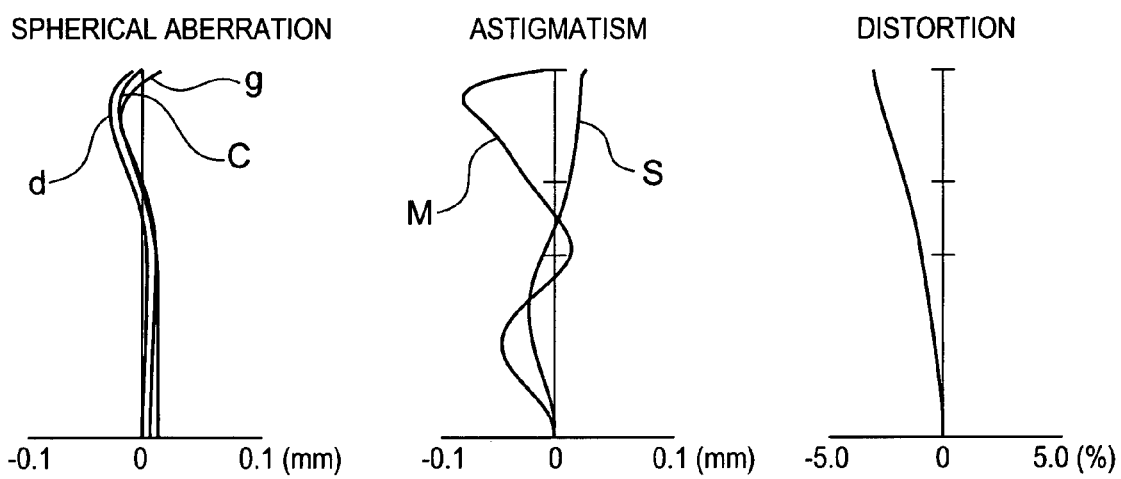
(EMBODIMENT 12: TELEPHOTO END)
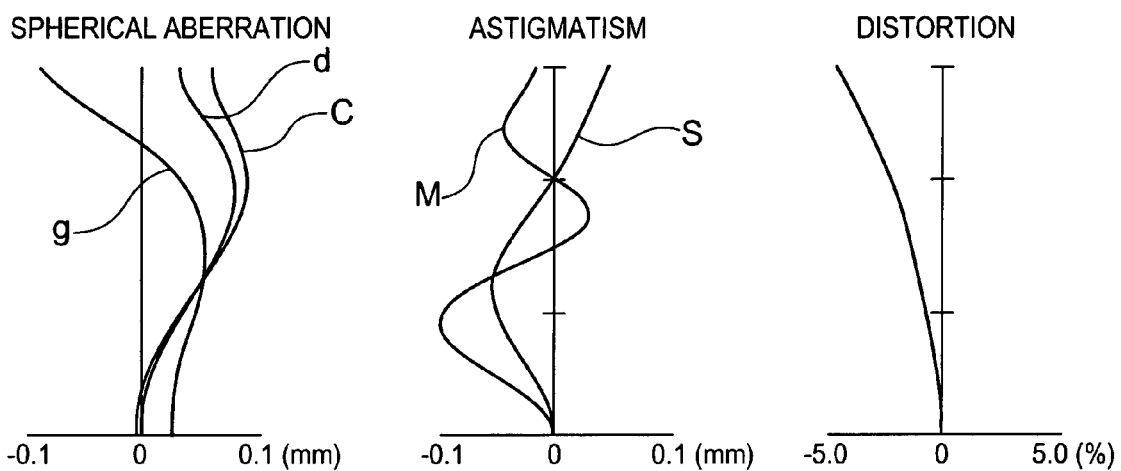

FIG. 30
(EMBODIMENT 13: WIDE-ANGLE END)
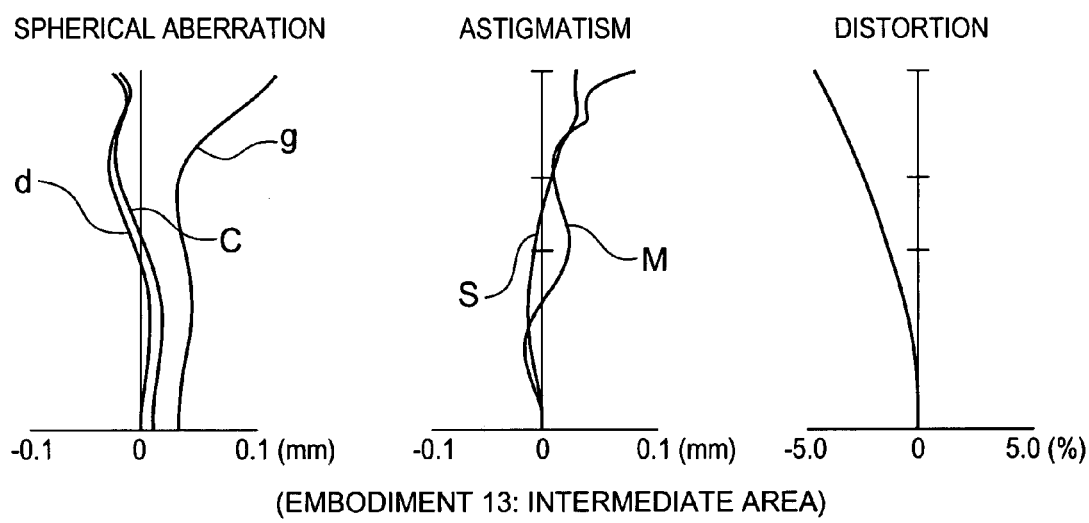
(EMBODIMENT 13: INTERMEDIATE AREA)
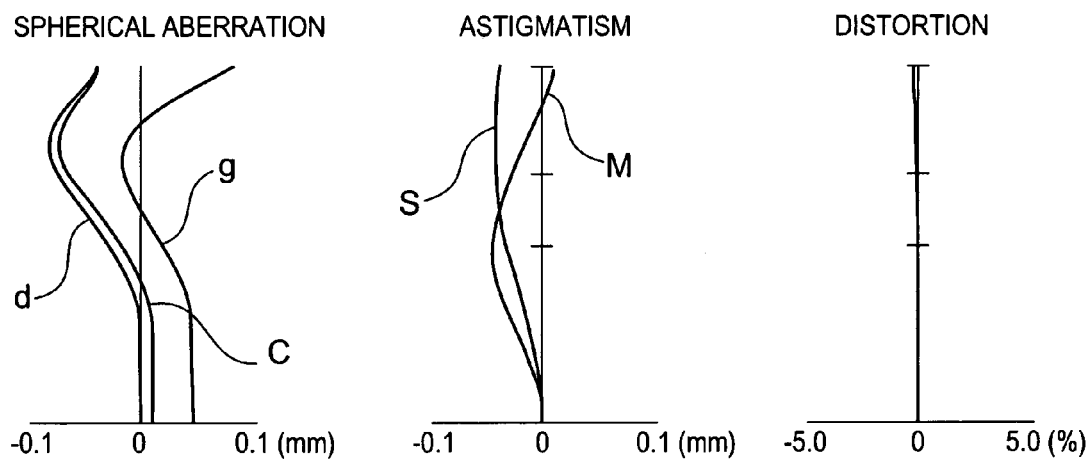
(EMBODIMENT 13: TELEPHOTO END)
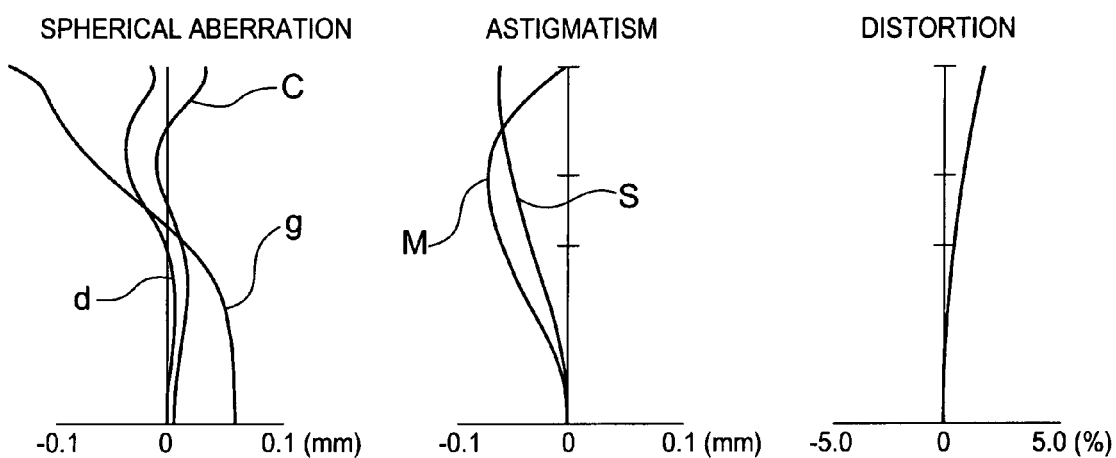

FIG. 31
(EMBODIMENT 14: WIDE-ANGLE END)
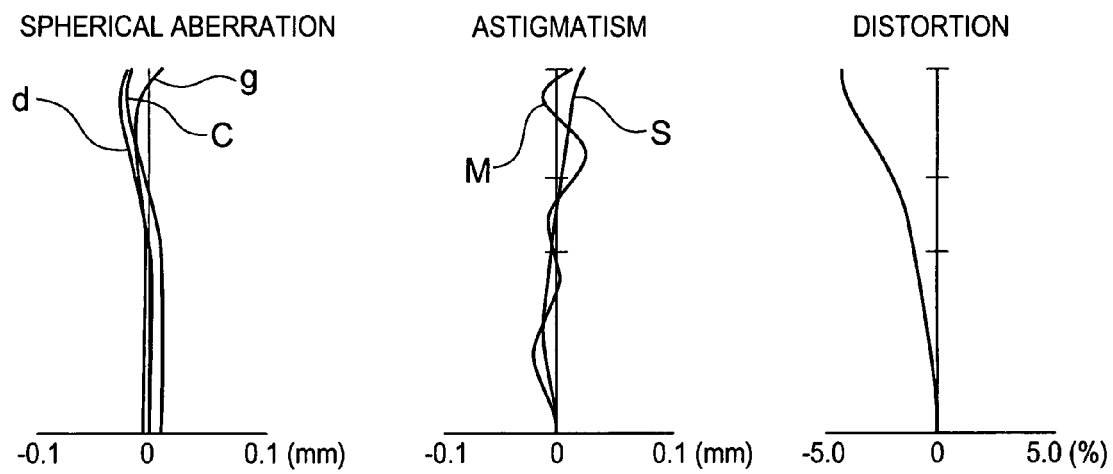
(EMBODIMENT 14: INTERMEDIATE AREA)
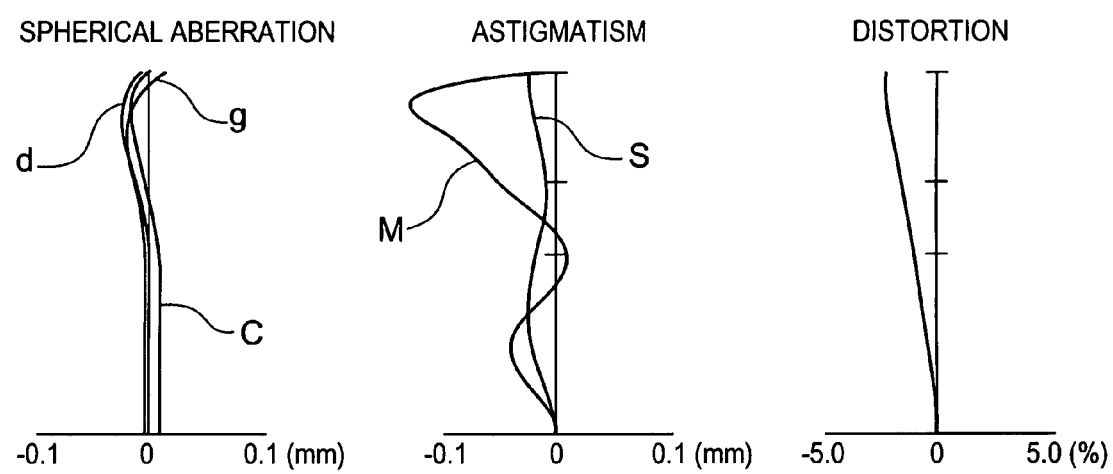
(EMBODIMENT 14: TELEPHOTO END)
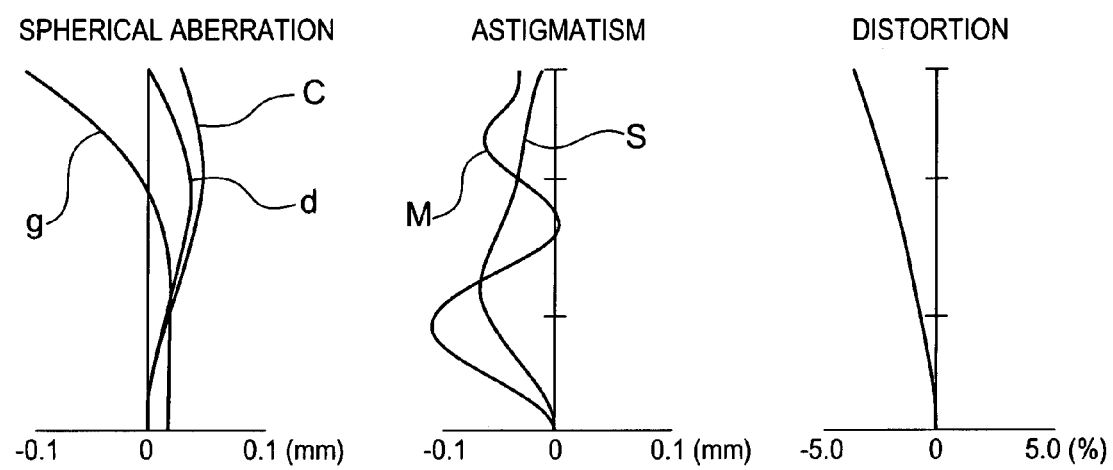

FIG. 32
(EMBODIMENT 15: WIDE-ANGLE END)
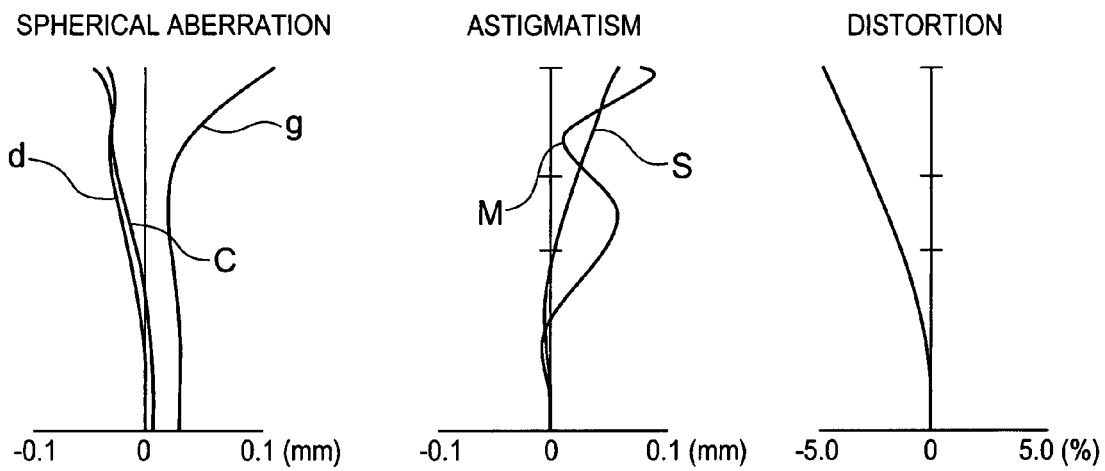
(EMBODIMENT 15: INTERMEDIATE AREA)
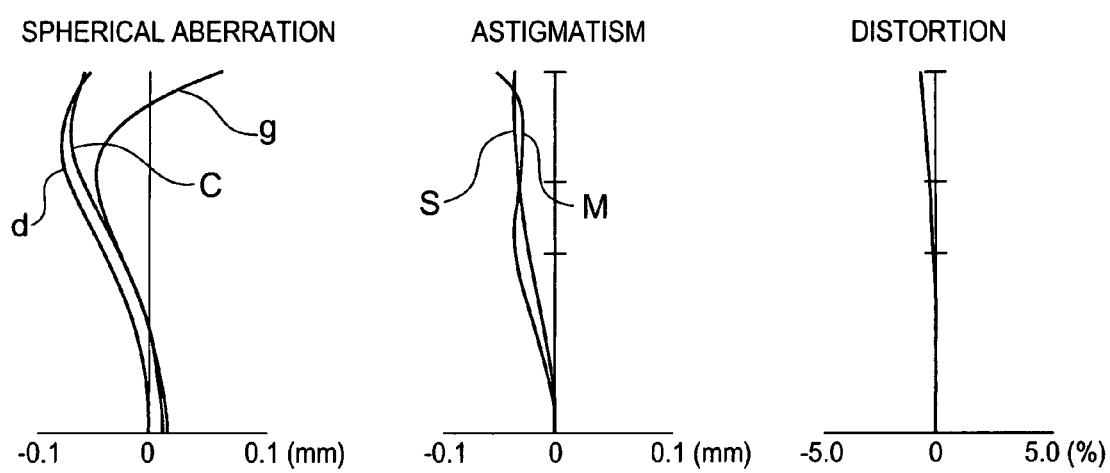
(EMBODIMENT 15: TELEPHOTO END)
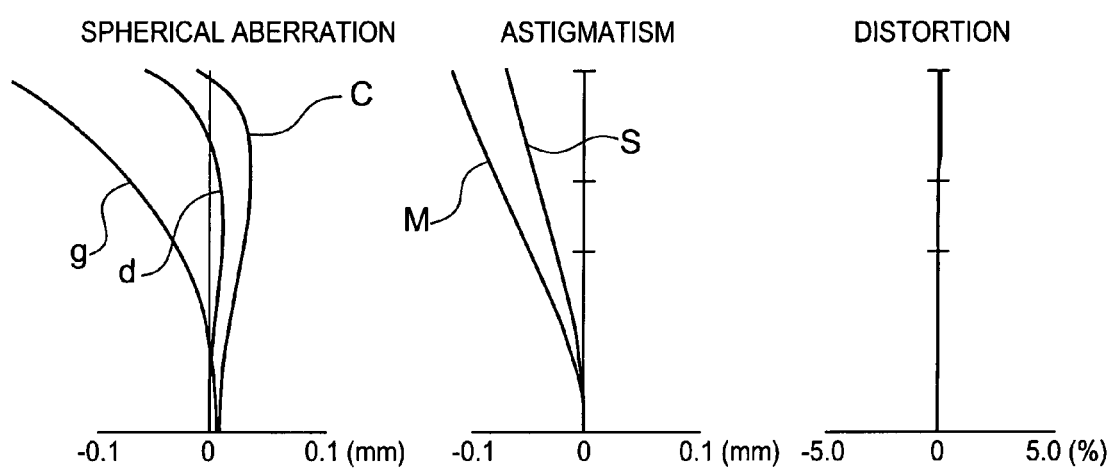

FIG. 33
(EMBODIMENT 16: WIDE-ANGLE END)
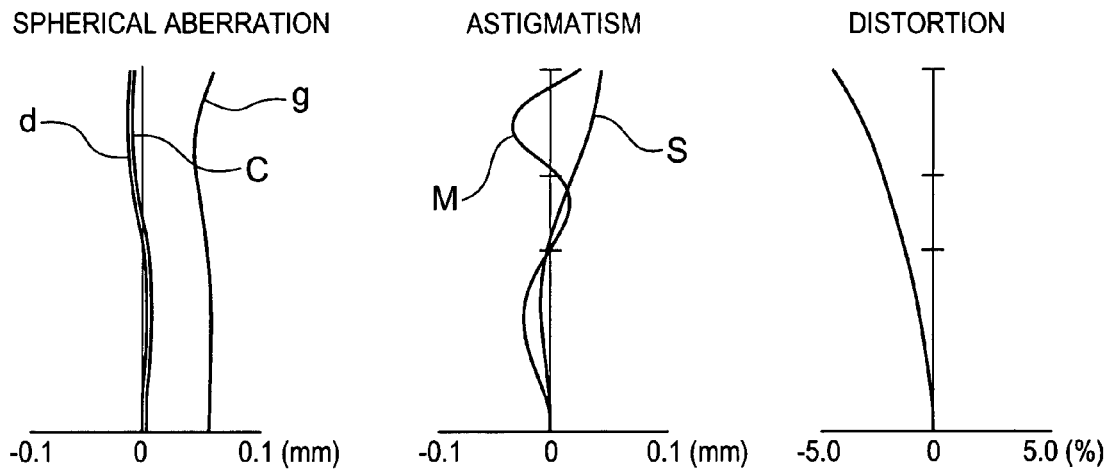
(EMBODIMENT 16: INTERMEDIATE AREA)
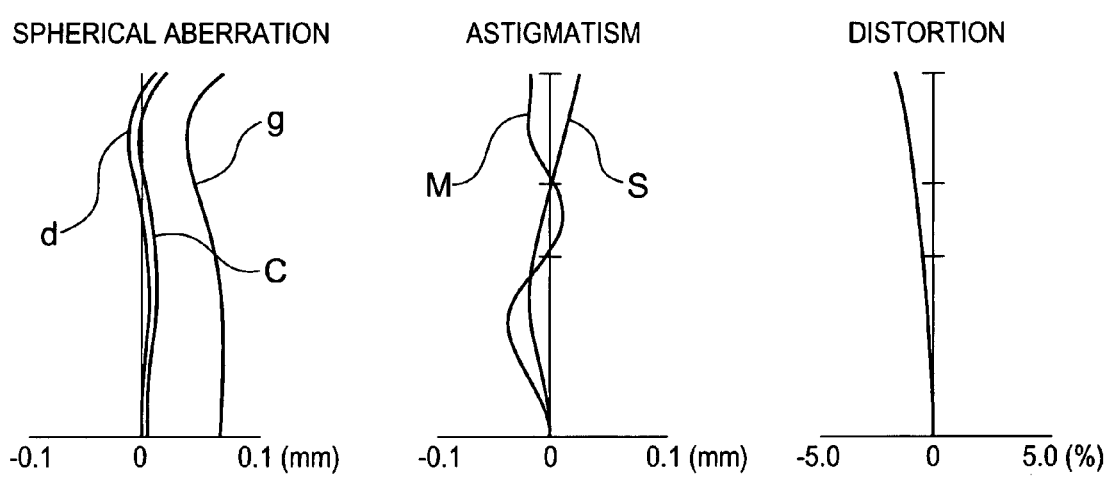
(EMBODIMENT 16: TELEPHOTO END)
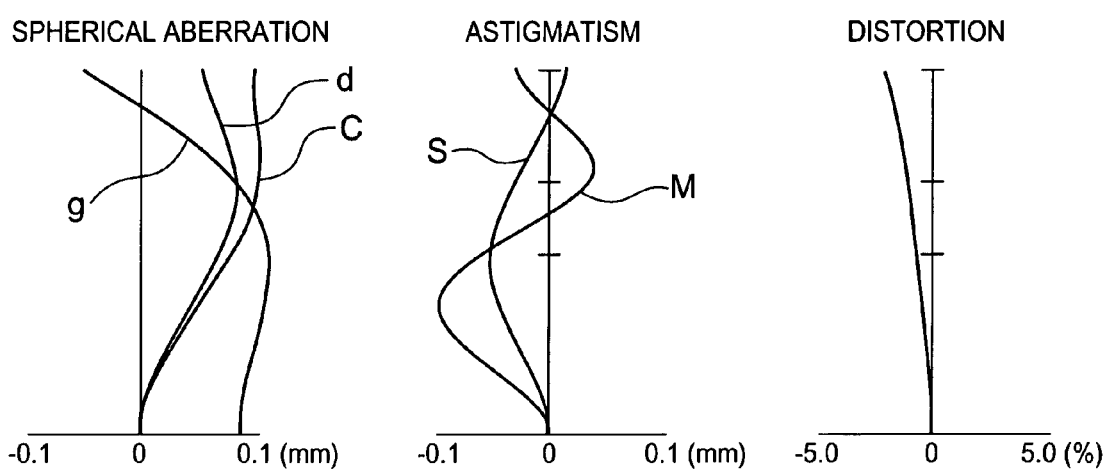

FIG. 34
(EMBODIMENT 17: WIDE-ANGLE END)
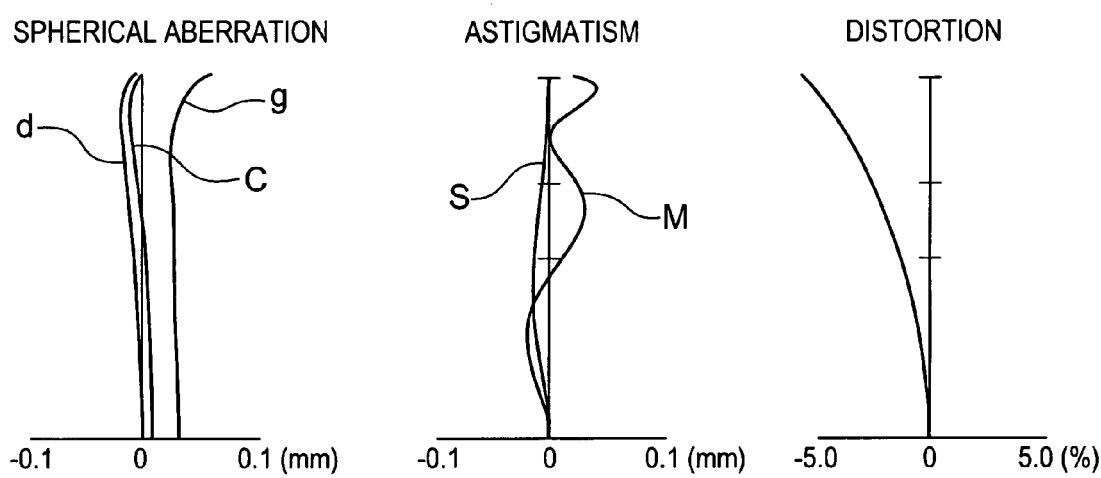
(EMBODIMENT 17: INTERMEDIATE AREA)
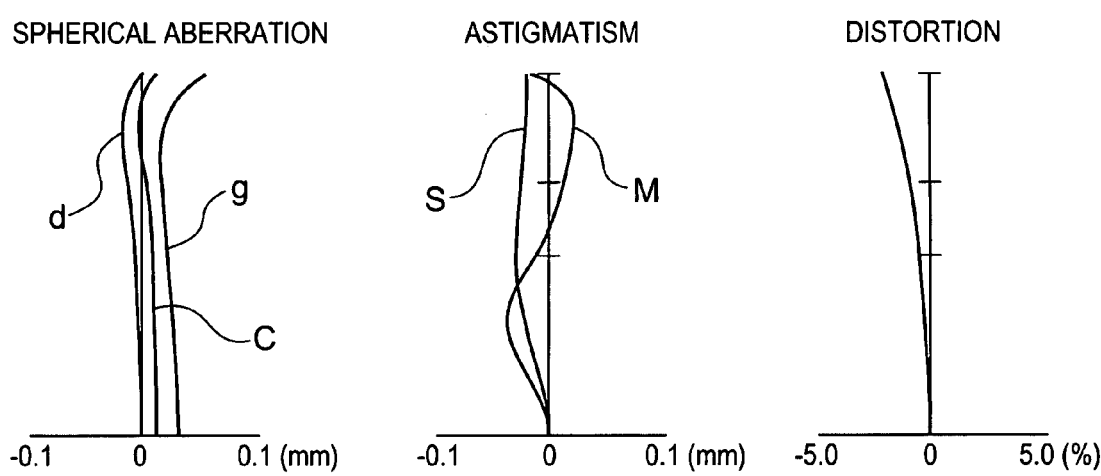
(EMBODIMENT 17: TELEPHOTO END)
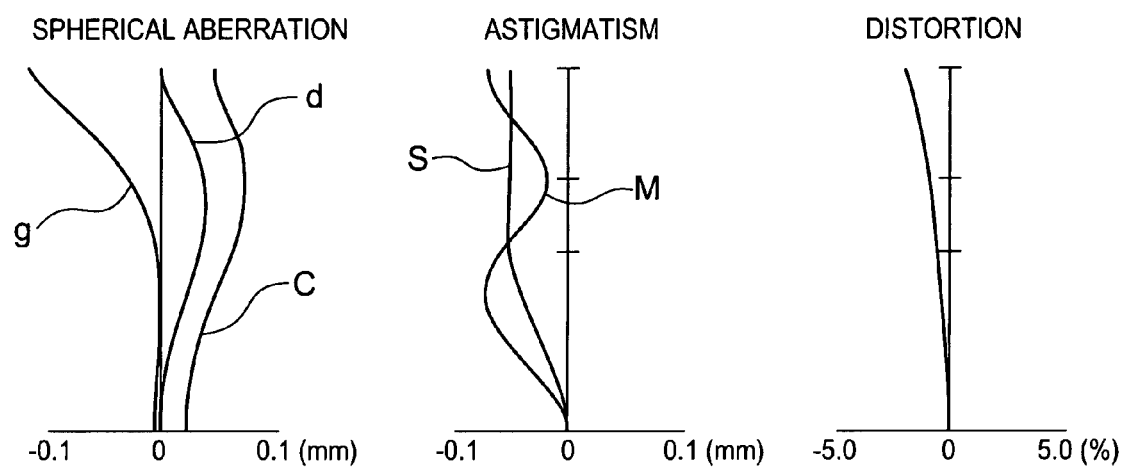

ZOOM LENS AND CAMERA WITH ZOOM LENS

BACKGROUND OF THE INVENTION

The present invention relates to a high-performance and fast (small f number) zoom lens which is used for a small sized photographic apparatus which utilizes an image sensor such as a CCD (charged coupled device) which is designed to be installed mainly on a digital still camera.

Small sized digital still cameras have been produced by devising systems and mechanisms which include the adoption of a single focus lens which can help reduce a dimension of the camera in a direction of an optical axis of the lens as much as possible in order to design a thin camera main body and, furthermore, the creation of a lens such as one disclosed in, for example, the Japanese Patent Unexamined Publication No. 2002-228922 in which telecentric characteristics which are inherent in image sensors such as CCD's are taken into consideration. However, the installation of zoom lenses on cameras has been in strong demand, and currently, even in the field of digital still cameras, a main stream of digital still cameras produced and sold has been shifted to those with a zoom lens.

The invention is such as to provide a small sized zoom lens or a small camera with a zoom lens.

SUMMARY OF THE INVENTION

According to a preferred aspect of the invention, there is provided a zoom lens including, sequentially from an object side thereof, a first lens elements group, a second lens elements group and a third lens element group, the first lens elements group having a negative refraction power as a whole and being made up by disposing a first lens element which is a lens having a negative refraction power (hereinafter, referred to as a negative lens) and a second lens element which is a lens having a positive refraction power (hereinafter, referred to as a positive lens) and which constitutes a meniscus lens which is convex on an object side surface thereof, the second lens elements group having a positive refraction power as a whole and being made up by disposing a third lens element which is a positive lens, a fourth lens element which is a positive lens, a fifth lens element which is a negative lens and which constitutes a meniscus lens which is convex on an object side surface thereof and a sixth lens element which is a positive lens, and the third lens element group having a negative refraction power as a whole and being made up by disposing a seventh lens element which is a negative lens and which constitutes a meniscus lens which is convex on an image side surface thereof. In addition, in the zoom lens, a variable power is realized by shifting the positions of the first lens elements group and the second lens elements group in a direction of an optical axis thereof, or so shifting, in addition to the first lens elements group and the second lens elements group, the position of the third lens element group, and the zoom lens satisfies the following conditional expression (1) with respect to the power that the first lens elements group possesses, the following conditional expression (2) with respect to the power that the third lens element group possesses, and the following conditional expression (3) with respect to the size of a whole lens system.

$$-0.7 < f_w/f_I < -0.30 \quad (1)$$

$$-0.5 < f_w/f_{III} < 0 \quad (2)$$

$$5.5 < TL_w/f_w < 7.0 \quad (3)$$

where, $f_w$: composite focal length of the whole lens system at a wide-angle end $f_I$: composite focal length of the first lens elements group $f_{III}$: composite focal length of the third lens element group $TL_w$: distance from an object side surface of the first lens element making up the first lens elements group to an image plane at the wide-angle end (where, a parallel plane glass portion is converted into an air space distance).

Furthermore, according to another preferred aspect of the invention, there is provided a zoom lens including, sequentially from an object side thereof, a first lens elements group, a second lens elements group and a third lens element group, the first lens elements group having a negative refraction power as a whole and being made up by disposing a first lens element which is a lens having a negative refraction power (hereinafter, referred to as a negative lens) and a second lens element which is a lens having a positive refraction power (hereinafter, referred to as a positive lens) and which constitutes a meniscus lens which is convex on an object side surface thereof, the second lens elements group having a positive refraction power as a whole and being made up by disposing a third lens element which is a positive lens, a fourth lens element which is a negative lens and a fifth lens element which is a positive lens, and the third lens element group having a negative refraction power as a whole and being made up by disposing a sixth lens element which is a negative lens. In addition, in the zoom lens, a variable power is realized by shifting the positions of the first lens elements group and the second lens elements group in a direction of an optical axis thereof, or so shifting, in addition to the first lens elements group and the second lens elements group, the position of the third lens element group, and the zoom lens satisfies the following conditional expression (13) with respect to the power that the first lens elements group possesses, the following conditional expression (14) with respect to the power that the third lens element group possesses, and the following conditional expression (15) with respect to the size of a whole lens system.

$$-0.8 < f_w/f_I < -0.4 \quad (13)$$

$$-0.4 < f_w/f_{III} < 0 \quad (14)$$

$$4.5 < TL_w/f_w < 7.5 \quad (15)$$

where, $f_w$: composite focal length of the whole lens system at a wide-angle end $f_I$: composite focal length of the first lens elements group $f_{III}$: composite focal length of the third lens element group $TL_w$: distance from an object side surface of the first lens element making up the first lens elements group to an image plane at the wide-angle end (where, a parallel plane glass portion is converted into an air space distance).

BRIEF DESCRIPTION OF THE DRAWINGS

FIG. 8 is a diagram showing aberrations of the first embodiment.

FIG. 9 is a diagram showing aberrations of the second embodiment.

FIG. 10 is a diagram showing aberrations of the third embodiment.

FIG. 11 is a diagram showing aberrations of the fourth embodiment.

FIG. 12 is a diagram showing aberrations of the fifth embodiment.

FIG. 13 is a diagram showing aberrations of the sixth embodiment.

FIG. 14 is a diagram showing aberrations of the seventh embodiment.

FIG. 25 is a diagram showing aberrations of the eighth embodiment.

FIG. 26 is a diagram showing aberrations of the ninth embodiment.

FIG. 27 is a diagram showing aberrations of the tenth embodiment.

FIG. 28 is a diagram showing aberrations of the 11th embodiment.

FIG. 29 is a diagram showing aberrations of the 12th embodiment.

FIG. 30 is a diagram showing aberrations of the 13th embodiment.

FIG. 31 is a diagram showing aberrations of the 14th embodiment.

FIG. 32 is a diagram showing aberrations of the 15th embodiment.

FIG. 33 is a diagram showing aberrations of the 16th embodiment.

FIG. 34 is a diagram showing aberrations of the 17th embodiment.

DESCRIPTION OF THE PREFERRED EMBODIMENTS

Figure 1:
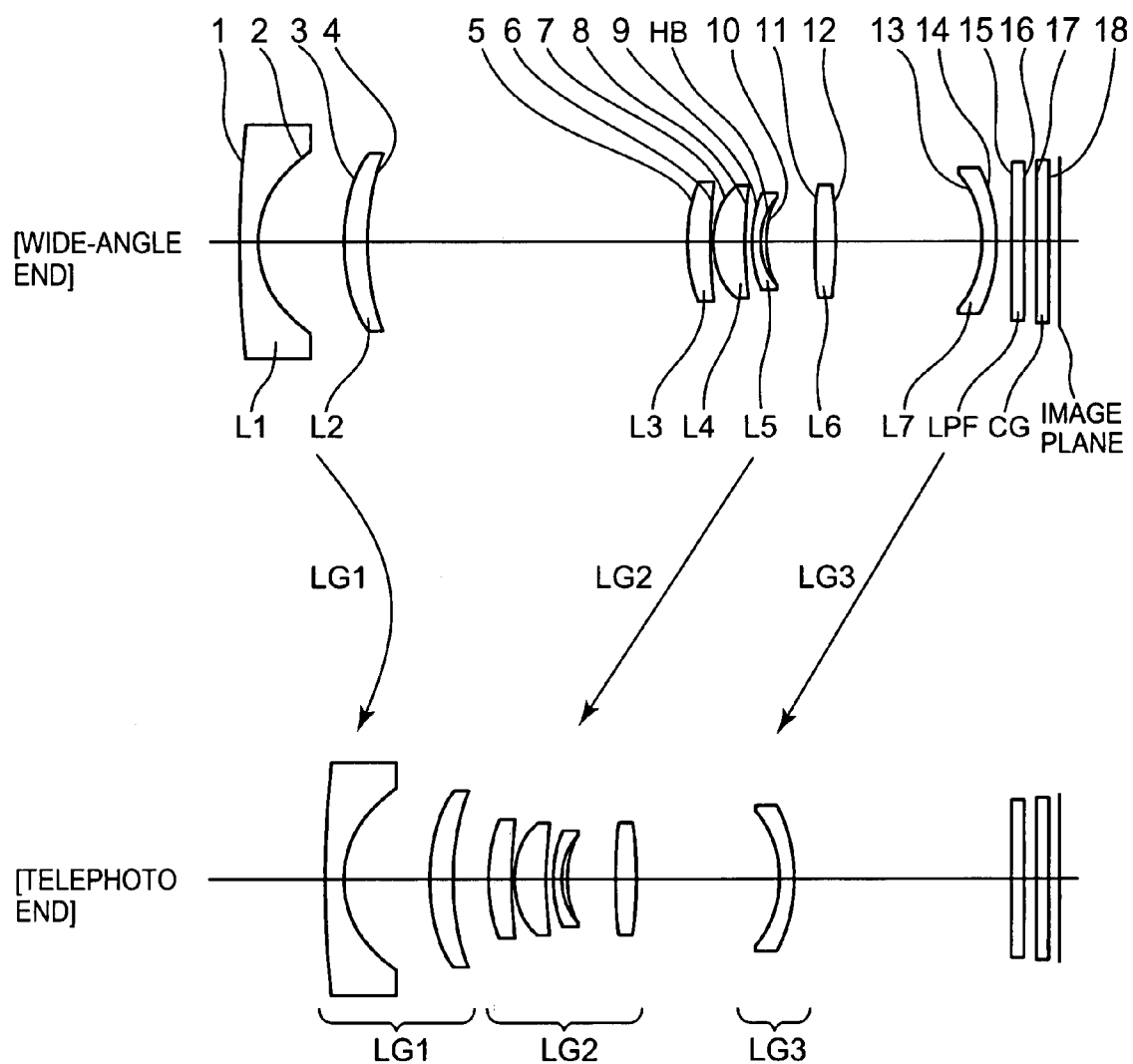
FIG. 1 is a diagram showing the configuration of lens elements of a first embodiment of a zoom lens of the invention.

Hereinafter, Embodiments 1 to 7 of the invention will be described by reference to specific numerical examples thereof.

In Embodiments 1 to 7 which will be described below, a zoom lens is made up of, sequentially from an object side thereof, a first lens elements group LG1, a second lens elements group LG2 and a third lens elements group LG3.

The first lens elements group LG1 has a negative refraction power as a whole and is made up by disposing a first lens element L1 (an object side surface of the first lens element L1 is to be referred to as a $1^{st}$ surface, and an image side surface as a $2^{nd}$ surface) which is a lens having a negative refraction power (hereinafter referred to as a negative lens), and a second lens element L2 (an object side surface of the second lens element L2 is to be referred to as a $3^{rd}$ surface, and an image side surface as a $4^{th}$ surface) which is a lens having a positive refraction power (hereinafter, referred to as a positive lens).

The second lens elements group LG2 has a positive refraction power as a whole and is made up by disposing a third lens element L3 (an object side surface of the third lens element L3 is to be referred to as a $5^{th}$ surface, and an image side surface as a $6^{th}$ surface) which is a positive lens, a fourth lens element L4 (an object side surface of the fourth lens element L4 is to be referred to as a $7^{th}$ surface, and an image side surface as an $8^{th}$ surface) which is a positive lens, a fifth lens element L5 (although an object side surface of the fifth lens element L5 is to be referred to as a $9^{th}$ surface and an image side surface as a $10^{th}$ surface, in the event that the $10^{th}$ surface constitutes a resin surface of a compound lens, a boundary plane between a base lens and the resin is made to be an HB plane, and a boundary plane between the resin and air is made to be the $10^{th}$ surface) which is a negative lens and a sixth lens element L6 (an object side surface of the sixth lens element L6 is referred to be as an $11^{th}$ surface, and an image side surface as a $12^{th}$ surface) which is a positive lens.

The third lens element group LG3 has a negative refraction power as a whole and is made up by disposing a seventh lens element L7 (an object side surface of the seventh lens element L7 is to be referred to as a $13^{th}$ surface, and an image side surface as a $14^{th}$ surface) which is a negative lens. In addition, a crystal optical filter LPF (an object side surface of the crystal optical filter LPF is to be referred to as a $15^{th}$ surface, and an image side surface as a $16^{th}$ surface) and a cover glass CG (an object side surface of the cover glass CG is to be referred to as a $17^{th}$ surface, and an image side surface as an $18^{th}$ surface) which is for protection of a photographic portion of a CCD are disposed within an air space defined between the image side surface, which is the $14^{th}$ surface, of the seventh lens element L7 and an image plane.

The cutting of infrared rays which is required in handling an image sensor such as a CCD is understood to be implemented by applying an infrared reflection coating on to one side of refracting surfaces of the crystal optical filter LPF and, hence, is not illustrated.

A variable power is realized by shifting the positions of the first lens elements group LG1 and the second lens elements group LG2 in a direction of an optical axis of the zoom lens, or shifting, in addition to the first lens elements group LG1 and the second lens elements group LG2, the position of the third lens element group LG3.

In addition, in each embodiment, although a focal point adjustment for an object at a finite distance can be realized by shifting the position of the first lens elements group LG1 or the third lens element group LG3 in the direction of the optical axis, the implementation of focal point adjustment is not limited to the relevant method.

Furthermore, the shape of an aspheric surface used in each embodiment is defined by giving a paraxial radius of curvature: R, and high-order aspherical coefficients: $A_4$, $A_6$, $A_8$, $A_{10}$, ... (a high-order aspherical coefficient which is not described is to be treated as 0) on a curved surface that is obtained by rotating round the optical axis a curve given by an aspherical equation:

$$Z=Y^2/R \cdot [1+\sqrt{1-(Y/R)^2}]+A_4 \cdot Y^4+A_6 \cdot Y^6+A_8 \cdot Y^8+A_{10} \cdot Y^{10}+\ldots$$

when letting an intersection point between the optical axis and the surface be an origin, the optical axis direction be the Z axis and a direction which intersects the optical axis at right angles be the Y axis.

In addition, this embodiment satisfies the following conditional expression (1) with respect to the power that the first lens element group possesses, the following conditional expression (2) with respect to the power that the third lens element group possesses, and the following conditional expression (3) with respect to the size of the whole lens system.

$$-0.7 < f_w/f_I < -0.30 \tag{1}$$

$$-0.5 < f_w/f_{III} < 0 \tag{2}$$

$$5.5 < TL_w/f_w < 7.0 \tag{3}$$

where, $f_w$: composite focal length of the whole lens system at a wide-angle end $f_I$: composite focal length of the first lens elements group $f_{III}$: composite focal length of the third lens element group $TL_w$: distance from an object side surface of the first lens element making up the first lens elements group to an image plane at the wide-angle end (where, a parallel plane glass portion is converted into an air space distance).

The conditional expression (1) relates to a proper distribution of power to the first lens element group which has the negative power.

This constitutes a balance for a condition for proper correction of the size and aberrations of the whole optical system. In the event that a lower limit is surpassed, this means that the negative power of the first lens elements group is large, and in conjunction with this, the positive power of the second lens elements group has to be intensified, and it becomes difficult to keep a balance among the aberrations, whereby the performance is decreased. In contrast to this, in the event that an upper limit is surpassed, large air spaces to the second lens elements group having the positive power have to be taken, whereby the size of the whole optical system is enlarged, and as a result, the compactness is lost.

The conditional expression (2) is a conditional expression which is related to the power that the third lens element group possesses. It is a prime characteristic that it remains within the negative range, whereby a function is provided to cause the exit pupil of the optical system to approach the image plane side.

In general, the fact that the exit pupil is positioned in the proximity of the image plane is advantageous in making the zoom lens compact in such a way as to decrease the overall length thereof. In contrast thereto, this means that the telecentric characteristics on the periphery of the picture plane are collapsed. Namely, a principal ray of light passing through an image point on the periphery of the picture plane is angled, which is not good for an optical system which uses an image sensor such as a CCD.

Normally, in a zoom lens at a magnification of the order of 3×, the angle of a principal ray of light passing through an image point on the periphery of the picture plane is changed by an operation for variable power. Although it is natural that the amount of change differs depending on designs, in many cases, the amount of change in angle is nearly on the order of 10° or more at an image point of a maximum image height (for example, 10° at the wide-angle end, 0° at the telephoto end). In the case of a single focus lens which is free from change in angle of the principal ray of light, however, the change can exceed 20° by adapting the construction of a microlens of a CCD.

In Embodiments 1 to 7, which will be described later on, assuming that the change in angle of the principal ray of light at the time of changing magnification is within 8 degrees and that a bisector of an angle formed by an upper ray of light and a lower ray of light is defined as the principal ray of light, the angle of the principal ray of light at a maximum image point on the picture plane is not more than 20°, and this can be dealt with by adapting the construction of a microlens of a CCD.

A lower limit value that is specified by the conditional expression (2) is to be a range where the negative power of the third lens element group can be taken in that state. When the lower limit is surpassed, although it is effective in making the system compact, the angle of the principal ray of light exceeds 20°, and problems are caused of shading and insufficient quantity of light, whereby the high image quality required for a digital still camera or the like becomes unable to be maintained. On the contrary, when an upper limit is surpassed, it means that an optical system of a size results which does not have to be made compact by the application of the invention.

The conditional expression (3) is such as to control the overall length of the zoom lens at the wide-angle end. Namely, this constitutes a condition which becomes a measure of reduction in size of the zoom lens of the invention.

In the event that an upper limit is surpassed, although it becomes advantageous in correcting the aberrations, it becomes impossible to provide a compact zoom lens, which is the object of the invention. On the contrary, in the event that a lower limit is surpassed, the power of each lens element has to be increased, and this calls for deterioration in the aberrations, whereby the production of the object zoom lens becomes difficult in practice.

In addition, in this embodiment, at least one of the object side and image side surfaces of the first lens element which makes up the first lens elements group is an aspherical surface, and the embodiment satisfies the following conditional expression (4) with respect to the power of the same lens element, the following conditional expression (5) with respect to the chromatic dispersion properties that are distributed to each lens element of the first lens elements group, and the following conditional expression (6) with respect to the configuration of the object side surface of the first lens element.

$$-1.2 < f_w/f_1 < -0.5 \quad (4)$$

$$12 < \upsilon_1 - \upsilon_2 \quad (5)$$

$$0.7 < f_w/R_2 < 1.6 \quad (6)$$

where, $f_1$: focal length of the first lens element which makes up the first lens elements group $\upsilon_1$: Abbe number of the first lens element which makes up the first lens elements group $\upsilon_2$: Abbe number of the second lens element which makes up the first lens elements group $R_2$: paraxial radius of curvature of the object side surface of the first lens element which makes up the first lens elements group.

The conditional expression (4) is such as to proper collect aberrations of the first lens elements group as a whole by controlling the focal length of the first lens element which makes up the first lens elements group.

In the event that an upper limit is surpassed, the power of the first lens element becomes too small, an insufficient correction of chromatic aberration and curvature of field results. In the event that a lower limit is surpassed, the power of the first lens elements becomes too large, and in association with this, the power of the second lens element becomes too large. As a result, the radius of curvature of each surface becomes small, whereby high-order aberrations such as spherical aberration and coma aberration are produced, no good performance being thereby able to be obtained.

The conditional expression (5) relates to the distribution of Abbe numbers of the negative lenses and the positive lens which make up the first lens elements group.

This is a conditional expression for properly maintaining the chromatic aberration correction for the first lens elements group, and a proper distribution of powers can be realized to enable a proper correction of chromatic aberration by implementing the selection of glass materials for the negative lenses and the positive lens which make up the first lens elements group based on a condition specified under the conditional expression (5). In the event that a lower limit is surpassed, the power of each lens becomes excessive in order to correct chromatic aberration, and the aberrations are deteriorated.

A basic configuration for suppressing the occurrence of off-axis aberrations such as coma aberration and distortion is realized by providing a concentric configuration relative to the entrance pupil under the strong negative power which is imparted to the first lens element, and the conditional expression (6) specifies a condition for realizing the relevant configuration.

Namely, the first lens element is formed into a meniscus configuration having the strong negative power. However, in the event that with the object side surface of the first lens element formed into an aspherical shape, a reduction in the overall length is implemented strongly, although the overall configuration can be said to take a meniscus configuration, when looking at a paraxial radius of curvature, there may occur a case where a resulting configuration constitutes a double-concave lens. In the event that a lower limit of the conditional expression (6) is surpassed, the occurrence of coma aberration and distortion cannot be suppressed sufficiently. On the contrary, in the event that an upper limit is surpassed, although it is effective to suppress the occurrence of aberrations, the curvature of the shape of the meniscus negative lens becomes excessive, and the production of the lens becomes difficult.

In addition, in order to correct effectively off-axis aberrations such as astigmatism and distortion, it is better to form the image side surface of the first lens element into an aspherical surface shape. As this occurs, although as aspherical surfaces to be manufactured, a glass molded aspherical surface, a composite aspherical surface with a resin material and the like are preferred, there is no specific limitation on the method for manufacturing the aspherical surface.

Furthermore, this embodiment satisfies the following conditional expression (7) with respect to a positive composite power that the third lens element and the fourth lens element which make up the second lens elements group possess, the following conditional expression (8) with respect to the chromatic dispersion properties that are distributed to each lens element of the second lens elements group, the following conditional expression (9) with respect to the relationship between the refractive indexes that the third lens element and the fourth lens element possess, the following conditional expression (10) with respect to the configuration of the object side surface of the third lens element, and the following conditional expression (11) with respect to the configuration of the image side surface of the fifth lens element.

$$0.6 < f_w/f_{3,4} < 1.2 \quad (7)$$

$$30 < \upsilon_3 + \upsilon_4/2 - \upsilon_5 \quad (8)$$

$$n_3 + n_4/2 < 1.6 \quad (9)$$

$$0.4 < f_w/R_5 < 1.2 \quad (10)$$

$$0.8 < f_w/R_{10} < 2.5 \quad (11)$$

where, $f_{3,4}$: composite focal length of the third lens element and the fourth lens element which make up the second lens elements group $\upsilon_3$: Abbe number of the third lens element which makes up the second lens elements group $\upsilon_4$: Abbe number of the fourth lens element which makes up the second lens elements group $\upsilon_5$: Abbe number of the fifth lens element which makes up the second lens elements group (where, in the event that the fifth lens element makes up a compound lens, Abbe number of a glass material of a base lens element, and the resin portion is not taken into consideration)

$n_3$: refractive index relative to the d line of the third lens element which makes up the second lens elements group $n_4$: refractive index relative to the d line of the fourth lens element which makes up the second lens elements group $R_5$: paraxial radius of curvature of the object side surface of the third lens element which makes up the second lens elements group $R_{10}$: paraxial radius of curvature of the image side surface of the fifth lens element which makes up the second lens elements group (where, in the event that the fifth lens element makes up a compound lens, paraxial radius of curvature of the surface of those of the base lens element and the resin portion which is closest to the image side).

The conditional expression (7) relates to the third lens element and the fourth lens element which are disposed closest to the object side in the second lens elements group and which have the strong positive power.

The conditional expression (7) provides a condition for imparting a large positive power for collecting rays of light which diverge from the first lens elements group and correcting properly the aberrations. In the event that an upper limit is surpassed, the positive power becomes excessive, and at the same time, the spherical aberration is corrected insufficiently, whereas in the event that a lower limit is surpassed, the positive power for collecting light rays from the first lens elements group becomes insufficient, and an excessive correction of spherical aberration results. In either of the cases, however, in addition to spherical aberration, the off-axis aberration such as coma aberration and chromatic aberration are largely affected.

The conditional expression (8) relates to the distribution of Abbe numbers of the positive lens and the negative lens which are disposed on the object side in the second lens elements group so as to be used in a portion which keeps a balance of aberrations while having a strong positive power for collecting rays of light which diverge from the first lens elements group.

In this case, although the sixth lens element, which also makes up the second lens elements group, has a relatively large positive power, the magnitude of the power is such as to be determined in many cases by a balance with the negative power of the third lens element group, and therefore, the conditional expression (8) is made to limit the distribution of Abbe numbers of the third lens element and the fourth lens element which are the positive lenses and the fifth lens element which is the negative lens. The conditional expression (8) specifies a condition for keeping a balance with the aberrations while correcting properly the chromatic aberration of the whole lens system, and in the event that a lower limit is surpassed, the power of each lens element has to be increased so as to correct chromatic aberration, which constitutes a disadvantageous condition for correcting spherical aberration and coma aberration.

The conditional expression (9) relates to the correction of curvature of field in the second lens elements group. In order to balance a negative Petzval sum produced from the first lens elements group, the refractive index of each lens element needs to be a value which falls within a range specified by a condition presented by the relevant expression. In the event that an upper limit is surpassed, the Petzval sum becomes too small, and the correction of curvature of field becomes excessive.

The conditional expression (10) is a conditional expression in relation to the configuration of the object side surface of the third lens element. Since the object side surface of the third lens element is disposed right behind an aperture stop, the relevant surface plays an important role in correcting spherical aberration. The conditional expression (10) specifies a condition for properly correcting spherical aberration in connection with the negative power of the first lens elements group. In the event that an upper limit of the conditional expression (10) is surpassed, although off-axis aberrations such as coma aberration and astigmatism get easy to be corrected, an insufficient correction of spherical aberration results. On the contrary, in the event that a lower limit is surpassed, an excessive correction of spherical aberration results, and at the same time, a proper correction of the off-axis aberrations becomes difficult.

The conditional expression (11) is a conditional expression which relates to the configuration of the image side surface of the fifth lens element. The object side surface of the third lens element that is expressed in the previous conditional expression (10) is a surface which is disposed closest to an incident side in the second lens elements group, and moderate negative spherical aberration and coma aberration that are produced on the relevant surface are corrected by producing a positive aberration on the image side surface of the fifth lens element. Consequently, in the event that an upper limit is surpassed, the positive spherical aberration becomes excessive, and on the contrary, in the event that a lower limit is surpassed, the negative spherical aberration becomes excessive, whereby in either of the cases, a proper correction of spherical aberration and coma aberration is disabled.

In addition, this embodiment satisfies the following conditional expression (12) with respect to the configuration of the object side surface of the seventh lens element which makes up the third lens element group.

$$-1.2 < f_w/R_{13} < -0.25 \qquad (12)$$

where, $R_{13}$: paraxial radius of curvature of the object side surface of the seventh lens element which makes up the third lens element group.

The conditional expression (12) is a conditional expression which relates to the configuration of the object side surface of the seventh lens element which makes up the third lens element group.

In order to cause rays of light converging from the second lens elements group to focus on an image plane with production of little aberration, basically, the configuration of the seventh lens element is preferably formed into a concentric shape relative to the second lens elements group. Consequently, it is preferable that $R_{13}$ basically takes a negative value. In the event that $R_{13}$ exceeds an upper limit to become a positive value, the peripheral shape is also changed from the concentric shape, whereby aberrations such as comma aberration and distortion are produced. In the event that a lower limit is surpassed, the Petzval sum by $R_{13}$ becomes too large on the negative side, and the angle of an emerging ray of light also becomes excessive.

Embodiment 1

A numerical example for a first embodiment of a zoom lens of the invention will be shown in Table 1. In addition, FIG. 1 is a diagram showing the configuration of lens elements of the zoom lens, and FIG. 8 is a diagram showing aberrations thereof. In the table and figures, f denotes the focal length of a whole lens system (hereinafter, values shown therein are from the left-hand side values at a wide-angle end, intermediate area and telephoto end), $F_{no}$ f number, and 2ω total angle of view of lens. In addition, R denotes radius of curvature, D lens element thickness or lens element space, $N_d$ refractive index of d line, and $υ_d$ Abbe number of d line. In diagrams showing aberrations, d, g, C in diagrams showing spherical aberrations denote aberration curves in individual wavelengths. In astigmatism diagrams, S denotes sagital, and M denotes meridional.

TABLE 1

| Surface number | R | D | $N_d$ | $v_d$ |
|---|---|---|---|---|
| | f = 6.40~10.81~18.24 | | | |
| | $F_{no}$ = 2.88~3.72~5.24 | | | |
| | 2ω = 73.60~45.47~27.67 | | | |
| 1 | 63.856 | 0.84 | 1.69400 | 56.30 |
| 2 | 5.423 | 4.27 | — | — |
| 3 | 10.055 | 1.16 | 1.84666 | 23.78 |
| 4 | 14.449 | 16.09~6.89~1.90 | — | — |
| 5 | 9.211 | 1.20 | 1.59551 | 39.23 |

TABLE 1-continued

| | | | | |
|---|---|---|---|---|
| 6 | 45.450 | 0.10 | — | — |
| 7 | 4.562 | 1.53 | 1.49700 | 81.61 |
| 8 | 14.363 | 0.47 | — | — |
| 9 | 7.875 | 0.40 | 2.13120 | 24.07 |
| HB | 3.945 | 0.25 | 1.51576 | 52.63 |
| 10 | 5.719 | 2.45 | — | — |
| 11 | 27.254 | 1.06 | 1.59270 | 35.45 |
| 12 | −21.112 | 7.26~8.09~7.10 | — | — |
| 13 | −7.233 | 0.80 | 1.52470 | 56.24 |
| 14 | −10.653 | 0.69~3.47~10.97 | — | — |
| 15 | ∞ | 0.64 | 1.54892 | 69.76 |
| 16 | ∞ | 0.64 | — | — |
| 17 | ∞ | 0.64 | 1.51680 | 64.20 |
| 18 | ∞ | — | — | — | aspherical coefficients

| 1st surface | 2nd surface | 10th surface |
|---|---|---|
| $A_4 = 3.83165 \times 10^{-4}$ | $A_4 = 3.10320 \times 10^{-5}$ | $A_4 = 1.67168 \times 10^{-3}$ |
| $A_6 = -3.57297 \times 10^{-5}$ | $A_6 = -4.79594 \times 10^{-5}$ | $A_6 = 5.86636 \times 10^{-5}$ |
| $A_8 = 1.61615 \times 10^{-6}$ | $A_8 = 1.88752 \times 10^{-7}$ | $A_8 = 8.84567 \times 10^{-6}$ |
| $A_{10} = -3.51091 \times 10^{-8}$ | $A_{10} = 7.07581 \times 10^{-8}$ | |
| $A_{12} = 2.91453 \times 10^{-10}$ | $A_{12} = -2.99287 \times 10^{-9}$ | |

13th surface $A_4 = -8.41489 \times 10^{-5}$
$A_6 = -1.43138 \times 10^{-5}$
$A_8 = 3.40000 \times 10^{-6}$
$A_{10} = -3.25052 \times 10^{-7}$
$A_{12} = 1.26771 \times 10^{-8}$ Embodiment 2

Figure 2:
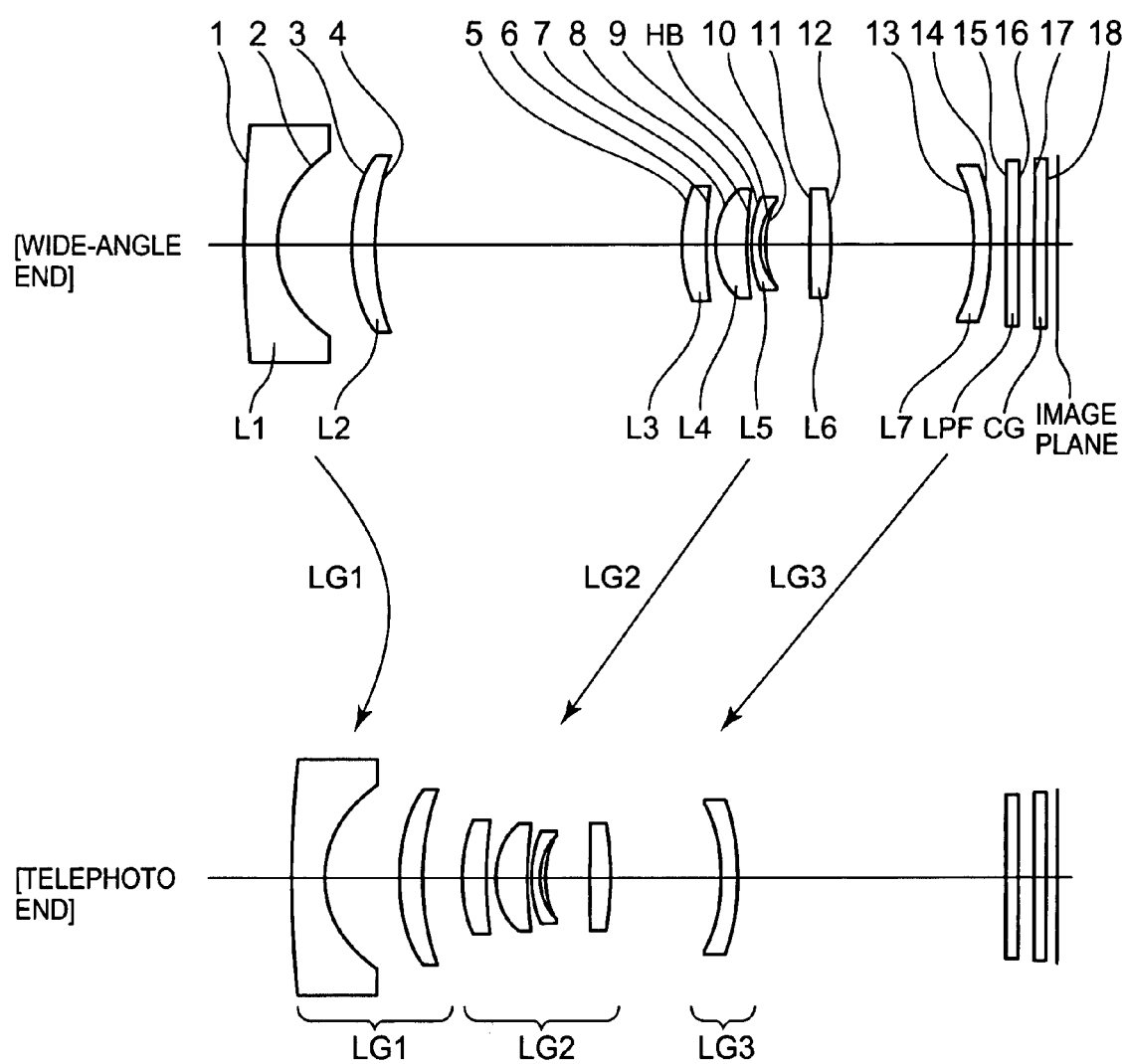
FIG. 2 is a diagram showing the configuration of lens elements of a second embodiment of a zoom lens of the invention.

A numerical example for a second embodiment of a zoom lens of the invention will be shown in Table 2. In addition, FIG. 2 is a diagram showing the configuration of lens elements of the zoom lens, and FIG. 9 is a diagram showing aberrations thereof.

TABLE 2 f = 6.00~10.13~17.10
$F_{no}$ = 2.88~3.75~5.29
2ω = 77.17~48.11~29.42

| Surface number | R | D | $N_d$ | $v_d$ |
|---|---|---|---|---|
| 1 | 86.283 | 1.53 | 1.76802 | 49.24 |
| 2 | 5.152 | 3.49 | — | — |
| 3 | 9.418 | 1.25 | 1.84666 | 23.78 |
| 4 | 15.383 | 14.38~6.30~1.80 | — | — |
| 5 | 8.388 | 1.20 | 1.60342 | 38.00 |
| 6 | 55.918 | 0.43 | — | — |
| 7 | 3.978 | 1.48 | 1.49700 | 81.61 |
| 8 | 10.588 | 0.28 | — | — |
| 9 | 6.891 | 0.40 | 2.13120 | 24.07 |
| HB | 3.415 | 0.25 | 1.51576 | 52.63 |
| 10 | 4.981 | 2.04 | — | — |
| 11 | 60.695 | 1.01 | 1.59270 | 35.45 |
| 12 | −14.532 | 6.70~7.17~5.04 | — | — |
| 13 | −11.171 | 0.80 | 1.52470 | 56.24 |
| 14 | −15.535 | 0.76~3.98~12.82 | — | — |
| 15 | ∞ | 0.64 | 1.54892 | 69.76 |
| 16 | ∞ | 0.64 | — | — |
| 17 | ∞ | 0.64 | 1.51680 | 64.20 |
| 18 | ∞ | — | — | — | aspherical coefficients

| 1st surface | 2nd surface | 10th surface |
|---|---|---|
| $A_4 = 7.31472 \times 10^{-4}$ | $A_4 = 4.52635 \times 10^{-4}$ | $A_4 = 2.43646 \times 10^{-3}$ |
| $A_6 = -4.93035 \times 10^{-5}$ | $A_6 = -6.48744 \times 10^{-5}$ | $A_6 = 1.04087 \times 10^{-4}$ |
| $A_8 = 1.85930 \times 10^{-6}$ | $A_8 = -9.14241 \times 10^{-7}$ | $A_8 = 2.23890 \times 10^{-5}$ |
| $A_{10} = -3.62678 \times 10^{-8}$ | $A_{10} = 1.73439 \times 10^{-7}$ | |
| $A_{12} = 2.79684 \times 10^{-10}$ | $A_{12} = -6.26506 \times 10^{-9}$ | |

13th surface $A_4 = -1.35174 \times 10^{-4}$
$A_6 = 2.11536 \times 10^{-6}$
$A_8 = 1.18045 \times 10^{-6}$
$A_{10} = -1.44750 \times 10^{-7}$
$A_{12} = 7.31067 \times 10^{-9}$ Embodiment 3

Figure 3:
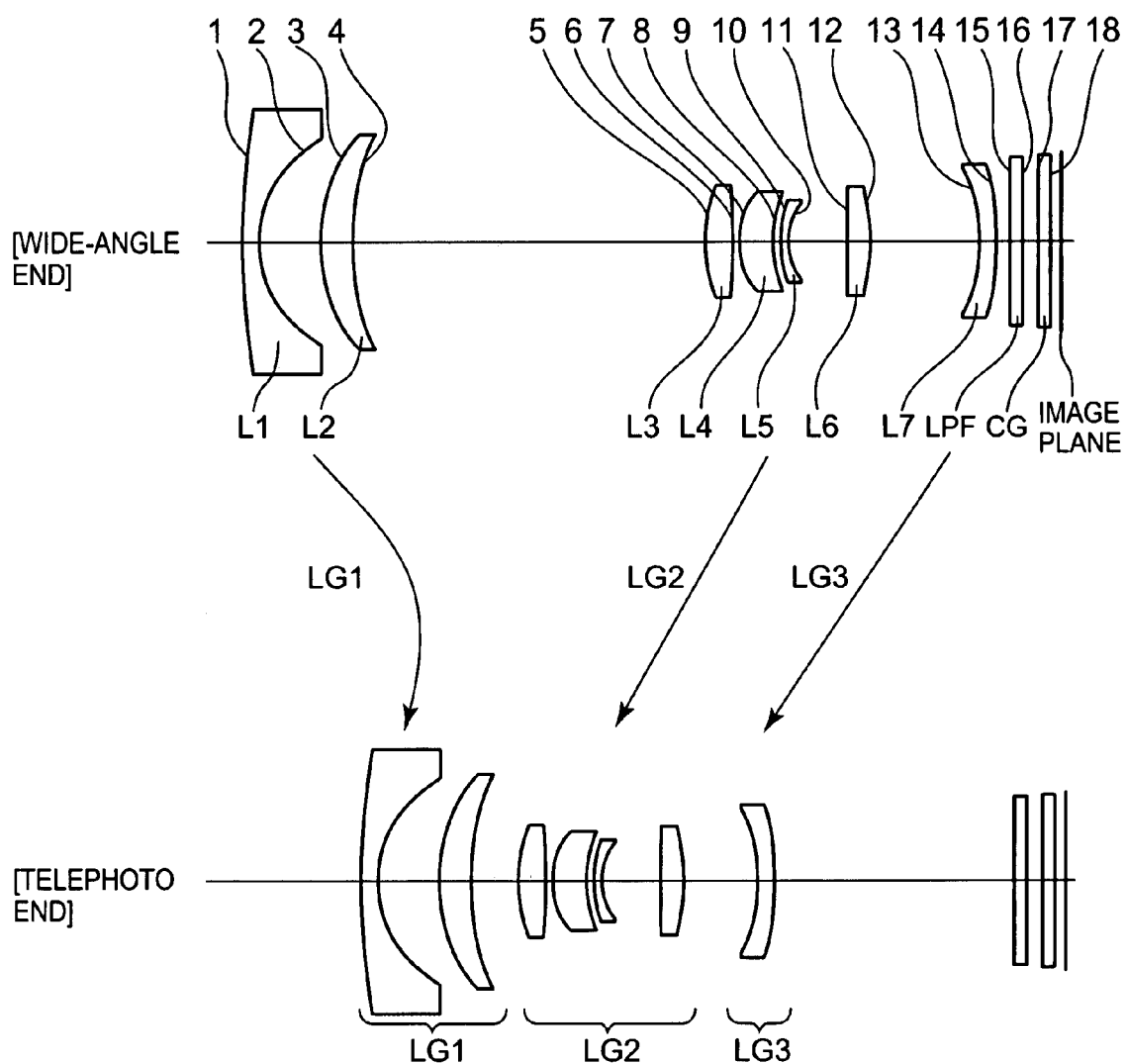
FIG. 3 is a diagram showing the configuration of lens elements of a third embodiment of a zoom lens of the invention.

A numerical example for a third embodiment of a zoom lens of the invention will be shown in Table 3. In addition, FIG. 3 is a diagram showing the configuration of lens elements of the zoom lens, and FIG. 10 is a diagram showing aberrations thereof.

TABLE 3 f = 6.46~10.90~18.40
$F_{no}$ = 2.88~3.77~5.27
2ω = 73.12~45.24~27.43

| Surface number | R | D | $N_d$ | $v_d$ |
|---|---|---|---|---|
| 1 | 87.031 | 0.72 | 1.76802 | 49.24 |
| 2 | 6.236 | 2.90 | — | — |
| 3 | 9.137 | 1.53 | 1.84666 | 23.78 |
| 4 | 14.459 | 16.58~7.50~2.14 | — | — |
| 5 | 8.061 | 1.30 | 1.49700 | 81.61 |
| 6 | −37.430 | 0.35 | — | — |
| 7 | 4.219 | 1.64 | 1.49700 | 81.61 |
| 8 | 8.450 | 0.30 | — | — |
| 9 | 5.955 | 0.40 | 2.13120 | 24.07 |
| 10 | 3.709 | 2.73 | — | — |
| 11 | −1951.477 | 1.02 | 1.59270 | 35.45 |
| 12 | −11.787 | 5.16~4.45~3.41 | — | — |
| 13 | −9.433 | 0.80 | 1.52470 | 56.24 |
| 14 | −19.894 | 0.66~4.57~11.35 | — | — |
| 15 | ∞ | 0.64 | 1.54892 | 69.76 |
| 16 | ∞ | 0.64 | — | — |
| 17 | ∞ | 0.64 | 1.51680 | 64.20 |
| 18 | ∞ | — | — | — | aspherical coefficients

| 1st surface | 2nd surface | 7th surface |
|---|---|---|
| $A_4 = 7.12764 \times 10^{-4}$ | $A_4 = 5.97221 \times 10^{-4}$ | $A_4 = -4.14341 \times 10^{-4}$ |
| $A_6 = -5.08827 \times 10^{-5}$ | $A_6 = -4.57095 \times 10^{-5}$ | $A_6 = 2.94773 \times 10^{-5}$ |
| $A_8 = 2.01876 \times 10^{-6}$ | $A_8 = 9.60821 \times 10^{-8}$ | $A_8 = -7.68014 \times 10^{-6}$ |
| $A_{10} = -4.10348 \times 10^{-8}$ | $A_{10} = 8.16120 \times 10^{-8}$ | |
| $A_{12} = 3.54643 \times 10^{-10}$ | $A_{12} = -2.67099 \times 10^{-9}$ | |
| $A_{14} = 1.51903 \times 10^{-13}$ | $A_{14} = 6.59350 \times 10^{-12}$ | |
| $A_{16} = -1.41468 \times 10^{-14}$ | $A_{16} = 3.69631 \times 10^{-13}$ | |

8th surface $A_4 = 5.59183 \times 10^{-4}$
$A_6 = 5.54594 \times 10^{-5}$
$A_8 = -1.17581 \times 10^{-5}$ Embodiment 4

Figure 4:
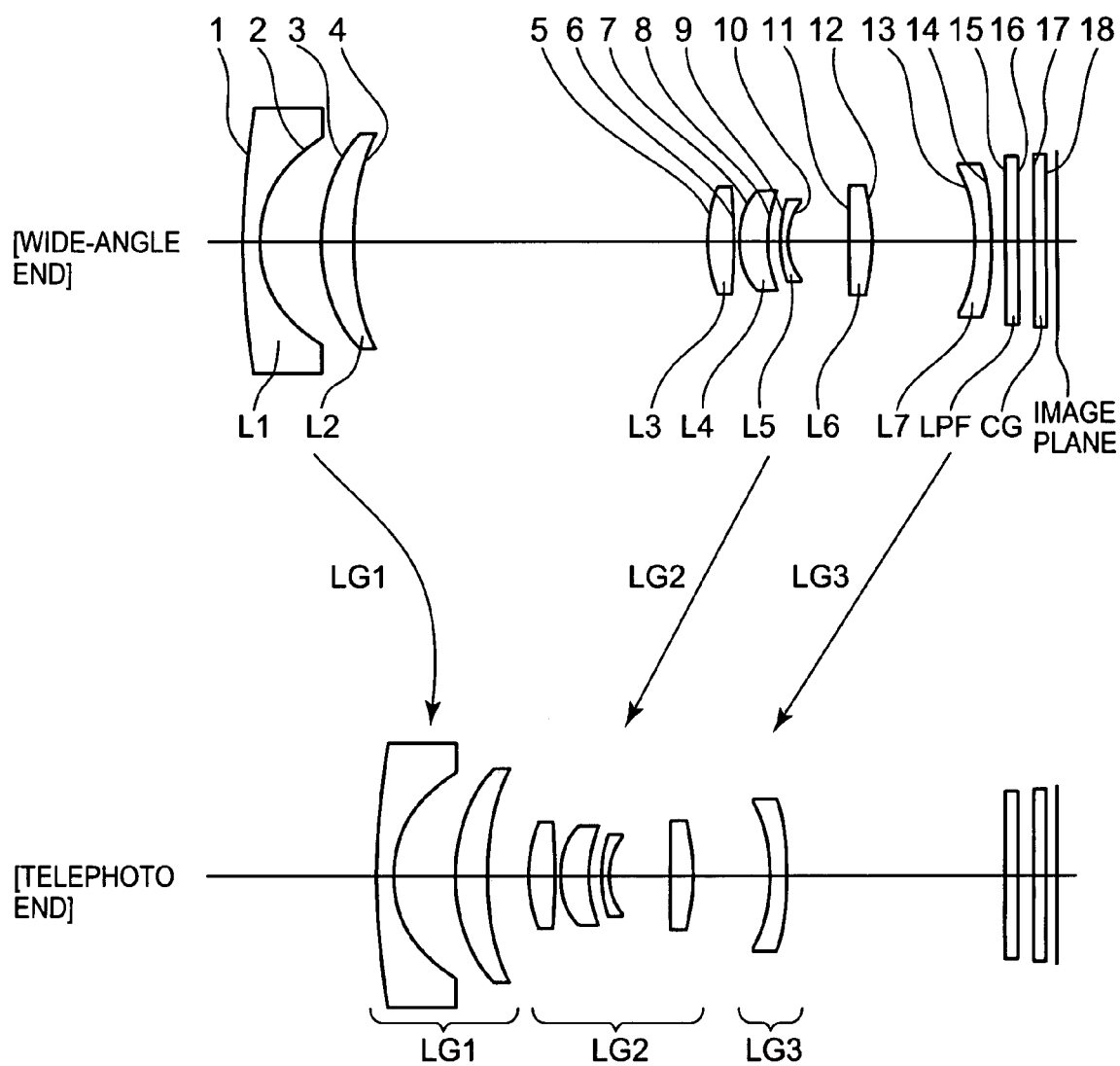
FIG. 4 is a diagram showing the configuration of lens elements of a fourth embodiment of a zoom lens of the invention.

A numerical example for a fourth embodiment of a zoom lens of the invention will be shown in Table 4. In addition, FIG. 4 is a diagram showing the configuration of lens elements of the zoom lens, and FIG. 11 is a diagram showing aberrations thereof.

TABLE 4

$f = 6.45\sim10.90\sim18.40$
$F_{no} = 2.88\sim3.74\sim5.23$
$2\omega = 73.15\sim45.17\sim27.43$

| Surface number | R | D | $N_d$ | $\nu_d$ |
|---|---|---|---|---|
| 1 | 72.507 | 0.72 | 1.82080 | 42.71 |
| 2 | 6.505 | 2.87 | — | — |
| 3 | 9.515 | 1.52 | 1.92110 | 22.40 |
| 4 | 15.050 | 17.10~7.64~2.14 | — | — |
| 5 | 8.796 | 1.27 | 1.51823 | 9.07 |
| 6 | −32.115 | 0.20 | — | — |
| 7 | 4.342 | 1.38 | 1.49700 | 81.61 |
| 8 | 8.547 | 0.58 | — | — |
| 9 | 6.356 | 0.40 | 2.00170 | 20.60 |
| 10 | 3.816 | 3.07 | — | — |
| 11 | −2288.032 | 1.05 | 1.59270 | 35.45 |
| 12 | −11.653 | 4.98~4.53~3.66 | — | — |
| 13 | −8.220 | 0.81 | 1.52470 | 56.24 |
| 14 | −17.776 | 0.63~4.19~10.62 | — | — |
| 15 | ∞ | 0.64 | 1.54892 | 69.76 |
| 16 | ∞ | 0.64 | — | — |
| 17 | ∞ | 0.64 | 1.51680 | 64.20 |
| 18 | ∞ | — | — | — | aspherical coefficients

| 1st surface | 2nd surface | 7th surface |
|---|---|---|
| $A_4 = 7.53079 \times 10^{-4}$ | $A_4 = 6.77286 \times 10^{-4}$ | $A_4 = -3.38376 \times 10^{-4}$ |
| $A_6 = -5.18867 \times 10^{-5}$ | $A_6 = -4.69717 \times 10^{-5}$ | $A_6 = 3.79659 \times 10^{-5}$ |
| $A_8 = 1.99029 \times 10^{-6}$ | $A_8 = 1.81168 \times 10^{-7}$ | $A_8 = -7.70822 \times 10^{-6}$ |
| $A_{10} = -4.00566 \times 10^{-8}$ | $A_{10} = 7.71077 \times 10^{-8}$ | |
| $A_{12} = 3.59164 \times 10^{-10}$ | $A_{12} = -2.60347 \times 10^{-9}$ | |
| $A_{14} = -2.76419 \times 10^{-13}$ | $A_{14} = 9.18770 \times 10^{-12}$ | |
| $A_{16} = -1.00919 \times 10^{-14}$ | $A_{16} = 3.63639 \times 10^{-13}$ | |

| 8th surface |
|---|
| $A_4 = 4.70401 \times 10^{-4}$ |
| $A_6 = 5.46777 \times 10^{-5}$ |
| $A_8 = -1.02995 \times 10^{-5}$ |

Embodiment 5

Figure 5:
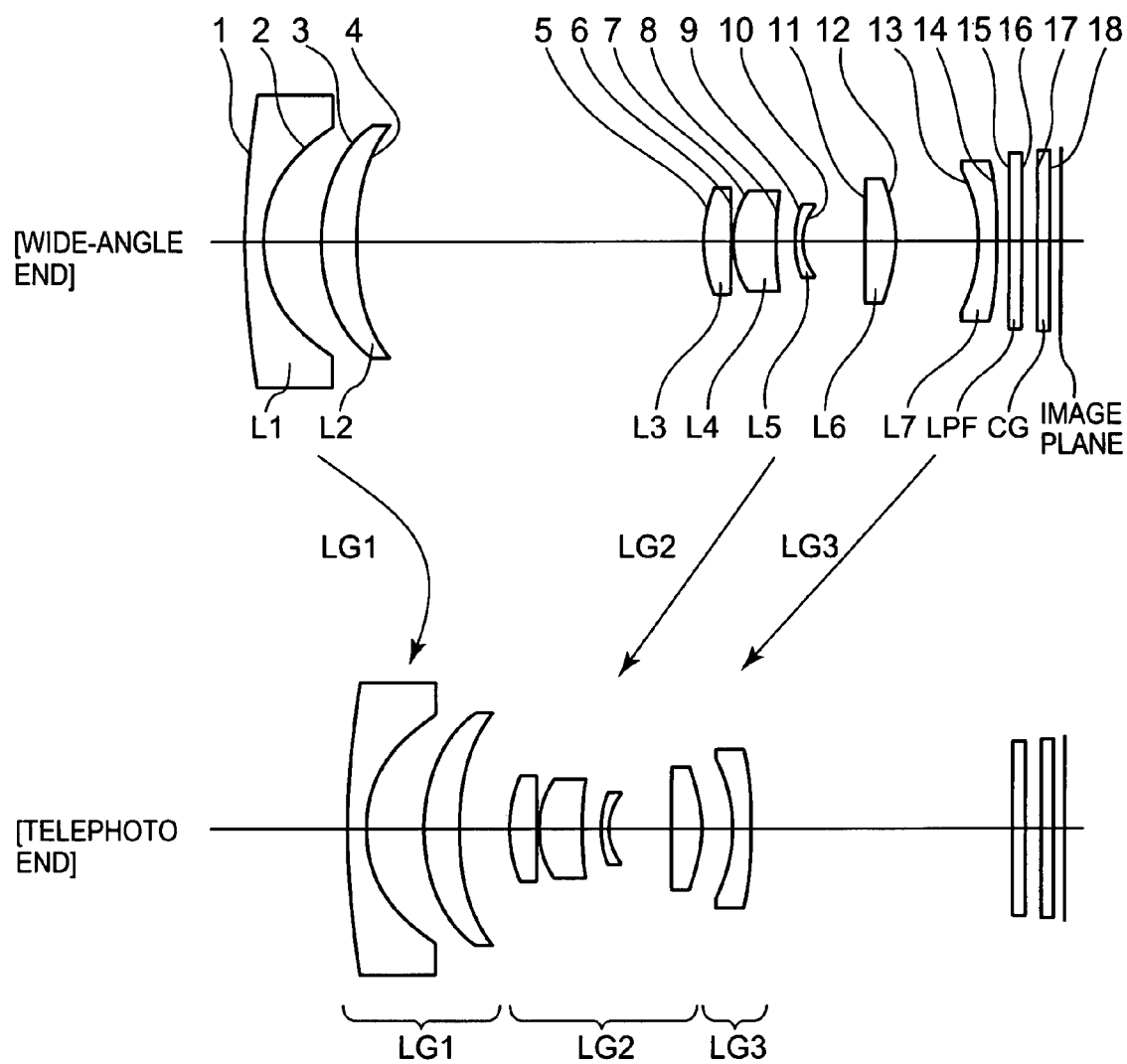
FIG. 5 is a diagram showing the configuration of lens elements of a fifth embodiment of a zoom lens of the invention.

A numerical example for a fifth embodiment of a zoom lens of the invention will be shown in Table 5. In addition, FIG. 5 is a diagram showing the configuration of lens elements of the zoom lens, and FIG. 12 is a diagram showing aberrations thereof.

TABLE 5

$f = 6.26\sim10.57\sim17.84$
$F_{no} = 2.88\sim3.87\sim5.49$
$2\omega = 74.82\sim46.73\sim28.30$

| Surface number | R | D | $N_d$ | $\nu_d$ |
|---|---|---|---|---|
| 1 | 43.530 | 0.72 | 1.76802 | 49.24 |
| 2 | 6.014 | 2.52 | — | — |
| 3 | 8.465 | 1.65 | 1.84666 | 23.78 |
| 4 | 12.740 | 15.27~7.35~2.34 | — | — |
| 5 | 8.642 | 1.20 | 1.49700 | 81.61 |
| 6 | 108.053 | 0.10 | — | — |
| 7 | 4.408 | 1.94 | 1.49700 | 81.61 |
| 8 | 31.203 | 0.81 | — | — |
| 9 | 5.627 | 0.40 | 2.13120 | 24.07 |
| 10 | 3.302 | 2.70 | — | — |
| 11 | 54.710 | 1.36 | 1.59270 | 35.45 |
| 12 | −7.874 | 3.64~2.34~1.29 | — | — |
| 13 | −7.408 | 0.80 | 1.52470 | 56.24 |
| 14 | −32.229 | 0.49~4.87~11.55 | — | — |
| 15 | ∞ | 0.64 | 1.54892 | 69.76 |
| 16 | ∞ | 0.64 | — | — |
| 17 | ∞ | 0.64 | 1.51680 | 64.20 |
| 18 | ∞ | — | — | — | aspherical coefficients

| 1st surface | 2nd surface | 7th surface |
|---|---|---|
| $A_4 = 4.03550 \times 10^{-4}$ | $A_4 = 1.71896 \times 10^{-4}$ | $A_4 = -6.92098 \times 10^{-4}$ |
| $A_6 = -4.28609 \times 10^{-5}$ | $A_6 = -4.49118 \times 10^{-5}$ | $A_6 = -1.58003 \times 10^{-5}$ |
| $A_8 = 1.76131 \times 10^{-6}$ | $A_8 = 2.78647 \times 10^{-7}$ | $A_8 = -7.71010 \times 10^{-6}$ |
| $A_{10} = -3.57512 \times 10^{-8}$ | $A_{10} = 3.78293 \times 10^{-8}$ | |
| $A_{12} = 3.82707 \times 10^{-10}$ | $A_{12} = -5.34599 \times 10^{-10}$ | |
| $A_{14} = -2.32540 \times 10^{-12}$ | $A_{14} = -2.23641 \times 10^{-11}$ | |
| $A_{16} = 9.28144 \times 10^{-15}$ | $A_{16} = 2.16889 \times 10^{-13}$ | |

| 8th surface | 13th surface |
|---|---|
| $A_4 = 3.40368 \times 10^{-4}$ | $A_4 = 4.72582 \times 10^{-4}$ |
| $A_6 = -4.36290 \times 10^{-5}$ | $A_6 = 3.48734 \times 10^{-5}$ |
| $A_8 = -6.64013 \times 10^{-6}$ | $A_8 = 1.29600 \times 10^{-6}$ |

Embodiment 6

Figure 6:
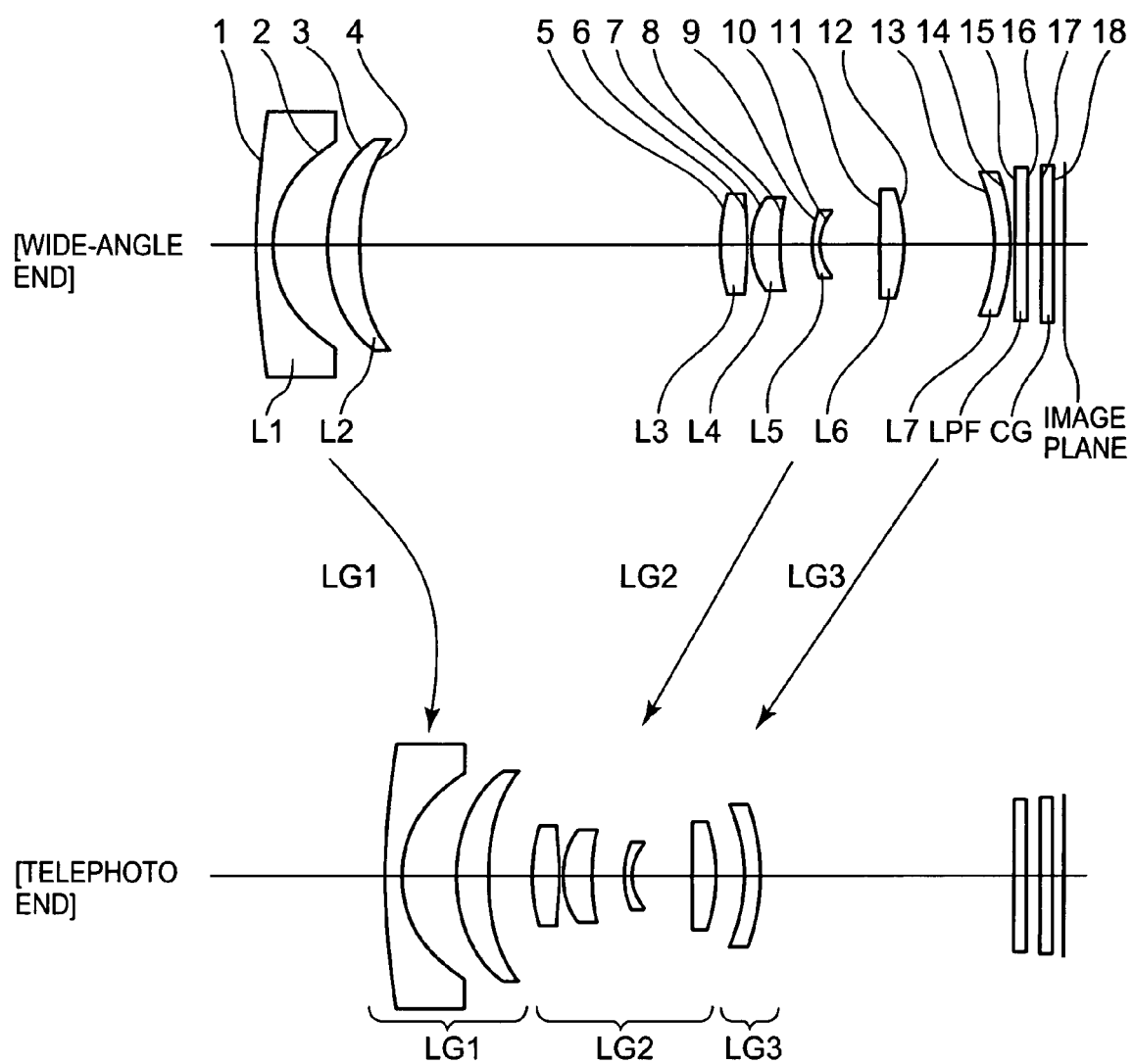
FIG. 6 is a diagram showing the configuration of lens elements of a sixth embodiment of a zoom lens of the invention.

A numerical example for a sixth embodiment of a zoom lens of the invention will be shown in Table 6. In addition, FIG. 6 is a diagram showing the configuration of lens elements of the zoom lens, and FIG. 13 is a diagram showing aberrations thereof.

TABLE 6

$f = 6.42\sim10.83\sim18.29$
$F_{no} = 2.88\sim3.75\sim5.20$
$2\omega = 73.48\sim45.87\sim27.67$

| Surface number | R | D | $N_d$ | $\nu_d$ |
|---|---|---|---|---|
| 1 | 52.417 | 0.92 | 1.76802 | 49.24 |
| 2 | 6.303 | 2.88 | — | — |
| 3 | 9.455 | 1.59 | 1.84666 | 23.78 |
| 4 | 14.273 | 18.63~8.44~2.37 | — | — |
| 5 | 11.440 | 1.33 | 1.49700 | 81.61 |
| 6 | −25.502 | 0.19 | — | — |
| 7 | 4.718 | 1.48 | 1.49700 | 81.61 |
| 8 | 13.738 | 1.66 | — | — |
| 9 | 6.285 | 0.40 | 2.13120 | 24.07 |
| 10 | 3.644 | 3.04 | — | — |
| 11 | 346.065 | 1.29 | 1.59270 | 35.45 |
| 12 | −9.809 | 4.66~3.26~1.49 | — | — |
| 13 | −9.661 | 0.80 | 1.52470 | 56.24 |
| 14 | −14.804 | 0.30~5.14~13.12 | — | — |
| 15 | ∞ | 0.64 | 1.54892 | 69.76 |
| 16 | ∞ | 0.64 | — | — |
| 17 | ∞ | 0.64 | 1.51680 | 64.20 |
| 18 | ∞ | — | — | — | aspherical coefficients

| 1st surface | 2nd surface | 7th surface |
|---|---|---|
| $A_4 = 5.82119 \times 10^{-4}$ | $A_4 = 4.45965 \times 10^{-4}$ | $A_4 = -3.04607 \times 10^{-4}$ |
| $A_6 = -4.79700 \times 10^{-5}$ | $A_6 = -5.38928 \times 10^{-5}$ | $A_6 = 9.29009 \times 10^{-6}$ |
| $A_8 = 1.76152 \times 10^{-6}$ | $A_8 = 7.06407 \times 10^{-7}$ | $A_8 = -5.01764 \times 10^{-6}$ |
| $A_{10} = -3.43656 \times 10^{-8}$ | $A_{10} = 1.97176 \times 10^{-8}$ | |
| $A_{12} = 3.81919 \times 10^{-10}$ | $A_{12} = -2.80994 \times 10^{-10}$ | |
| $A_{14} = -2.52692 \times 10^{-12}$ | $A_{14} = -1.52095 \times 10^{-11}$ | |
| $A_{16} = 9.15451 \times 10^{-15}$ | $A_{16} = 1.51461 \times 10^{-13}$ | |

| 8th surface | 13th surface |
|---|---|
| $A_4 = 2.65149 \times 10^{-4}$ | $A_4 = 4.09114 \times 10^{-4}$ |
| $A_6 = 1.45214 \times 10^{-6}$ | $A_6 = 1.48145 \times 10^{-5}$ |
| $A_8 = -4.72614 \times 10^{-6}$ | $A_8 = 5.58023 \times 10^{-7}$ |

Embodiment 7

Figure 7:
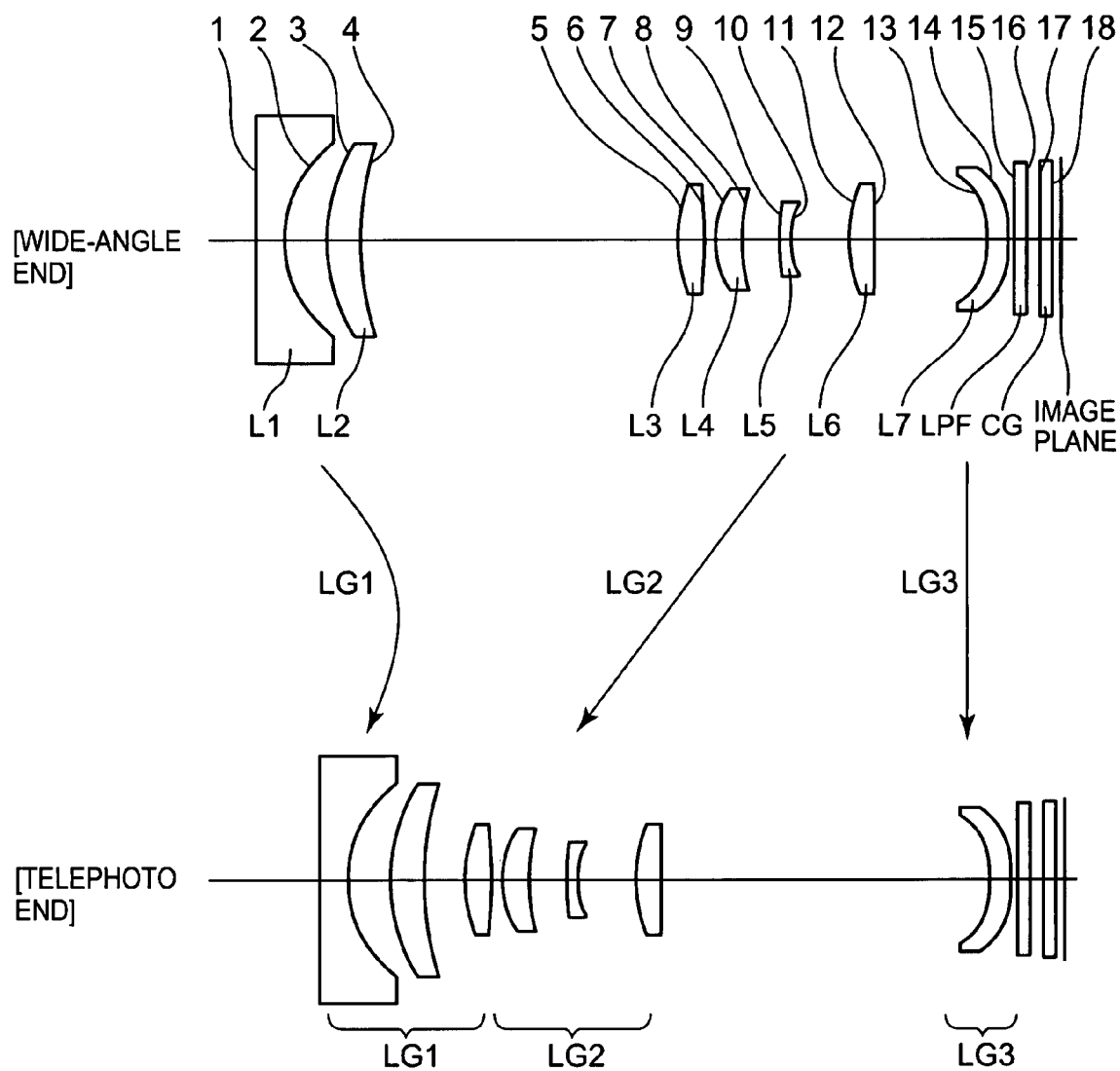
FIG. 7 is a diagram showing the configuration of lens elements of a seventh embodiment of a zoom lens of the invention.

A numerical example for a seventh embodiment of a zoom lens of the invention will be shown in Table 7. In addition, FIG. 7 is a diagram showing the configuration of lens elements of the zoom lens, and FIG. 14 is a diagram showing aberrations thereof.

TABLE 7 f = 6.44~10.87~18.35
$F_{no}$ = 2.88~3.77~5.27
2ω = 73.29~44.43~26.20

| Surface number | R | D | $N_d$ | $v_d$ |
|---|---|---|---|---|
| 1 | 113.121 | 1.45 | 1.80139 | 45.45 |
| 2 | 6.038 | 2.27 | — | — |
| 3 | 11.799 | 1.72 | 1.94595 | 17.98 |
| 4 | 19.351 | 16.10~7.19~1.90 | — | — |
| 5 | 8.335 | 1.41 | 1.49700 | 81.61 |
| 6 | −35.112 | 0.54 | — | — |
| 7 | 5.883 | 1.36 | 1.52250 | 62.30 |
| 8 | 11.725 | 1.88 | — | — |
| 9 | 12.132 | 0.61 | 2.00170 | 20.60 |
| 10 | 5.079 | 2.92 | — | — |
| 11 | 9.311 | 1.29 | 1.59270 | 35.45 |
| 12 | −58.051 | 5.74~9.78~16.68 | — | — |
| 13 | −19.713 | 1.06 | 1.52470 | 56.24 |
| 14 | −80.766 | 0.30 | — | — |
| 15 | ∞ | 0.64 | 1.54892 | 69.76 |
| 16 | ∞ | 0.64 | — | — |
| 17 | ∞ | 0.64 | 1.51680 | 64.20 |
| 18 | ∞ | — | — | — | aspherical coefficients

| 1st surface | 2nd surface | 7th surface |
|---|---|---|
| $A_4 = -1.89050 \times 10^{-4}$ | $A_4 = -6.90989 \times 10^{-4}$ | $A_4 = 2.51158 \times 10^{-5}$ |
| $A_6 = -6.33560 \times 10^{-6}$ | $A_6 = -2.27591 \times 10^{-5}$ | $A_6 = -1.02262 \times 10^{-5}$ |
| $A_8 = 5.48211 \times 10^{-7}$ | $A_8 = 9.80775 \times 10^{-7}$ | $A_8 = 9.35076 \times 10^{-8}$ |
| $A_{10} = -1.24422 \times 10^{-8}$ | $A_{10} = -1.60974 \times 10^{-8}$ | |
| $A_{12} = 9.66414 \times 10^{-11}$ | $A_{12} = -2.94067 \times 10^{-10}$ | |

| 8th surface | 13th surface | 14th surface |
|---|---|---|
| $A_4 = 6.17417 \times 10^{-4}$ | $A_4 = -9.48491 \times 10^{-3}$ | $A_4 = -9.35721 \times 10^{-3}$ |
| $A_6 = -1.06365 \times 10^{-5}$ | $A_6 = 3.79894 \times 10^{-4}$ | $A_6 = 4.15636 \times 10^{-4}$ |
| $A_8 = 6.94253 \times 10^{-7}$ | $A_8 = -1.24162 \times 10^{-5}$ | $A_8 = -9.30074 \times 10^{-6}$ |

Next, with respect to Embodiments 1 to 7, values corresponding to the conditional expressions (1) to (12) will altogether be shown in Table 8.

As is obvious from Table 8, the values in relation to each embodiment of Embodiments 1 to 7, in which the seven lens elements are divided into the three lens elements groups of the first lens elements group having the negative refraction power as a whole, the second lens elements group having the positive refraction power as a whole and the third lens element group having the negative refraction power as a whole, satisfy the conditional expressions (1) to (12), and as is obvious from the aberration diagrams of each embodiment, the individual aberrations are corrected properly.

Next, Embodiments 8 to 17 of the invention will be described by reference to specific numerical examples thereof.

In Embodiments 8 to 17 which will be described below, a zoom lens is made up by using six lens elements which are divided into three lens elements groups, which are, sequentially from an object side thereof, a first lens elements group LG1, a second lens elements group LG2 and a third lens element group LG3.

The first lens elements group LG1 has a negative refraction power as a whole and is made up by disposing a first lens element L1 (an object side surface of the first lens element L1 is to be referred to as a $1^{st}$ surface, and an image side surface as a $2^{nd}$ surface) which is a lens having a negative refraction power (hereinafter, referred to as a negative lens) and a second lens element L2 (an object side surface of the second lens element L2 is to be referred to as a $3^{rd}$ surface, and an image side surface as a $4^{th}$ surface) which is a lens having a positive refraction power (hereinafter, referred to as a positive lens).

The second lens element group LG2 has a positive refraction power as a whole and is made up by disposing a third lens element L3 (an object side surface of the third lens element L3 is to be referred to as a $5^{th}$ surface, and an image side surface as a $6^{th}$ surface) which is a positive lens, a fourth lens element L4 (an object side surface of the fourth lens element L4 is to be referred to as a $7^{th}$ surface, and an image side surface as an $8^{th}$ surface) which is a negative lens and a fifth lens element L5 (an object side surface of the fifth lens element L5 is to be referred to as a $9$th surface, and an image side surface as a $10^{th}$ surface) which is a positive lens.

The third lens element group LG3 has a negative refraction power as a whole and is made up by disposing a sixth lens element L6 (an object side surface of the sixth lens element L6 is referred to be as an $11^{th}$ surface and an image side surface as a $12^{th}$ surface) which is a negative lens. In addition, a crystal optical filter LPF (an object side surface of the

TABLE 8

| | Embodiment 1 | Embodiment 2 | Embodiment 3 | Embodiment 4 | Embodiment 5 | Embodiment 6 | Embodiment 7 |
|---|---|---|---|---|---|---|---|
| Conditional expression (1) | −0.50 | −0.53 | −0.44 | −0.43 | −0.41 | −0.43 | −0.55 |
| Conditional expression (2) | −0.14 | −0.07 | −0.18 | −0.22 | −0.34 | −0.11 | −0.13 |
| Conditional expression (3) | 6.34 | 6.33 | 5.90 | 5.97 | 5.68 | 6.48 | 6.35 |
| Conditional expression (4) | −0.75 | −0.83 | −0.74 | −0.74 | −0.68 | −0.68 | −0.80 |
| Conditional expression (5) | 32.52 | 25.46 | 25.46 | 20.31 | 25.46 | 25.46 | 27.47 |
| Conditional expression (6) | 1.18 | 1.16 | 1.04 | 0.99 | 1.04 | 1.02 | 1.07 |
| Conditional expression (7) | 0.82 | 0.85 | 0.91 | 0.88 | 0.93 | 0.86 | 0.77 |
| Conditional expression (8) | 36.35 | 35.73 | 57.54 | 49.66 | 57.54 | 57.54 | 51.35 |
| Conditional expression (9) | 1.55 | 1.55 | 1.50 | 1.51 | 1.50 | 1.50 | 1.51 |
| Conditional expression (10) | 0.69 | 0.72 | 0.80 | 0.73 | 0.72 | 0.56 | 0.77 |
| Conditional expression (11) | 1.12 | 1.20 | 1.74 | 1.69 | 1.90 | 1.76 | 1.27 |
| Conditional expression (12) | −0.88 | −0.54 | −0.68 | −0.79 | −0.85 | −0.66 | −0.33 | crystal optical filter LPF is to be referred to as a 13$^{th}$ surface, and an image side surface as a 14$^{th}$ surface) and a cover glass CG (an object side surface of the cover glass CG is to be referred to as a 15$^{th}$ surface, and an image side surface as a 16$^{th}$ surface) which is for protection of a photographic portion of a CCD are disposed within an air space defined between the image side surface, which is the 12$^{th}$ surface, of the sixth lens element L6 and an image plane.

The cutting of infrared rays which is normally required in handling an image sensor such as a CCD is understood to be implemented by applying an infrared reflection coating on to one side of refracting surfaces of the crystal optical filter LPF and, hence, is not illustrated.

A variable power is realized by shifting the positions of the first lens elements group LG1 and the second lens elements group LG2 in a direction of an optical axis of the zoom lens, or shifting, in addition to the first lens elements group LG1 and the second lens elements group LG2, the position of the third lens element group LG3.

In addition, in each embodiment, although a focal point adjustment for an object at a finite distance can be realized by shifting the position of the first lens elements group LG1 or the third lens element group LG3 in the direction of the optical axis, the implementation of focal point adjustment is not limited to the relevant method.

Furthermore, the shape of an aspheric surface used in each embodiment is defined by giving a paraxial radius of curvature: R, and high-order aspherical coefficients: $A_4$, $A_6$, $A_8$, $A_{10}$, ... (a high-order aspherical coefficient which is not described is to be treated as 0) on a curved surface that is obtained by rotating round the optical axis a curve given by an aspherical equation:

$$Z=Y^2/R \cdot [1+\sqrt{1-(Y/R)^2}]+A_4 \cdot Y^4+A_6 \cdot Y^6+A_8 \cdot Y^8+A_{10} \cdot Y^{10}+\dots$$

when letting an intersection point between the optical axis and the surface be an origin, the optical axis direction be the Z axis and a direction which intersects the optical axis at right angles be the Y axis.

In addition, this embodiment satisfies the following conditional expression (13) with respect to the power that the first lens elements group possesses, the following conditional expression (14) with respect to the power that the third lens element group possesses, and the following conditional expression (15) with respect to the size of the whole lens system.

$$-0.8 < f_w/f_I < -0.4 \quad (13)$$

$$-0.4 < f_w/f_{III} < 0 \quad (14)$$

$$4.5 < TL_w/f_w < 7.5 \quad (15)$$

where, $f_w$: composite focal length of the whole lens system at a wide-angle end $f_I$: composite focal length of the first lens elements group $f_{III}$: composite focal length of the third lens element group $TL_w$: distance from an object side surface of the first lens element making up the first lens elements group to an image plane at the wide-angle end (where, a parallel plane glass portion is converted into an air space distance).

The conditional expression (13) relates to a proper distribution of power to the first lens elements group which has the negative power.

As with the conditional expression (1) which has been described above, this conditional expression (13) constitutes a balance for a condition for proper correction of the size and aberrations of the whole optical system. In the event that a lower limit is surpassed, this means that the negative power of the first lens elements group is large, and in conjunction with this, the positive power of the second lens elements group has to be intensified, and it becomes difficult to keep a balance among the aberrations, whereby the performance is decreased. In contrast to this, in the event that an upper limit is surpassed, large air spaces to the second lens elements group having the positive power have to be taken, whereby the size of the whole optical system is enlarged, and as a result, the compactness is lost.

The conditional expression (14) is a conditional expression which is related to the power that the third lens element group possesses. As with the expression (2), it is a prime characteristic that it remains within the negative range, whereby a function is provided to cause the exit pupil of the optical system to approach the image plane side.

In general, the fact that the exit pupil is positioned in the proximity of the image plane is effective in making the zoom lens compact in such a way as to decrease the overall length thereof. On the contrary, this means that the telecentric characteristics on the periphery of the picture plane are collapsed. Namely, a principal ray of light passing through an image point on the periphery of the picture plane is angled, which is not good for an optical system which uses an image sensor such as a CCD.

Normally, in a zoom lens at a magnification of the order of 3×, the angle of a principal ray of light passing through an image point on the periphery of the picture plane is changed by an operation for variable power. Although it is natural that the amount of change differs depending on designs, in many cases, the amount of change in angle is nearly on the order of 10° or more at an image point of a maximum image height (for example, 10° at the wide-angle end, 0° at the telephoto end). In the case of a single focus lens which is free from change in angle of the principal ray of light, however, the change can exceed 20° by adapting the construction of a microlens of a CCD. In embodiments that will be described later on, assuming that the angle of a principal ray of light at the time of changing the magnification is small and that a bisector of an angle formed by an upper ray of light and a lower ray of light is defined as a principal light, the angle of the principal ray of light at a maximum image point on the picture plane is not more than on the order of 18°, and this can be dealt with by adapting the construction of the microlens of the CCD.

A lower limit value that is specified by the conditional expression of the conditional expression (14) is to be a range where the negative power of the third lens element group can be taken in that state, and in the event that the lower limit is surpassed, although it is effective in making the system compact, the angle of the principal ray of light exceeds 20°, and problems are caused of shading and insufficient quantity of light, whereby the high image quality required for a digital still camera or the like becomes unable to be maintained. On the contrary, when an upper limit is surpassed, it means that an optical system of a size results which does not have to be made compact by the application of the invention.

As with the conditional expression (3), the conditional expression (15) is such as to control the overall length of the zoom lens at the wide-angle end. Namely, this constitutes a condition which becomes a measure of reduction in size of the zoom lens of the invention. In the event that an upper limit is surpassed, although it becomes advantageous in correcting the aberrations, it becomes impossible to provide a compact zoom lens, which is the object of the invention. On the contrary, in the event that a lower limit is surpassed, the power of each lens element has to be increased, and this calls for deterioration in the aberrations, whereby the production of the object zoom lens becomes difficult in practice.

In addition, in this embodiment, at least one of the object side and image side surfaces of the first lens element which makes up the first lens elements group is an aspherical surface, and the embodiment satisfies the following conditional expression (16) with respect to the power of the same lens element, the following conditional expression (17) with respect to the chromatic dispersion properties that are distributed to each lens element of the first lens elements group, and the following conditional expression (18) with respect to the configuration of the object side surface of the first lens element.

$$-1.2 < f_w/f_1 < -0.7 \tag{16}$$

$$15 < \upsilon_1 - \upsilon_2 \tag{17}$$

$$0.7 < f_w/R_2 < 1.2 \tag{18}$$

where, $f_1$: focal length of the first lens element which makes up the first lens elements group $\upsilon_1$: Abbe number of the first lens element which makes up the first lens elements group $\upsilon_2$: Abbe number of the second lens element which makes up the first lens elements group $R_2$: paraxial radius of curvature of the object side surface of the first lens element which makes up the first lens elements group.

As with the conditional expression (4), the conditional expression (16) is such as to proper collect aberrations of the first lens elements group as a whole by controlling the focal length of the first lens element which makes up the first lens elements group. In the event that an upper limit is surpassed, the power of the first lens element becomes too small, an insufficient correction of chromatic aberration and curvature of field results. In the event that a lower limit is surpassed, the power of the first lens elements becomes too large, and in association with this, the power of the second lens element becomes too large. As a result, the radius of curvature of each surface becomes small, whereby high-order aberrations such as spherical aberration and coma aberration are produced, no good performance being thereby able to be obtained.

The conditional expression (17) relates to the distribution of Abbe numbers of the negative lenses and the positive lens which make up the first lens elements group. This is a conditional expression for properly maintaining the chromatic aberration correction for the first lens elements group, and a proper distribution of powers can be realized to enable a proper correction of chromatic aberration by implementing the selection of glass materials for the negative lenses and the positive lens which make up the first lens elements group based on a condition specified under the conditional expression (17). In the event that a lower limit is surpassed, the power of each lens becomes excessive in order to correct chromatic aberration, and the aberrations are deteriorated.

A basic configuration for suppressing the occurrence of off-axis aberrations such as coma aberration and distortion is realized by providing a concentric configuration relative to the entrance pupil under the strong negative power which is imparted to the first lens element, and the conditional expression (18) specifies a condition for realizing the relevant configuration.

Namely, the first lens element is formed into a meniscus configuration having the strong negative power. However, in the event that with the object side surface of the first lens element formed into an aspherical shape, a reduction in the overall length is implemented strongly, although the overall configuration can be said to take a meniscus configuration, when looking at a paraxial radius of curvature, there may occur a case where a resulting configuration constitutes a double-concave lens.

In the event that a lower limit of the conditional expression (18) is surpassed, the occurrence of coma aberration and distortion cannot be suppressed sufficiently. On the contrary, in the event that an upper limit is surpassed, although it is effective to suppress the occurrence of aberrations, the curvature of the shape of the meniscus negative lens becomes excessive, and the production of the lens becomes difficult. In addition, in order to correct effectively off-axis aberrations such as astigmatism and distortion, it is better to form the image side surface of the first lens element into an aspherical surface shape, and as this occurs, although as aspherical surfaces to be manufactured, a glass molded aspherical surface, a composite aspherical surface with a resin material and the like are preferred, there is no specific limitation on the method for manufacturing the aspherical surface.

Furthermore, this embodiment satisfies the following conditional expression (19) with respect to the power that the third lens element which makes up the second lens elements group possesses, the following conditional expression (20) with respect to the chromatic dispersion properties that are distributed to each lens element of the second lens elements group, the following conditional expression (21) with respect to the relationship with the refractive index that the third lens element possesses, the following conditional expression (22) with respect to the configuration of the object side surface of the third lens element, and the following conditional expression (23) with respect to a relationship between the configuration of the object side surface of the third lens element and the configuration of the image side surface of the fifth lens element.

$$0.7 < f_w/f_3 < 1.2 \tag{19}$$

$$25 < \upsilon_3 - \upsilon_4 \tag{20}$$

$$n_3 < 1.7 \tag{21}$$

$$0.7 < f_w/R_5 < 1.3 \tag{22}$$

$$-1.6 < R_5/R_{10} < -0.8 \tag{23}$$

where, $f_3$: composite focal length of the third lens element and the fourth lens element which make up the second lens elements group $\upsilon_3$: Abbe number of the third lens element which makes up the second lens elements group $\upsilon_4$: Abbe number of the fourth lens element which makes up the second lens elements group $n_3$: refractive index relative to the d line of the third lens element which makes up the second lens elements group $R_5$: paraxial radius of curvature of the object side surface of the third lens element which makes up the second lens elements group $R_{10}$: paraxial radius of curvature of the image side surface of the fifth lens element which makes up the second lens elements group.

The conditional expression (19) relates to the third lens element which is disposed closest to the object side in the second lens elements group and which has the strong positive power.

The conditional expression (19) provides a condition for imparting a large positive power for collecting rays of light which diverge from the first lens elements group and correcting properly the aberrations. In the event that an upper limit is surpassed, the positive power becomes excessive, and at the same time, the spherical aberration is corrected insufficiently, whereas in the event that a lower limit is surpassed, the positive power for collecting light rays from the first lens elements group becomes insufficient, and an excessive correction of spherical aberration results. In either of the cases, however, in addition to spherical aberration, the off-axis aberration such as coma aberration and chromatic aberration are largely affected.

The conditional expression (20) relates to the distribution of Abbe numbers of the positive lens and the negative lens which are disposed on the object side in the second lens elements group so as to be used in a portion which keeps a balance of aberrations while having a strong positive power for collecting rays of light which diverge from the first lens elements group.

In this case, although the fifth lens element, which also makes up the second lens elements group, has a relatively large positive power, the magnitude of the power is such as to be determined in many cases by a balance with the negative power of the third lens element group, and therefore, the conditional expression (20) is made to limit the distribution of Abbe numbers of the third lens element which is the positive lens and the fourth lens element which is the negative lens. The conditional expression (20) specifies a condition for keeping a balance with the aberrations while correcting properly the chromatic aberration of the whole lens system, and in the event that a lower limit is surpassed, the power of each lens element has to be increased so as to correct chromatic aberration, which constitutes a disadvantageous condition for correcting spherical aberration and coma aberration.

The conditional expression (21) relates to the correction of curvature of field in the second lens elements group. In order to balance a negative Petzval sum produced from the first lens elements group, the refractive index of each lens element needs to be a value which falls within a range specified by a condition presented by the relevant expression. In the event that an upper limit is surpassed, the Petzval sum becomes too small, and the correction of curvature of field becomes excessive.

The conditional expression (22) is a conditional expression in relation to the configuration of the object side surface of the third lens element. Since the object side surface of the third lens element is disposed right behind an aperture stop, the relevant surface plays an important role in correcting spherical aberration. The conditional expression (22) specifies a condition for properly correcting spherical aberration in connection with the negative power of the first lens elements group. In the event that an upper limit of the conditional expression (22) is surpassed, although off-axis aberrations such as coma aberration and astigmatism get easy to be corrected, an insufficient correction of spherical aberration results. On the contrary, in the event that a lower limit is surpassed, an excessive correction of spherical aberration results, and at the same time, a proper correction of the off-axis aberrations becomes difficult.

The conditional expression (23) specifies a condition for correcting spherical aberration and the other aberrations in a well-balanced fashion together with the conditional expression (22). In the event that an upper limit is surpassed, the correction of the aberrations becomes difficult, and on the contrary, in the event that a lower limit is surpassed, a proper correction of spherical aberration becomes unable to be implemented.

In addition, this embodiment satisfies the following conditional expression (24) with respect to the configuration of the object side surface of the sixth lens element which makes up the third lens element group.

$$-1.5 < f_w/R_{11} < 0 \tag{24}$$

where, $R_{11}$: paraxial radius of curvature of the object side surface of the sixth lens element which makes up the third lens element group.

The conditional expression (24) is a conditional expression which relates to the configuration of the object side surface of the sixth lens element which makes up the third lens element group.

In order to cause rays of light converging from the second lens elements group to focus on an image plane with production of little aberration, basically, the configuration of the sixth lens element is preferably formed into a concentric shape relative to the second lens elements group. Consequently, it is preferable that $R_{11}$ basically takes a negative value. In the event that $R_{11}$ exceeds an upper limit to become a positive value, the peripheral shape is also changed from the concentric shape, whereby aberrations such as comma aberration and distortion are produced. In the event that a lower limit is surpassed, the Petzval sum by $R_{11}$ becomes too large on the negative side, and the angle of an emerging ray of light also becomes excessive.

Embodiment 8

Figure 15:
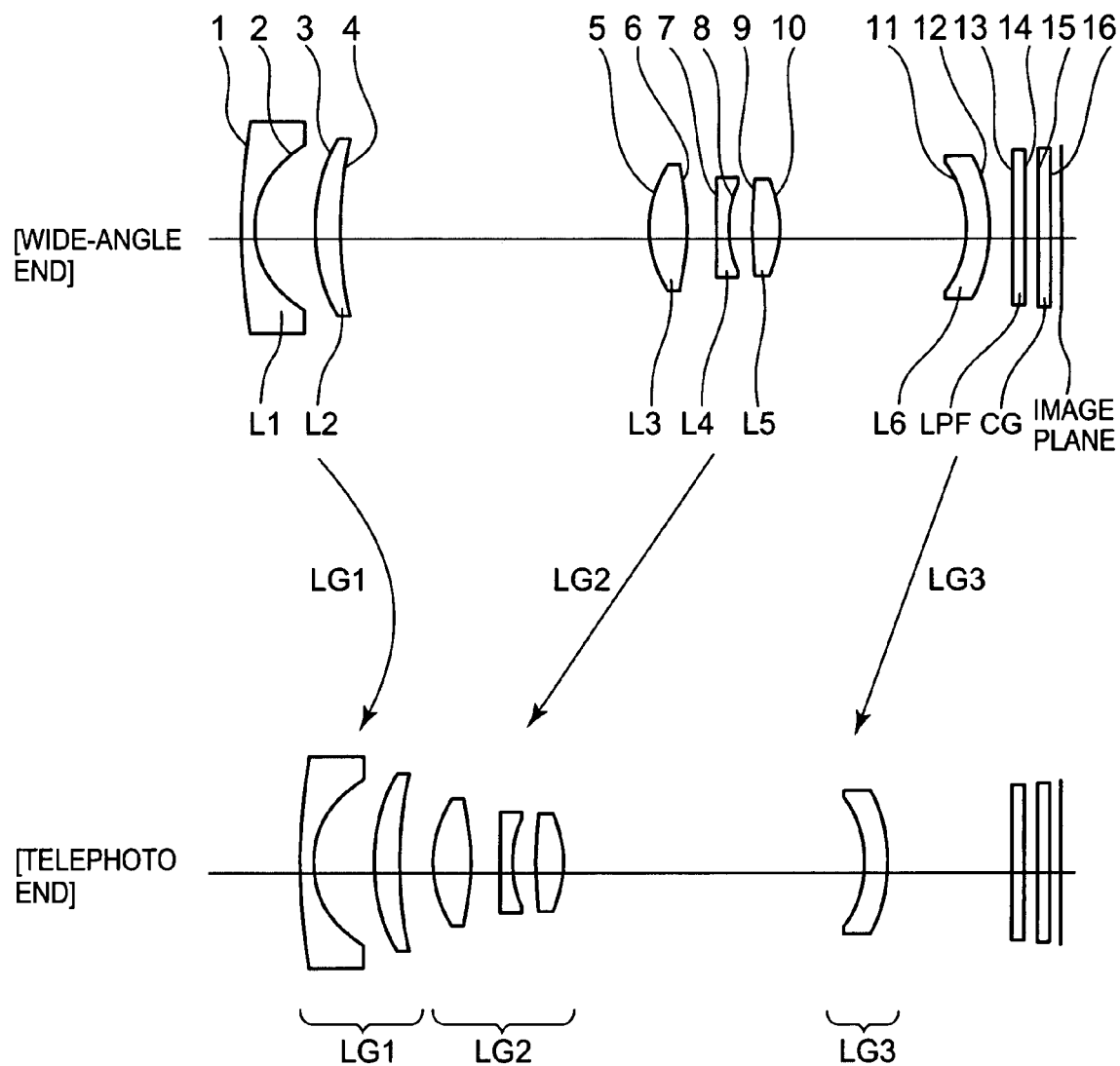
FIG. 15 is a diagram showing the configuration of lens elements of an eighth embodiment of a zoom lens of the invention.

A numerical example for an eighth embodiment of a zoom lens of the invention will be shown in Table 9. In addition, FIG. 15 is a diagram showing the configuration of lens elements of the zoom lens, and FIG. 25 is a diagram showing aberrations thereof. In the table and figures, f denotes the focal length of a whole lens system (hereinafter, values shown therein are from the left-hand side values at a wide-angle end, intermediate area and telephoto end), $F_{no}$ f number, and $2\omega$ total angle of view of lens. In addition, R denotes radius of curvature, D lens element thickness or lens element space, $N_d$ refractive index of d line, and $\upsilon_d$ Abbe number of d line. In diagrams showing aberrations, d, g, C in diagrams showing spherical aberrations denote aberration curves in individual wavelengths. In astigmatism diagrams, S denotes sagital, and M denotes meridional.

TABLE 9 f = 6.62~11.19~18.90
$F_{no}$ = 2.85~3.74~5.29
$2\omega$ = 71.16~44.16~26.66

| Surface number | R | D | $N_d$ | $\nu_d$ |
|---|---|---|---|---|
| 1 | 75.263 | 0.72 | 1.85049 | 40.21 |
| 2 | 5.304 | 2.89 | — | — |
| 3 | 11.037 | 1.33 | 1.92286 | 20.88 |
| 4 | 22.921 | 15.57~6.68~1.64 | — | — |
| 5 | 6.056 | 1.97 | 1.58313 | 59.46 |
| 6 | −14.562 | 1.51 | — | — |
| 7 | −40.942 | 0.65 | 2.08160 | 30.38 |

TABLE 9-continued

| | | | | |
|---|---|---|---|---|
| 8 | 7.514 | 1.11 | — | — |
| 9 | 17.170 | 1.47 | 1.51680 | 64.20 |
| 10 | −6.359 | 9.36~12.22~15.13 | — | — |
| 11 | −6.831 | 1.20 | 1.71300 | 53.93 |
| 12 | −8.857 | 1.20~2.49~6.50 | — | — |
| 13 | ∞ | 0.64 | 1.54892 | 69.76 |
| 14 | ∞ | 0.64 | — | — |
| 15 | ∞ | 0.64 | 1.51680 | 64.20 |
| 16 | ∞ | — | — | — | aspherical coefficients

| 1st surface | 2nd surface | 5th surface | 6th surface |
|---|---|---|---|
| $A_4 = 4.21565 \times 10^{-4}$ | $A_4 = -1.36193 \times 10^{-4}$ | $A_4 = -3.76131 \times 10^{-4}$ | $A_4 = 7.93462 \times 10^{-4}$ |
| $A_6 = -3.66521 \times 10^{-5}$ | $A_6 = -3.26318 \times 10^{-5}$ | $A_6 = 1.04338 \times 10^{-6}$ | $A_6 = -2.04533 \times 10^{-5}$ |
| $A_8 = 1.77718 \times 10^{-6}$ | $A_8 = -1.51487 \times 10^{-6}$ | $A_8 = -1.32451 \times 10^{-6}$ | $A_8 = 1.23822 \times 10^{-6}$ |
| $A_{10} = -4.17073 \times 10^{-8}$ | $A_{10} = 1.60795 \times 10^{-7}$ | $A_{10} = 1.15003 \times 10^{-7}$ | $A_{10} = 2.56047 \times 10^{-8}$ |
| $A_{12} = 3.60991 \times 10^{-10}$ | $A_{12} = -5.28946 \times 10^{-9}$ | | |

Embodiment 9

Figure 16:
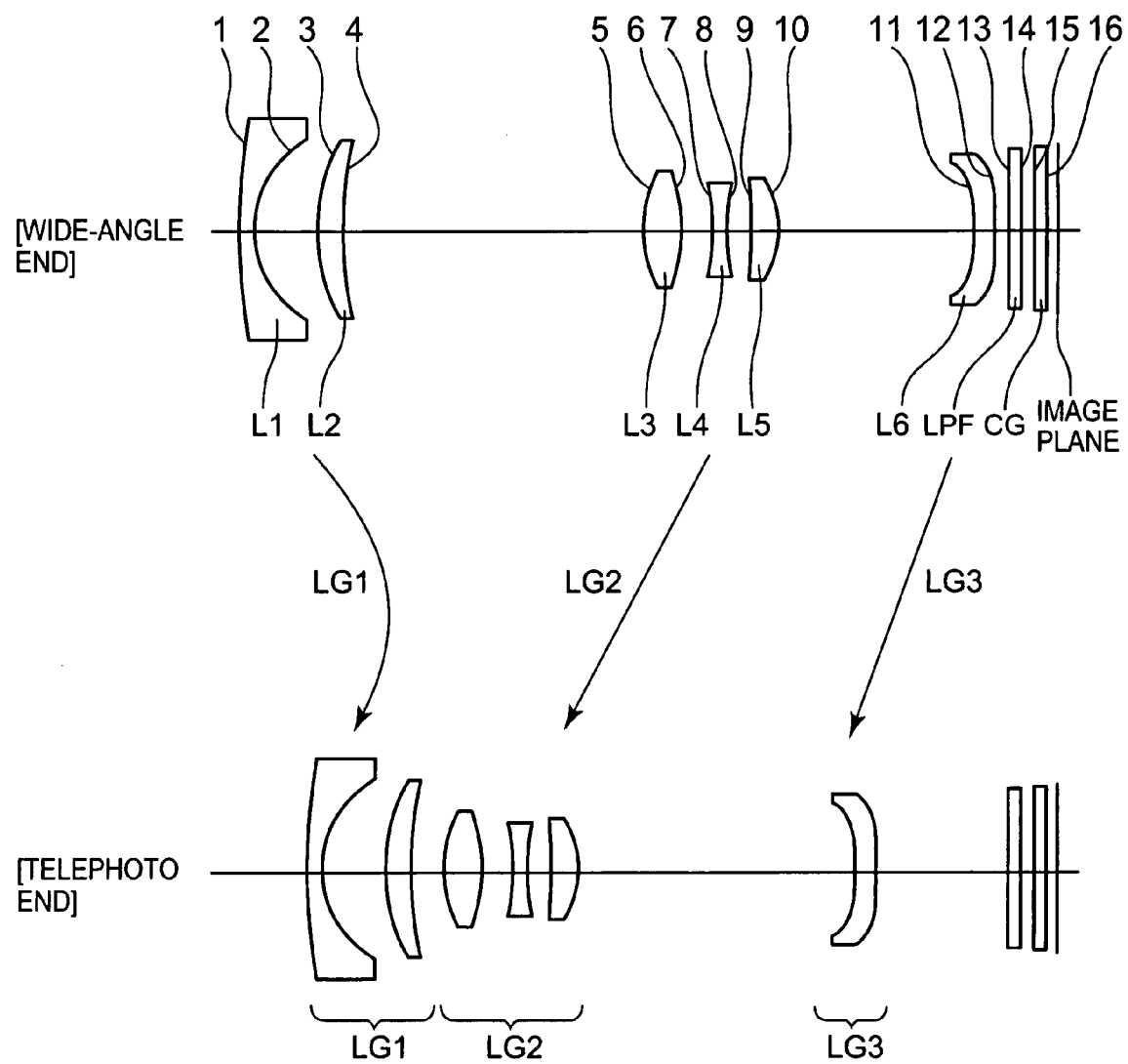
FIG. 16 is a diagram showing the configuration of lens elements of a ninth embodiment of a zoom lens of the invention.

A numerical example for a ninth embodiment of a zoom lens of the invention will be shown in Table 10. In addition, FIG. 16 is a diagram showing the configuration of lens elements of the zoom lens, and FIG. 26 is a diagram showing aberrations thereof.

TABLE 10 f = 6.53~10.93~18.45
$F_{no}$ = 2.85~3.76~5.29
2ω = 72.13~45.57~27.95

| Surface number | R | D | $N_d$ | $v_d$ |
|---|---|---|---|---|
| 1 | 52.210 | 0.81 | 1.80139 | 45.45 |
| 2 | 5.323 | 2.92 | — | — |
| 3 | 10.398 | 1.23 | 1.92286 | 20.88 |
| 4 | 17.169 | 14.78~6.63~1.78 | — | — |
| 5 | 6.928 | 1.89 | 1.51760 | 63.50 |
| 6 | −8.203 | 1.43 | — | — |
| 7 | −15.732 | 0.70 | 2.08160 | 30.38 |
| 8 | 15.808 | 1.18 | — | — |
| 9 | −133.897 | 1.38 | 1.51680 | 64.20 |
| 10 | −5.660 | 9.52~11.16~13.59 | — | — |
| 11 | −31.963 | 1.04 | 1.52470 | 56.24 |
| 12 | 35.283 | 0.70~2.89~6.50 | — | — |
| 13 | ∞ | 0.64 | 1.54892 | 69.76 |
| 14 | ∞ | 0.64 | — | — |
| 15 | ∞ | 0.64 | 1.51680 | 64.20 |
| 16 | ∞ | — | — | — | aspherical coefficients

| 1st surface | 2nd surface | 5th surface |
|---|---|---|
| $A_4 = 3.02942 \times 10^{-4}$ | $A_4 = -1.54498 \times 10^{-4}$ | $A_4 = -5.94312 \times 10^{-4}$ |
| $A_6 = -3.00990 \times 10^{-5}$ | $A_6 = -4.46063 \times 10^{-5}$ | $A_6 = -9.72739 \times 10^{-6}$ |
| $A_8 = 1.43889 \times 10^{-6}$ | $A_8 = 4.82735 \times 10^{-7}$ | $A_8 = -7.06681 \times 10^{-8}$ |
| $A_{10} = -3.42698 \times 10^{-8}$ | $A_{10} = 2.81792 \times 10^{-8}$ | |
| $A_{12} = 3.23206 \times 10^{-10}$ | $A_{12} = -2.11114 \times 10^{-9}$ | |

| 6th surface | 11th surface | 12th surface |
|---|---|---|
| $A_4 = 1.00871 \times 10^{-3}$ | $A_4 = -3.77675 \times 10^{-3}$ | $A_4 = -4.07753 \times 10^{-3}$ |
| $A_6 = -1.69432 \times 10^{-5}$ | $A_6 = -3.62119 \times 10^{-4}$ | $A_6 = -1.25352 \times 10^{-5}$ |
| $A_8 = 5.21266 \times 10^{-7}$ | $A_8 = 4.95996 \times 10^{-5}$ | $A_8 = 2.22991 \times 10^{-5}$ |
| | $A_{10} = -2.90994 \times 10^{-6}$ | $A_{10} = -1.21112 \times 10^{-6}$ |
| | $A_{12} = 4.60355 \times 10^{-8}$ | $A_{12} = 2.00459 \times 10^{-8}$ |

Embodiment 10

Figure 17:
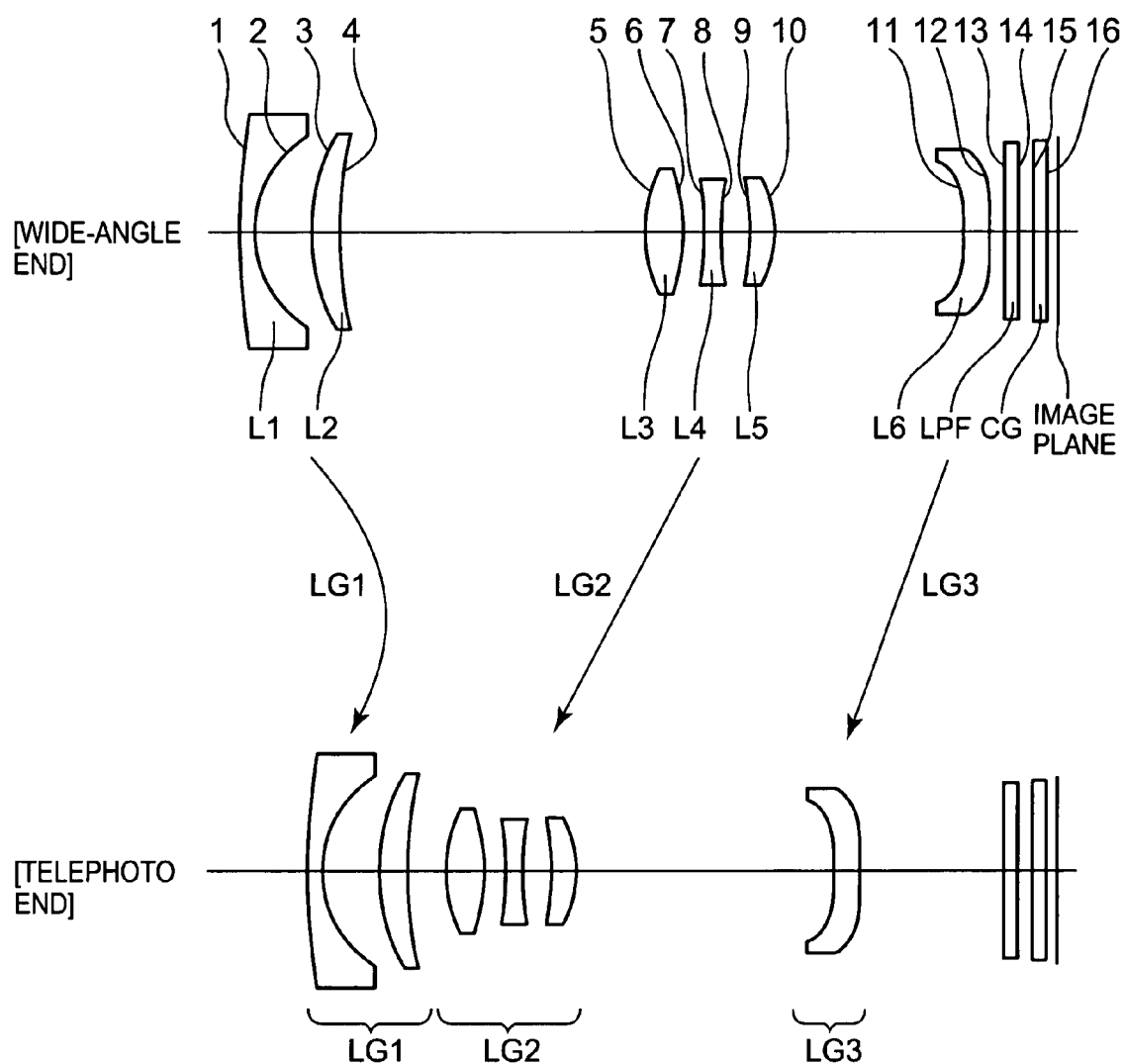
FIG. 17 is a diagram showing the configuration of lens elements of a tenth embodiment of a zoom lens of the invention.

A numerical example for a 10th embodiment of a zoom lens of the invention will be shown in Table 11. In addition, FIG. 17 is a diagram showing the configuration of lens elements of the zoom lens, and FIG. 27 is a diagram showing aberrations thereof.

TABLE 11 f = 6.45~10.90~18.42
$F_{no}$ = 2.85~3.76~5.29
2ω = 72.33~45.75~28.01

| Surface number | R | D | $N_d$ | $v_d$ |
|---|---|---|---|---|
| 1 | 59.258 | 0.72 | 1.80139 | 45.45 |
| 2 | 5.216 | 2.45 | — | — |
| 3 | 9.915 | 1.28 | 1.92286 | 20.88 |
| 4 | 17.609 | 13.90~6.26~1.73 | — | — |
| 5 | 7.164 | 1.69 | 1.58913 | 61.25 |
| 6 | −9.464 | 0.92 | — | — |
| 7 | −34.467 | 0.80 | 2.13120 | 24.07 |
| 8 | 16.897 | 1.33 | — | — |
| 9 | −14.834 | 1.10 | 1.51742 | 52.15 |
| 10 | −5.805 | 8.57~9.90~11.84 | — | — |
| 11 | −23.368 | 1.20 | 1.52470 | 56.24 |
| 12 | 46.491 | 0.63~2.81~6.45 | — | — |
| 13 | ∞ | 0.64 | 1.54892 | 69.76 |
| 14 | ∞ | 0.64 | — | — |
| 15 | ∞ | 0.64 | 1.51680 | 64.20 |
| 16 | ∞ | — | — | — | aspherical coefficients

| 1st surface | 2nd surface | 5th surface |
|---|---|---|
| $A_4 = 3.33185 \times 10^{-4}$ | $A_4 = -1.60643 \times 10^{-4}$ | $A_4 = -5.93994 \times 10^{-4}$ |
| $A_6 = -3.54969 \times 10^{-5}$ | $A_6 = -4.86767 \times 10^{-5}$ | $A_6 = -4.98541 \times 10^{-7}$ |
| $A_8 = 1.86155 \times 10^{-6}$ | $A_8 = 4.42639 \times 10^{-7}$ | $A_8 = -1.05538 \times 10^{-6}$ |
| $A_{10} = -4.76135 \times 10^{-8}$ | $A_{10} = 5.19059 \times 10^{-8}$ | |
| $A_{12} = 4.68226 \times 10^{-10}$ | $A_{12} = -3.29738 \times 10^{-9}$ | |

| 6th surface | 11th surface | 12th surface |
|---|---|---|
| $A_4 = 8.23760 \times 10^{-4}$ | $A_4 = -4.54342 \times 10^{-3}$ | $A_4 = -4.59875 \times 10^{-3}$ |
| $A_6 = -7.48955 \times 10^{-6}$ | $A_6 = -3.60294 \times 10^{-4}$ | $A_6 = -8.97768 \times 10^{-5}$ |
| $A_8 = -4.89696 \times 10^{-7}$ | $A_8 = 4.48171 \times 10^{-5}$ | $A_8 = 1.87360 \times 10^{-5}$ |
| | $A_{10} = -2.46782 \times 10^{-6}$ | $A_{10} = -1.15922 \times 10^{-6}$ |
| | $A_{12} = -2.02339 \times 10^{-8}$ | $A_{12} = -1.73283 \times 10^{-8}$ |

Embodiment 11

Figure 18:
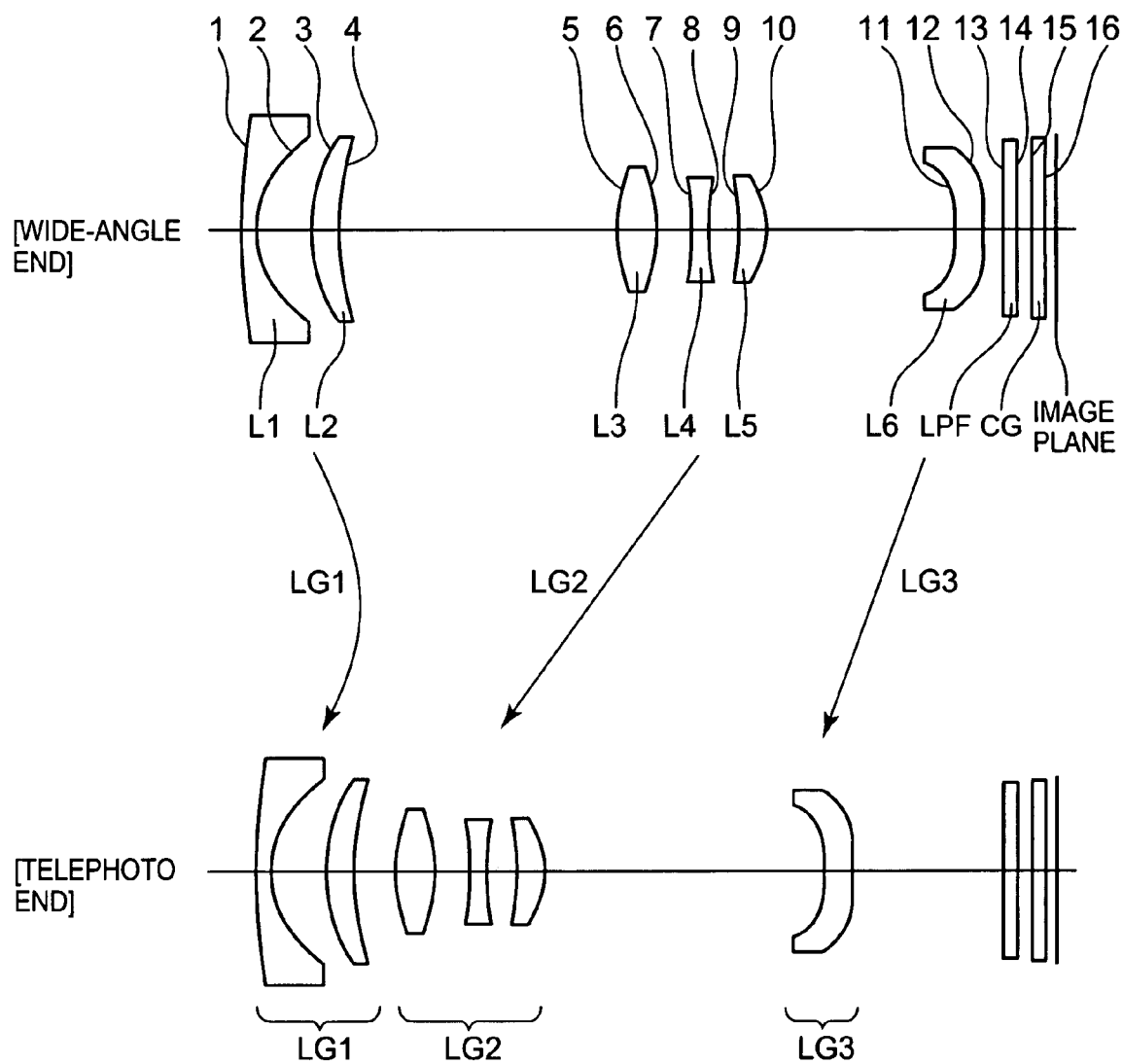
FIG. 18 is a diagram showing the configuration of lens elements of an 11th embodiment of a zoom lens of the invention.

A numerical example for an 11th embodiment of a zoom lens of the invention will be shown in Table 12. In addition, FIG. 18 is a diagram showing the configuration of lens elements of the zoom lens, and FIG. 28 is a diagram showing aberrations thereof.

TABLE 12

| | f = 6.53~11.03~18.62 | | | |
| | $F_{no}$ = 2.85~3.87~5.54 | | | |
| | 2ω = 71.57~45.86~28.27 | | | |
| Surface number | R | D | $N_d$ | $v_d$ |
| --- | --- | --- | --- | --- |
| 1 | 43.555 | 0.72 | 1.82080 | 42.71 |
| 2 | 4.963 | 2.29 | — | — |
| 3 | 9.306 | 1.16 | 1.94595 | 17.98 |
| 4 | 14.402 | 11.87~5.64~1.76 | — | — |
| 5 | 7.337 | 1.82 | 1.52250 | 62.30 |
| 6 | −6.921 | 1.42 | — | — |
| 7 | −14.459 | 0.79 | 2.13120 | 24.07 |
| 8 | 34.369 | 1.24 | — | — |
| 9 | −16.691 | 1.21 | 1.53172 | 48.87 |
| 10 | −5.203 | 8.08~9.40~11.87 | — | — |
| 11 | −18.207 | 1.20 | 1.52470 | 56.24 |
| 12 | 34.022 | 0.78~3.20~6.50 | — | — |
| 13 | ∞ | 0.64 | 1.54892 | 69.76 |
| 14 | ∞ | 0.64 | — | — |
| 15 | ∞ | 0.64 | 1.51680 | 64.20 |
| 16 | ∞ | — | — | — |

| aspherical coefficients | | |
| --- | --- | --- |
| 1st surface | 2nd surface | 5th surface |
| $A_4 = 4.13083 \times 10^{-4}$ | $A_4 = -1.20860 \times 10^{-4}$ | $A_4 = -8.35685 \times 10^{-4}$ |
| $A_6 = -4.83873 \times 10^{-5}$ | $A_6 = -7.21766 \times 10^{-5}$ | $A_6 = -2.88843 \times 10^{-5}$ |
| $A_8 = 2.33841 \times 10^{-6}$ | $A_8 = 5.59379 \times 10^{-7}$ | $A_8 = 2.78967 \times 10^{-7}$ |
| $A_{10} = -5.78318 \times 10^{-8}$ | $A_{10} = 6.10667 \times 10^{-8}$ | $A_{10} = 4.62620 \times 10^{-8}$ |
| $A_{12} = 6.12140 \times 10^{-10}$ | $A_{12} = -3.89134 \times 10^{-9}$ | |
| 6th surface | 11th surface | 12th surface |
| $A_4 = 1.12264 \times 10^{-3}$ | $A_4 = -6.37919 \times 10^{-3}$ | $A_4 = -7.30892 \times 10^{-3}$ |
| $A_6 = -3.69323 \times 10^{-5}$ | $A_6 = -8.68521 \times 10^{-4}$ | $A_6 = -2.10278 \times 10^{-5}$ |
| $A_8 = 2.07708 \times 10^{-6}$ | $A_8 = 1.75763 \times 10^{-4}$ | $A_8 = 2.87743 \times 10^{-5}$ |
| | $A_{10} = -1.81334 \times 10^{-5}$ | $A_{10} = -2.65878 \times 10^{-6}$ |
| | $A_{12} = 6.69964 \times 10^{-7}$ | $A_{12} = 7.84503 \times 10^{-8}$ |

Embodiment 12

Figure 19:
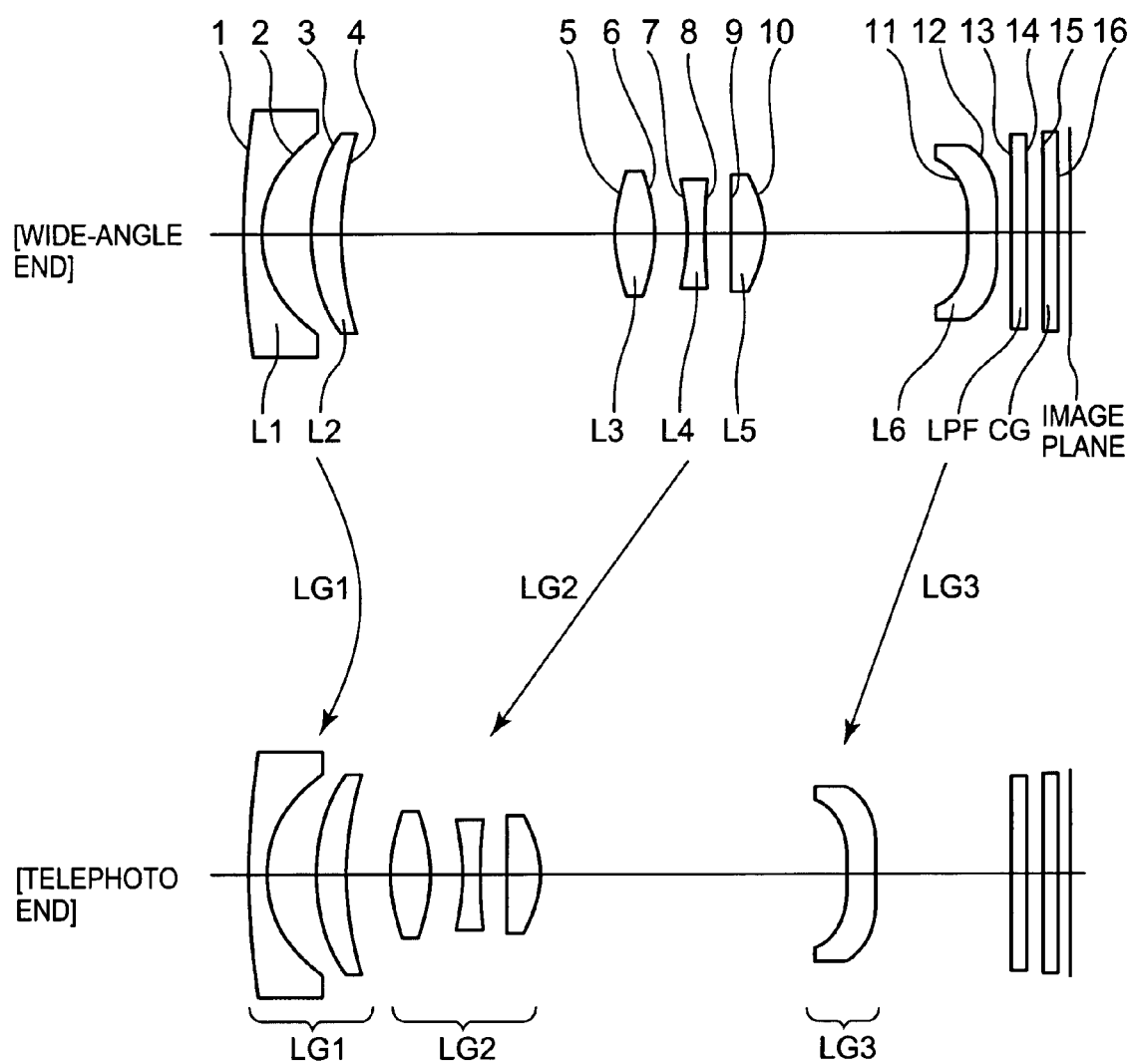
FIG. 19 is a diagram showing the configuration of lens elements of a 12th embodiment of a zoom lens of the invention.

A numerical example for a 12th embodiment of a zoom lens of the invention will be shown in Table 13. In addition, FIG. 19 is a diagram showing the configuration of lens elements of the zoom lens, and FIG. 29 is a diagram showing aberrations thereof.

TABLE 13

| | f = 6.19~10.44~17.64 | | | |
| | $F_{no}$ = 2.85~3.85~5.51 | | | |
| | 2ω = 74.36~48.01~29.89 | | | |
| Surface number | R | D | $N_d$ | $v_d$ |
| --- | --- | --- | --- | --- |
| 1 | 61.016 | 0.72 | 1.82080 | 42.71 |
| 2 | 4.806 | 1.93 | — | — |
| 3 | 8.460 | 1.22 | 1.94595 | 17.98 |
| 4 | 13.072 | 11.16~5.33~1.78 | — | — |
| 5 | 7.706 | 1.64 | 1.59240 | 68.30 |
| 6 | −7.637 | 1.28 | — | — |
| 7 | −10.719 | 0.76 | 2.08160 | 30.38 |
| 8 | 29.095 | 1.08 | — | — |
| 9 | −453.821 | 1.33 | 1.51680 | 64.20 |
| 10 | −5.389 | 8.21~9.80~12.36 | — | — |
| 11 | −35.792 | 1.20 | 1.52470 | 56.24 |
| 12 | 15.795 | 0.56~2.55~5.54 | — | — |
| 13 | ∞ | 0.64 | 1.54892 | 69.76 |
| 14 | ∞ | 0.64 | — | — |
| 15 | ∞ | 0.64 | 1.51680 | 64.20 |
| 16 | ∞ | — | — | — |

| aspherical coefficients | | |
| --- | --- | --- |
| 1st surface | 2nd surface | 5th surface |
| $A_4 = 7.82797 \times 10^{-4}$ | $A_4 = 1.90536 \times 10^{-4}$ | $A_4 = -7.06187 \times 10^{-4}$ |
| $A_6 = -7.18976 \times 10^{-5}$ | $A_6 = -8.43473 \times 10^{-5}$ | $A_6 = -3.16002 \times 10^{-5}$ |
| $A_8 = 3.22348 \times 10^{-6}$ | $A_8 = -6.10606 \times 10^{-7}$ | $A_8 = 8.55596 \times 10^{-7}$ |
| $A_{10} = -7.59471 \times 10^{-8}$ | $A_{10} = 1.61082 \times 10^{-7}$ | |
| $A_{12} = 7.77690 \times 10^{-10}$ | $A_{12} = -7.00566 \times 10^{-9}$ | |
| 6th surface | 11th surface | 12th surface |
| $A_4 = 8.56975 \times 10^{-4}$ | $A_4 = -9.01811 \times 10^{-3}$ | $A_4 = -1.03986 \times 10^{-2}$ |
| $A_6 = -3.37600 \times 10^{-5}$ | $A_6 = -8.70067 \times 10^{-4}$ | $A_6 = 2.39313 \times 10^{-4}$ |
| $A_8 = 1.82367 \times 10^{-6}$ | $A_8 = 2.47691 \times 10^{-4}$ | $A_8 = 2.38336 \times 10^{-5}$ |
| | $A_{10} = -2.99488 \times 10^{-5}$ | $A_{10} = -3.69932 \times 10^{-6}$ |
| | $A_{12} = 1.23503 \times 10^{-6}$ | $A_{12} = 1.31519 \times 10^{-7}$ |

Embodiment 13

Figure 20:
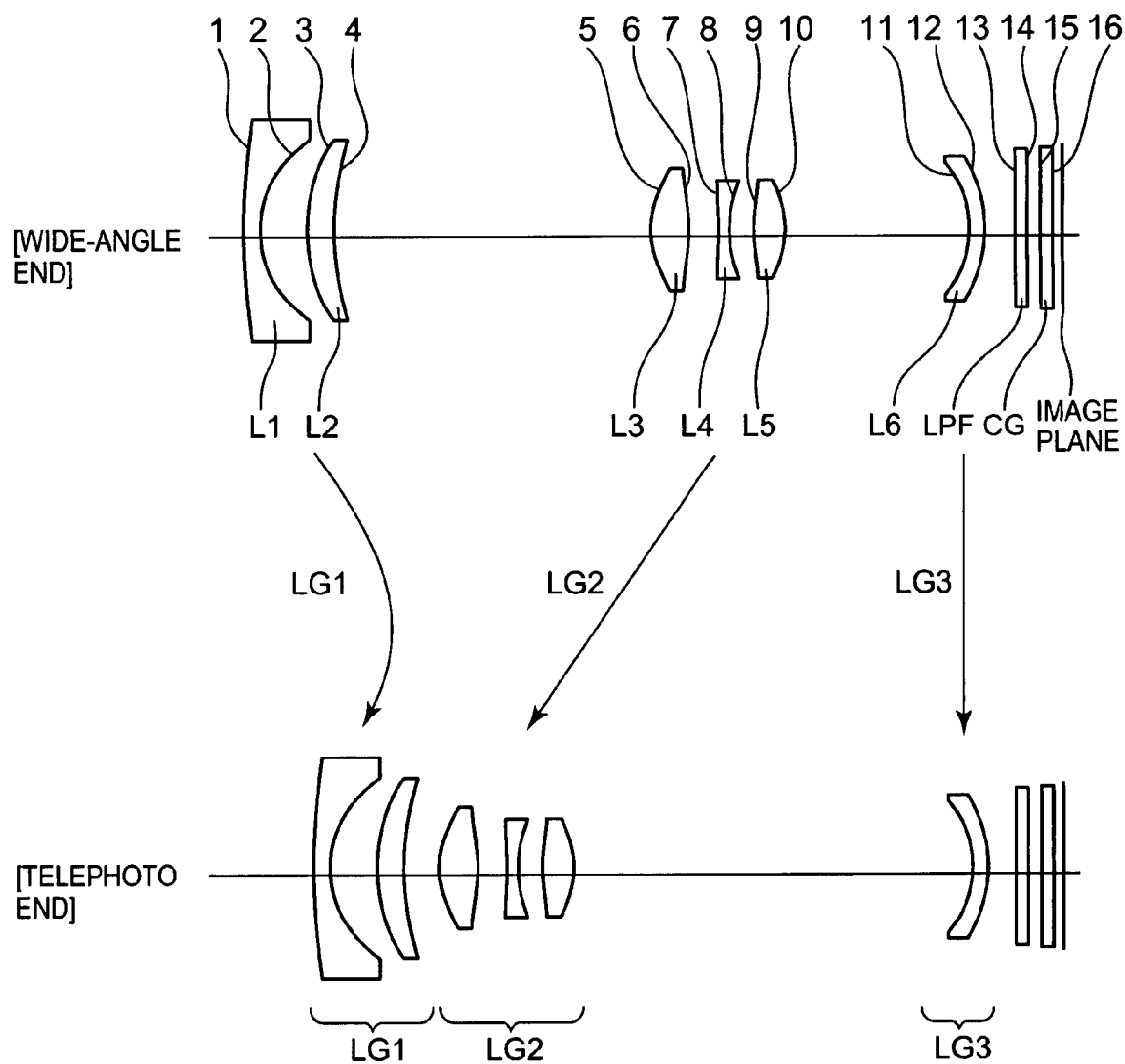
FIG. 20 is a diagram showing the configuration of lens elements of a 13th embodiment of a zoom lens of the invention.

A numerical example for a 13th embodiment of a zoom lens of the invention will be shown in Table 14. In addition, FIG. 20 is a diagram showing the configuration of lens elements of the zoom lens, and FIG. 30 is a diagram showing aberrations thereof.

TABLE 14

| | f = 6.42~10.86~18.28 | | | |
| | $F_{no}$ = 2.85~3.70~5.14 | | | |
| | 2ω = 72.86~45.18~27.14 | | | |
| Surface number | R | D | $N_d$ | $v_d$ |
| --- | --- | --- | --- | --- |
| 1 | 159.208 | 0.73 | 1.85049 | 40.21 |
| 2 | 5.404 | 2.33 | — | — |
| 3 | 9.711 | 1.43 | 1.92286 | 20.88 |
| 4 | 18.445 | 16.04~7.10~1.85 | — | — |
| 5 | 5.806 | 1.94 | 1.58313 | 59.46 |
| 6 | −15.871 | 1.45 | — | — |
| 7 | −53.573 | 0.60 | 2.08160 | 30.38 |
| 8 | 6.738 | 1.20 | — | — |
| 9 | 12.846 | 1.57 | 1.51823 | 58.96 |
| 10 | −6.398 | 9.33~13.41~20.27 | — | — |
| 11 | −6.102 | 0.85 | 1.80518 | 25.46 |
| 12 | −7.640 | 1.50~1.50~1.50 | — | — |

TABLE 14-continued

| | | | | |
|---|---|---|---|---|
| 13 | ∞ | 0.64 | 1.54892 | 69.76 |
| 14 | ∞ | 0.64 | — | — |
| 15 | ∞ | 0.64 | 1.51680 | 64.20 |
| 16 | ∞ | — | — | — |

| aspherical coefficients | | | |
|---|---|---|---|
| 1st surface | 2nd surface | 5th surface | 6th surface |
| $A_4 = 8.89468 \times 10^{-4}$ | $A_4 = 4.03454 \times 10^{-4}$ | $A_4 = -4.56250 \times 10^{-4}$ | $A_4 = 7.23928 \times 10^{-4}$ |
| $A_6 = -6.12117 \times 10^{-5}$ | $A_6 = -3.73667 \times 10^{-5}$ | $A_6 = 2.99762 \times 10^{-6}$ | $A_6 = -1.04112 \times 10^{-5}$ |
| $A_8 = 2.31844 \times 10^{-6}$ | $A_8 = -3.07454 \times 10^{-6}$ | $A_8 = -6.77079 \times 10^{-7}$ | $A_8 = 1.26609 \times 10^{-6}$ |
| $A_{10} = -4.45043 \times 10^{-8}$ | $A_{10} = 2.41761 \times 10^{-7}$ | $A_{10} = 6.20121 \times 10^{-8}$ | $A_{10} = -1.36888 \times 10^{-8}$ |
| $A_{12} = 3.31752 \times 10^{-10}$ | $A_{12} = -6.04020 \times 10^{-9}$ | | |

Embodiment 14

Figure 21:
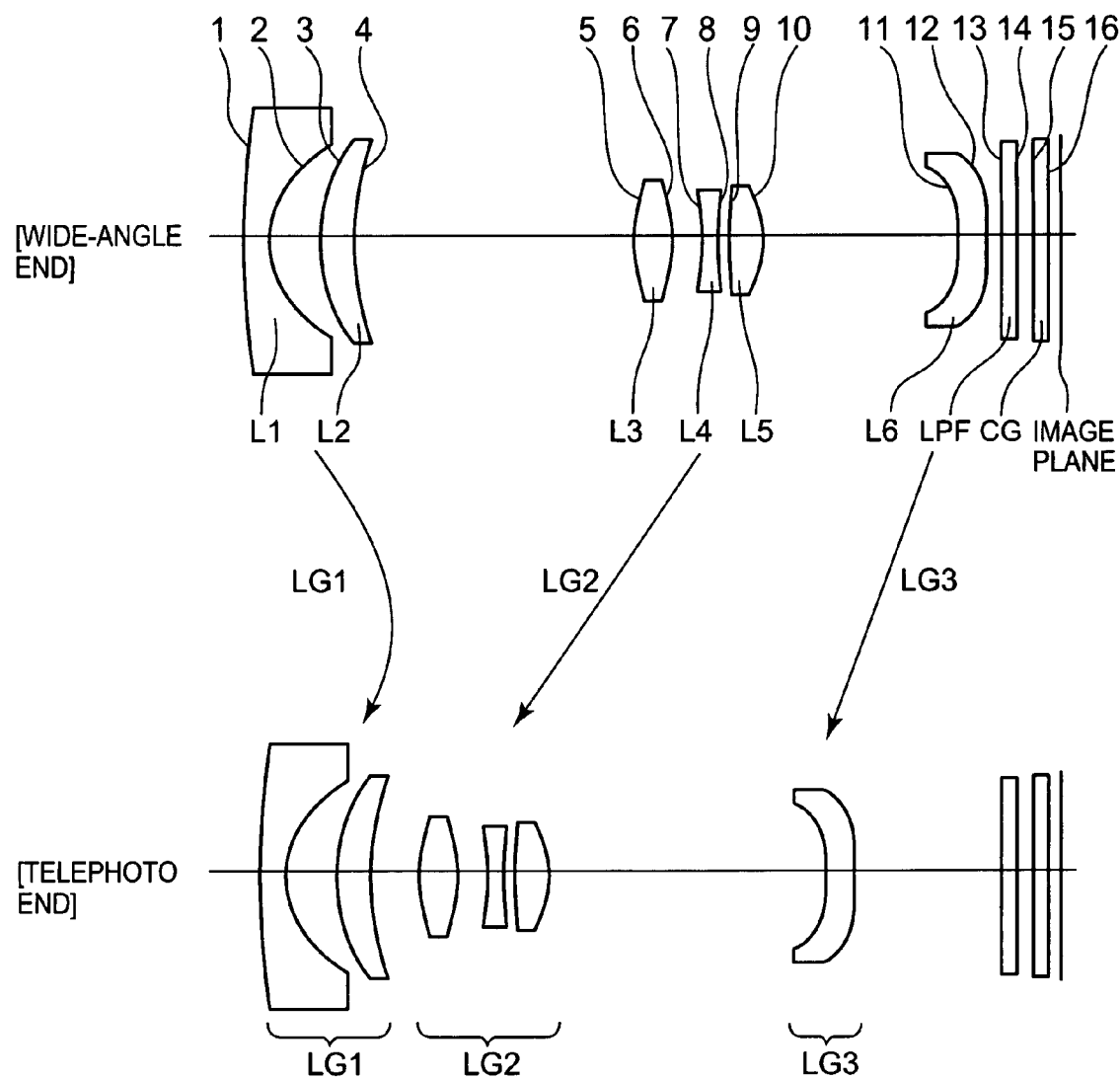
FIG. 21 is a diagram showing the configuration of lens elements of a 14th embodiment of a zoom lens of the invention.

A numerical example for a 14th embodiment of a zoom lens of the invention will be shown in Table 15. In addition, FIG. 21 is a diagram showing the configuration of lens elements of the zoom lens, and FIG. 31 is a diagram showing aberrations thereof.

TABLE 15 f = 5.74~16.31~16.31
$F_{no}$ = 2.85~3.80~5.40
2ω = 78.82~50.96~32.01

| Surface number | R | D | $N_d$ | $v_d$ |
|---|---|---|---|---|
| 1 | −200.000 | 1.00 | 1.80139 | 45.45 |
| 2 | 4.926 | 1.96 | — | — |
| 3 | 8.078 | 1.32 | 1.92286 | 20.88 |
| 4 | 13.252 | 11.12~5.28~1.85 | — | — |
| 5 | 6.802 | 1.54 | 1.59240 | 68.30 |
| 6 | −9.234 | 1.21 | — | — |
| 7 | −12.652 | 0.67 | 2.08160 | 30.38 |
| 8 | 18.850 | 0.45 | — | — |
| 9 | 32.351 | 1.30 | 1.51823 | 58.96 |
| 10 | −5.720 | 7.87~9.31~11.19 | — | — |
| 11 | −44.329 | 1.09 | 1.52470 | 56.24 |
| 12 | 19.649 | 0.55~2.50~5.96 | — | — |
| 13 | ∞ | 0.64 | 1.54892 | 69.76 |
| 14 | ∞ | 0.64 | — | — |
| 15 | ∞ | 0.64 | 1.51680 | 64.20 |
| 16 | ∞ | — | — | — |

TABLE 15-continued

| aspherical coefficients | | |
|---|---|---|
| 1st surface | 2nd surface | 5th surface |
| $A_4 = 1.63151 \times 10^{-3}$ | $A_4 = 1.26724 \times 10^{-3}$ | $A_4 = -7.13781 \times 10^{-4}$ |
| $A_6 = -1.00502 \times 10^{-4}$ | $A_6 = -6.61339 \times 10^{-5}$ | $A_6 = -6.17511 \times 10^{-6}$ |
| $A_8 = 3.37683 \times 10^{-6}$ | $A_8 = -5.52541 \times 10^{-6}$ | $A_8 = -8.38866 \times 10^{-7}$ |
| $A_{10} = -6.06524 \times 10^{-8}$ | $A_{10} = 4.08824 \times 10^{-7}$ | |
| $A_{12} = 4.67277 \times 10^{-10}$ | $A_{12} = -1.04791 \times 10^{-8}$ | |

| 6th surface | 11th surface | 12th surface |
|---|---|---|
| $A_4 = 7.31634 \times 10^{-4}$ | $A_4 = -1.00779 \times 10^{-2}$ | $A_4 = -1.11873 \times 10^{-2}$ |
| $A_6 = -1.08828 \times 10^{-5}$ | $A_6 = -8.46732 \times 10^{-4}$ | $A_6 = 3.39987 \times 10^{-4}$ |
| $A_8 = 1.86923 \times 10^{-8}$ | $A_8 = 2.95944 \times 10^{-4}$ | $A_8 = 2.60776 \times 10^{-5}$ |
| | $A_{10} = -4.01892 \times 10^{-5}$ | $A_{10} = -5.33907 \times 10^{-6}$ |
| | $A_{12} = 1.78577 \times 10^{-6}$ | $A_{12} = 2.14270 \times 10^{-7}$ |

Embodiment 15

Figure 22:
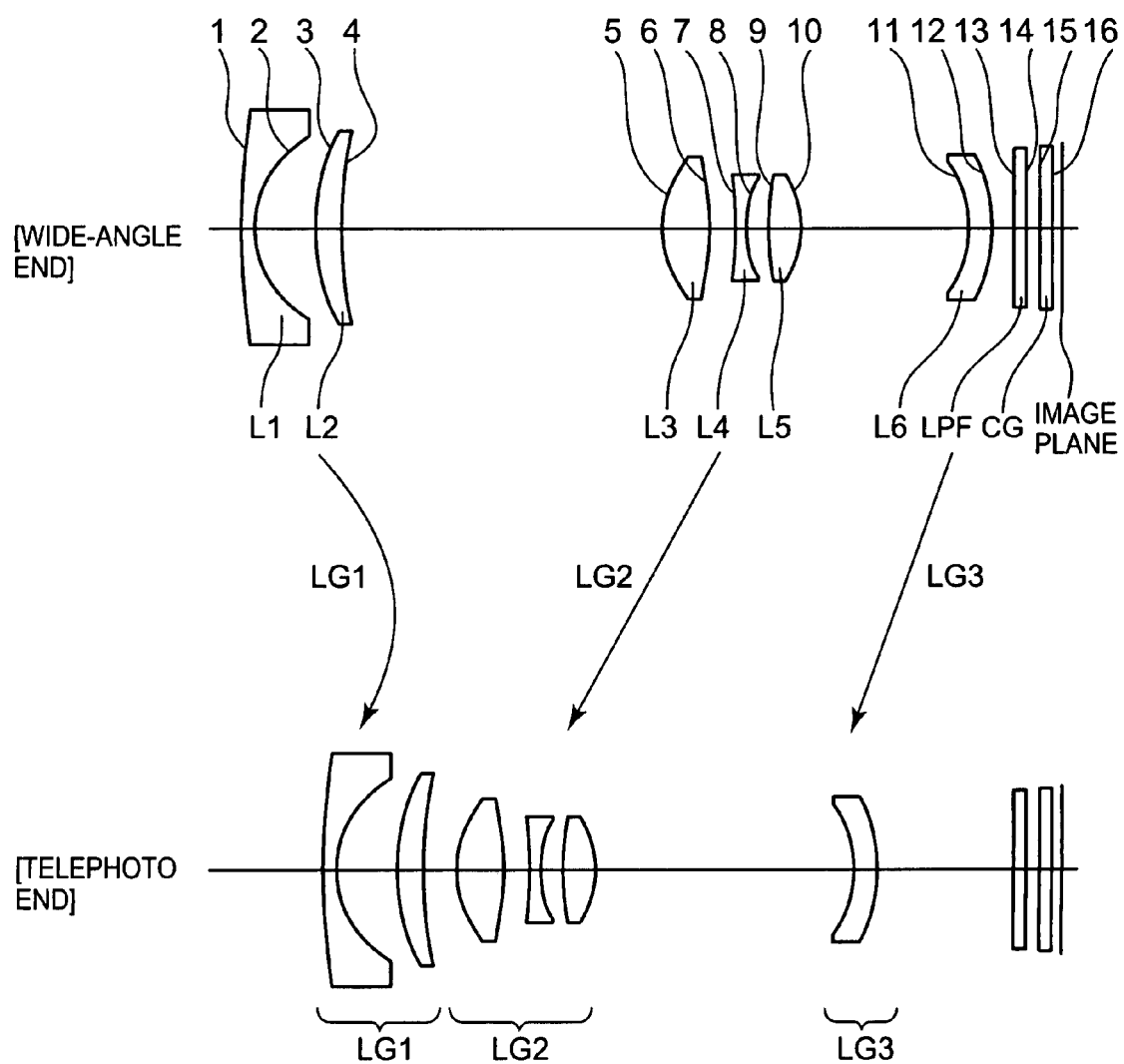
FIG. 22 is a diagram showing the configuration of lens elements of a 15th embodiment of a zoom lens of the invention.

A numerical example for a 15th embodiment of a zoom lens of the invention will be shown in Table 16. In addition, FIG. 22 is a diagram showing the configuration of lens elements of the zoom lens, and FIG. 32 is a diagram showing aberrations thereof.

TABLE 16 f = 6.47~10.93~18.45
$F_{no}$ = 2.50~3.26~4.64
2ω = 72.61~45.16~27.37

| Surface number | R | D | $N_d$ | $v_d$ |
|---|---|---|---|---|
| 1 | 75.147 | 0.72 | 1.85049 | 40.21 |
| 2 | 5.434 | 2.92 | — | — |
| 3 | 11.603 | 1.41 | 1.92286 | 20.88 |
| 4 | 25.413 | 16.24~6.70~1.66 | — | — |
| 5 | 5.668 | 2.44 | 1.63246 | 63.80 |
| 6 | −13.663 | 1.32 | — | — |
| 7 | −23.369 | 0.52 | 2.08160 | 30.38 |
| 8 | 6.542 | 1.11 | — | — |
| 9 | 13.880 | 1.67 | 1.51742 | 52.16 |
| 10 | −6.132 | 8.49~11.75~13.03 | — | — |
| 11 | −6.976 | 1.20 | 1.75211 | 25.05 |
| 12 | −8.992 | 1.04~1.61~7.00 | — | — |
| 13 | ∞ | 0.64 | 1.54892 | 69.76 |
| 14 | ∞ | 0.64 | — | — |
| 15 | ∞ | 0.64 | 1.51680 | 64.20 |
| 16 | ∞ | — | — | — |

TABLE 16-continued aspherical coefficients

| 1st surface | 2nd surface | 5th surface | 6th surface |
|---|---|---|---|
| $A_4 = 2.49405 \times 10^{-4}$ | $A_4 = -3.07168 \times 10^{-4}$ | $A_4 = -4.26336 \times 10^{-4}$ | $A_4 = 8.14466 \times 10^{-4}$ |
| $A_6 = -2.26540 \times 10^{-5}$ | $A_6 = -2.26485 \times 10^{-5}$ | $A_6 = -2.05869 \times 10^{-6}$ | $A_6 = -6.04587 \times 10^{-6}$ |
| $A_8 = 1.20574 \times 10^{-6}$ | $A_8 = -5.65463 \times 10^{-7}$ | $A_8 = -1.54057 \times 10^{-7}$ | $A_8 = 8.46598 \times 10^{-8}$ |
| $A_{10} = -3.04170 \times 10^{-8}$ | $A_{10} = 6.28150 \times 10^{-8}$ | | |
| $A_{12} = 2.88131 \times 10^{-10}$ | $A_{12} = -2.46064 \times 10^{-9}$ | | |

Embodiment 16

Figure 23:
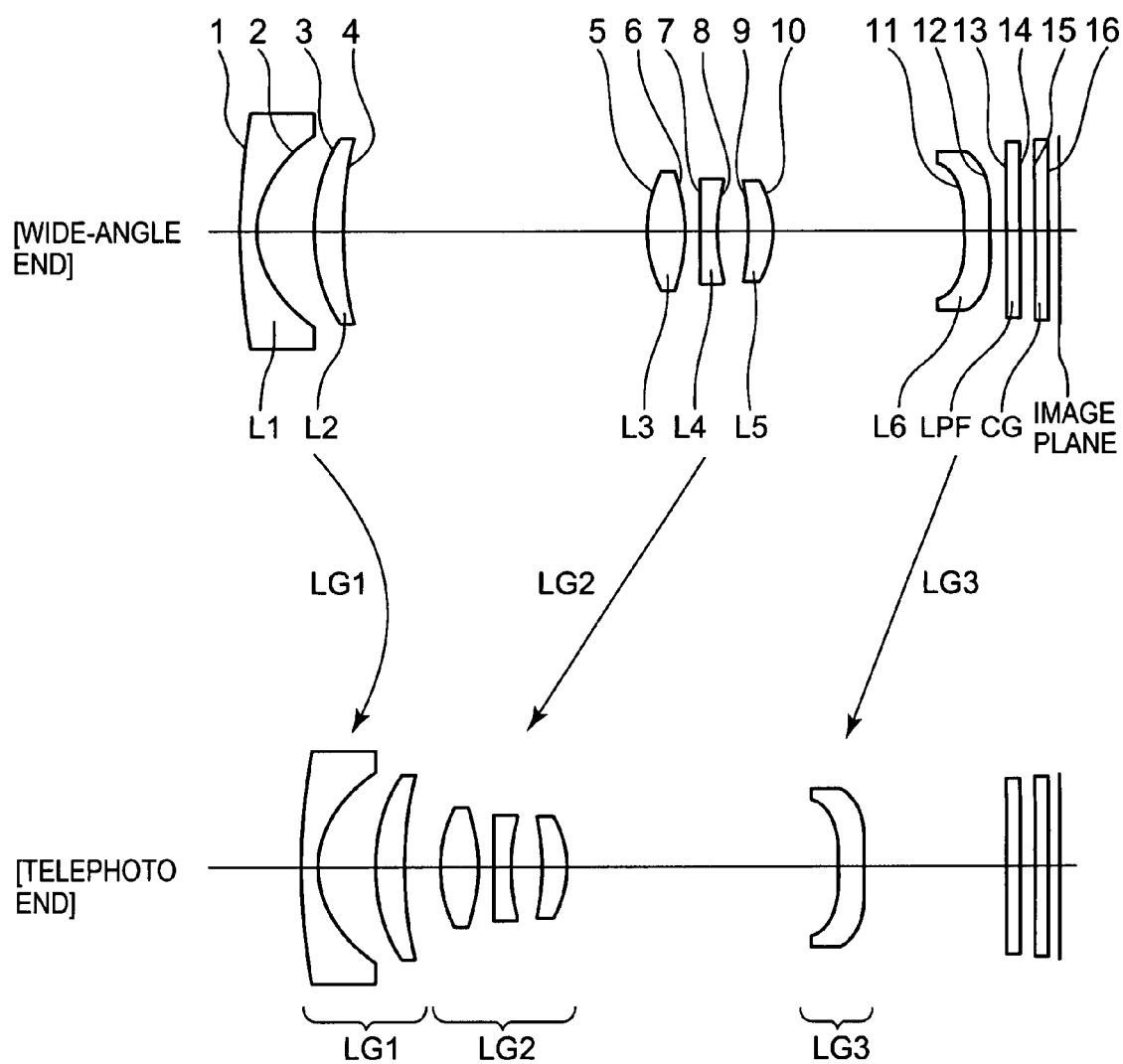
FIG. 23 is a diagram showing the configuration of lens elements of a 16th embodiment of a zoom lens of the invention.

A numerical example for a 16th embodiment of a zoom lens of the invention will be shown in Table 17. In addition, FIG. 23 is a diagram showing the configuration of lens elements of the zoom lens, and FIG. 33 is a diagram showing aberrations thereof.

TABLE 17

$f = 6.23~10.51~17.71$
$F_{no} = 2.85~3.73~5.23$
$2\omega = 74.34~47.13~29.06$

| Surface number | R | D | $N_d$ | $v_d$ |
|---|---|---|---|---|
| 1 | 73.866 | 0.77 | 1.80139 | 45.45 |
| 2 | 5.133 | 2.47 | — | — |
| 3 | 9.506 | 1.30 | 1.92286 | 20.88 |
| 4 | 16.473 | 13.88~6.21~1.78 | — | — |
| 5 | 7.179 | 1.62 | 1.59240 | 68.30 |
| 6 | -11.033 | 0.74 | — | — |
| 7 | -143.541 | 0.76 | 1.80518 | 25.46 |
| 8 | 10.556 | 1.42 | — | — |
| 9 | -14.646 | 1.06 | 1.48749 | 70.45 |
| 10 | -6.107 | 8.69~10.43~12.36 | — | — |
| 11 | -19.613 | 1.20 | 1.60717 | 29.00 |
| 12 | -100.844 | 0.69~2.57~6.50 | — | — |
| 13 | ∞ | 0.64 | 1.54892 | 69.76 |
| 14 | ∞ | 0.64 | — | — |
| 15 | ∞ | 0.64 | 1.51680 | 64.20 |
| 16 | ∞ | — | — | — | aspherical coefficients

| 1st surface | 2nd surface | 5th surface |
|---|---|---|
| $A_4 = 6.64606 \times 10^{-4}$ | $A_4 = 2.25478 \times 10^{-4}$ | $A_4 = -5.69565 \times 10^{-4}$ |
| $A_6 = -5.50200 \times 10^{-5}$ | $A_6 = -6.75473 \times 10^{-5}$ | $A_6 = 4.73935 \times 10^{-6}$ |
| $A_8 = 2.52946 \times 10^{-6}$ | $A_8 = 3.87724 \times 10^{-7}$ | $A_8 = -1.50191 \times 10^{-6}$ |
| $A_{10} = -5.92270 \times 10^{-8}$ | $A_{10} = 9.67723 \times 10^{-8}$ | |
| $A_{12} = 5.46475 \times 10^{-10}$ | $A_{12} = -4.84190 \times 10^{-9}$ | |

| 6th surface | 11th surface | 12th surface |
|---|---|---|
| $A_4 = 6.86601 \times 10^{-4}$ | $A_4 = -3.25760 \times 10^{-3}$ | $A_4 = -3.46189 \times 10^{-3}$ |
| $A_6 = -2.49386 \times 10^{-6}$ | $A_6 = -4.04336 \times 10^{-4}$ | $A_6 = -1.09018 \times 10^{-4}$ |
| $A_8 = -1.00973 \times 10^{-6}$ | $A_8 = 5.41499 \times 10^{-6}$ | $A_8 = 1.73862 \times 10^{-5}$ |
| | $A_{10} = -3.60383 \times 10^{-6}$ | $A_{10} = -1.08208 \times 10^{-6}$ |
| | $A_{12} = 4.51093 \times 10^{-8}$ | $A_{12} = 1.80298 \times 10^{-8}$ |

Embodiment 17

Figure 24:
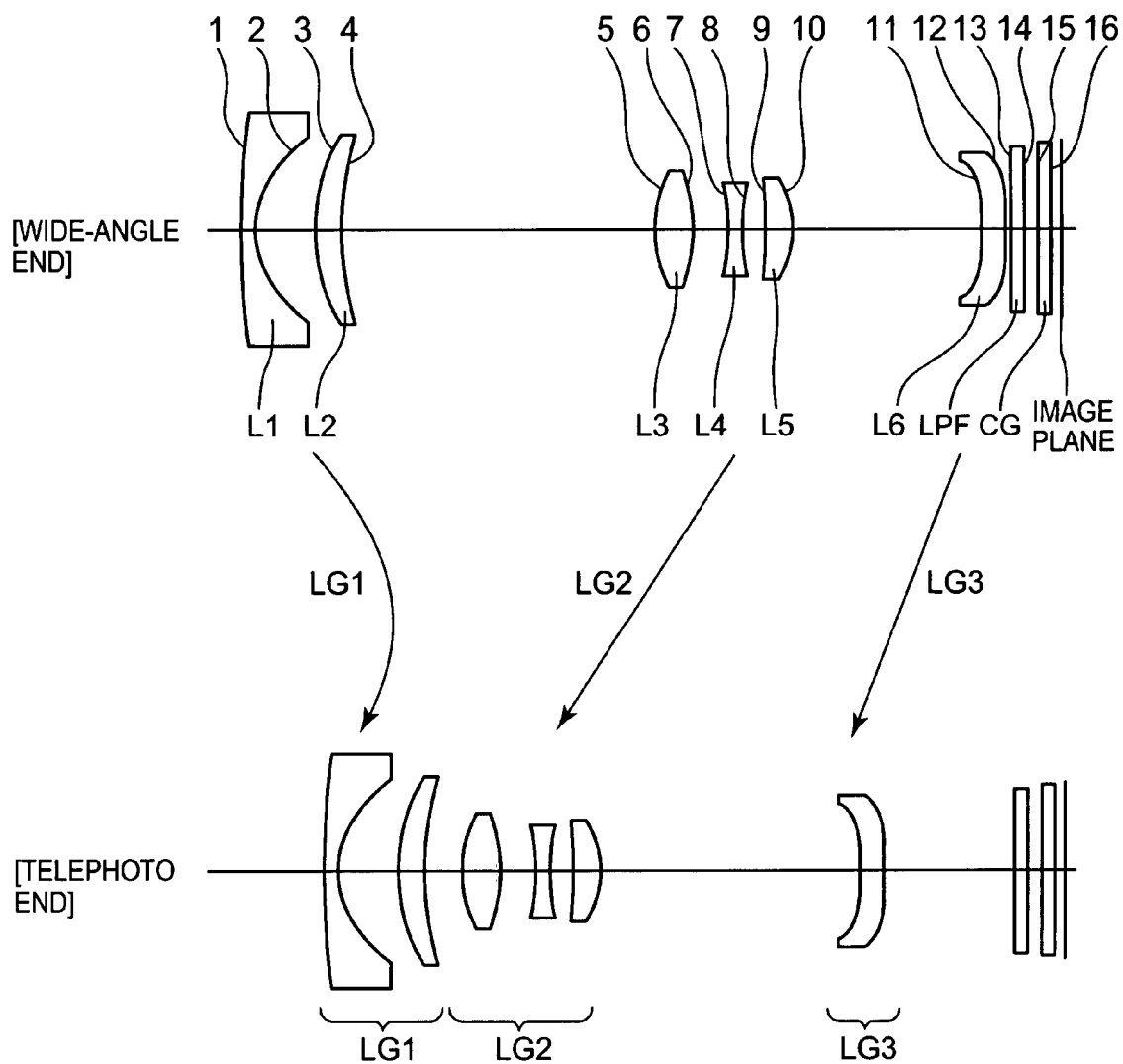
FIG. 24 is a diagram showing the configuration of lens elements of a 17th embodiment of a zoom lens of the invention.

A numerical example for a 17th embodiment of a zoom lens of the invention will be shown in Table 18. In addition, FIG. 24 is a diagram showing the configuration of lens elements of the zoom lens, and FIG. 34 is a diagram showing aberrations thereof.

TABLE 18

$f = 6.38~10.77~18.19$
$F_{no} = 2.85~3.77~5.31$
$2\omega = 73.76~46.29~28.34$

| Surface number | R | D | $N_d$ | $v_d$ |
|---|---|---|---|---|
| 1 | 50.191 | 0.72 | 1.80610 | 40.73 |
| 2 | 5.444 | 2.89 | — | — |
| 3 | 10.422 | 1.27 | 1.94595 | 17.98 |
| 4 | 16.946 | 15.34~6.92~1.85 | — | — |
| 5 | 7.040 | 1.81 | 1.52540 | 70.40 |
| 6 | -8.786 | 1.69 | — | — |
| 7 | -16.277 | 0.62 | 2.00330 | 28.27 |
| 8 | 14.256 | 1.22 | — | — |
| 9 | -148.022 | 1.28 | 1.51742 | 52.16 |
| 10 | -5.866 | 9.26~10.54~12.81 | — | — |
| 11 | -36.746 | 1.12 | 1.52470 | 56.24 |
| 12 | 42.022 | 0.37~2.82~6.50 | — | — |
| 13 | ∞ | 0.64 | 1.54892 | 69.76 |
| 14 | ∞ | 0.64 | — | — |
| 15 | ∞ | 0.64 | 1.51680 | 64.20 |
| 16 | ∞ | — | — | — | aspherical coefficients

| 1st surface | 2nd surface | 5th surface |
|---|---|---|
| $A_4 = 2.17189 \times 10^{-4}$ | $A_4 = -2.07586 \times 10^{-4}$ | $A_4 = -5.28573 \times 10^{-4}$ |
| $A_6 = -2.98032 \times 10^{-5}$ | $A_6 = -4.33996 \times 10^{-5}$ | $A_6 = -1.33398 \times 10^{-5}$ |
| $A_8 = 1.48353 \times 10^{-6}$ | $A_8 = 5.25203 \times 10^{-7}$ | $A_8 = 2.75910 \times 10^{-7}$ |
| $A_{10} = -3.40461 \times 10^{-8}$ | $A_{10} = 3.32246 \times 10^{-8}$ | |
| $A_{12} = 3.02907 \times 10^{-10}$ | $A_{12} = -1.94333 \times 10^{-9}$ | |

| 6th surface | 11th surface | 12th surface |
|---|---|---|
| $A_4 = 8.55888 \times 10^{-4}$ | $A_4 = -3.32411 \times 10^{-3}$ | $A_4 = -3.56302 \times 10^{-3}$ |
| $A_6 = -1.76624 \times 10^{-5}$ | $A_6 = -3.52006 \times 10^{-4}$ | $A_6 = -1.47838 \times 10^{-4}$ |
| $A_8 = 6.79592 \times 10^{-7}$ | $A_8 = 4.66226 \times 10^{-5}$ | $A_8 = 2.30901 \times 10^{-5}$ |
| | $A_{10} = -2.64394 \times 10^{-6}$ | $A_{10} = -1.23575 \times 10^{-6}$ |
| | $A_{12} = 3.32286 \times 10^{-8}$ | $A_{12} = 1.93601 \times 10^{-8}$ |

Next, with respect to Embodiments 8 to 17, values corresponding to the conditional expressions (13) to (24) will altogether be shown in Table 19.

TABLE 19

| | Embodiment 8 | Embodiment 9 | Embodiment 10 | Embodiment 11 | Embodiment 12 |
|---|---|---|---|---|---|
| Conditional expression (13) | -0.58 | -0.56 | -0.55 | -0.64 | -0.65 |
| Conditional expression (14) | -0.12 | -0.20 | -0.22 | -0.29 | -0.30 |

TABLE 19-continued

| | | | | | |
|---|---|---|---|---|---|
| Conditional expression (15) | 6.19 | 6.12 | 5.67 | 5.29 | 5.34 |
| Conditional expression (16) | −0.98 | −0.87 | −0.90 | −0.95 | −0.97 |
| Conditional expression (17) | 19.33 | 24.57 | 24.57 | 24.73 | 24.73 |
| Conditional expression (18) | 1.25 | 1.22 | 1.24 | 1.32 | 1.29 |
| Conditional expression (19) | 0.87 | 0.85 | 0.90 | 0.92 | 0.92 |
| Conditional expression (20) | 29.08 | 33.12 | 37.18 | 38.23 | 37.92 |
| Conditional expression (21) | 1.58 | 1.52 | 1.59 | 1.52 | 1.59 |
| Conditional expression (22) | 1.09 | 0.93 | 0.90 | 0.89 | 0.80 |
| Conditional expression (23) | −0.95 | −1.22 | −1.23 | −1.41 | −1.43 |
| Conditional expression (24) | −0.97 | −0.20 | −0.28 | −0.36 | −0.17 |

| | Embodiment 13 | Embodiment 14 | Embodiment 15 | Embodiment 16 | Embodiment 17 |
|---|---|---|---|---|---|
| Conditional expression (13) | −0.59 | −0.62 | −0.54 | −0.56 | −0.53 |
| Conditional expression (14) | −0.13 | −0.22 | −0.12 | −0.15 | −0.17 |
| Conditional expression (15) | 6.37 | 5.59 | 6.34 | 5.87 | 6.20 |
| Conditional expression (16) | −0.97 | −0.96 | −0.93 | −0.90 | −0.84 |
| Conditional expression (17) | 19.33 | 24.57 | 19.33 | 24.57 | 22.75 |
| Conditional expression (18) | 1.19 | 1.16 | 1.19 | 1.21 | 1.17 |
| Conditional expression (19) | 0.85 | 0.84 | 0.97 | 0.82 | 0.82 |
| Conditional expression (20) | 29.08 | 37.92 | 33.42 | 42.84 | 42.13 |
| Conditional expression (21) | 1.58 | 1.59 | 1.63 | 1.59 | 1.53 |
| Conditional expression (22) | 1.11 | 0.84 | 1.14 | 0.87 | 0.91 |
| Conditional expression (23) | −0.91 | −1.19 | −0.92 | −1.18 | −1.20 |
| Conditional expression (24) | −1.05 | −0.13 | −0.93 | −0.32 | −0.17 |

As is obvious from Table 19, the values for each embodiment from Embodiments 8 to 17 satisfy the conditional expressions (13) to (24), and as is obvious from the aberration diagrams of each embodiment, the individual aberrations are corrected properly.

In this way, by installing on a camera the zoom lens according to the these embodiments in which the six or seven lens elements are divided into the three lens elements groups as a photographic lens, a so-called card-type camera, thin in thickness or small in size, can be provided which can make the user feel less troublesome in carrying the camera irrespective of the optical zooming function being equipped thereon.

According to these embodiments, by configuring the zoom lens optical system having a zoom ratio of the order of 3× as three groups of lens elements by the use of six or seven lens elements and giving, sequentially from the object side, negative, positive and negative powers to each lens elements group, the overall length of the zoom lens in the direction of the optical axis thereof can be reduced when used, and by the symmetrical power distribution of the lens elements groups, the occurrence of off-axis aberrations such as distortion and astigmatism is basically reduced, whereby the degree of freedom of correction environment of the individual aberrations can be improved overall, so as to realize the zoom lens which is compact and which holds the high performance, thereby making it possible to provide the compact zoom lens and a camera with the zoom lens.

What is claimed is:

1. A zoom lens comprising, sequentially from an object side thereof, a first lens elements group, a second lens elements group and a third lens element group, wherein the first lens elements group having a negative refraction power as a whole and being made up by disposing a first lens element which is a lens having a negative refraction power (hereinafter, referred to as a negative lens) and a second lens element which is a lens having a positive refraction power (hereinafter, referred to as a positive lens) and which constitutes a meniscus lens which is convex on an object side surface thereof, the second lens elements group having a positive refraction power as a whole and being made up by disposing a third lens element which is a positive lens, a fourth lens element which is a positive lens, a fifth lens element which is a negative lens and which constitutes a meniscus lens which is convex on an object side surface thereof and a sixth lens element which is a positive lens, and the third lens element group having a negative refraction power as a whole and being made up by disposing a seventh lens element which is a negative lens and which constitutes a meniscus lens which is convex on an image side surface thereof, wherein a variable power is realized by shifting the positions of the first lens elements group and the second lens elements group in a direction of an optical axis thereof, or so shifting, in addition to the first lens elements group and the second lens elements group, the position of the third lens element group, and wherein the zoom lens satisfies the following conditional expression (1) with respect to the power that the first lens elements group possesses, the following conditional expression (2) with respect to the power that the third lens element group possesses, and the following conditional expression (3) with respect to the size of a whole lens system $$-0.7 < f_w/f_I < -0.30 \quad (1)$$

$$-0.5 < f_w/f_{III} < 0 \quad (2)$$

$$5.5 < TL_w/f_w < 7.0 \quad (3)$$

where,
- $f_w$: composite focal length of the whole lens system at a wide-angle end
- $f_I$: composite focal length of the first lens elements group
- $f_{III}$: composite focal length of the third lens element group
- $TL_w$: distance from an object side surface of the first lens element making up the first lens elements group to an image plane at the wide-angle end (where, a parallel plane glass portion is converted into an air space distance).

2. The zoom lens according to claim 1, wherein at least one of an object side and image side surfaces of the first lens element which makes up the first lens elements group is an aspherical surface, and wherein the zoom lens satisfies the following conditional expression (4) with respect to the power of the same lens element, the following conditional expression (5) with respect to chromatic dispersion properties that are distributed to each lens element of the first lens elements group, and the following conditional expression (6) with respect to the configuration of the object side surface of the first lens element $$-1.2 < f_w/f_1 < -0.5 \quad (4)$$

$$12 < v_1 - v_2 \quad (5)$$

$$0.7 < f_w/R_2 < 1.6 \quad (6)$$

where,
- $f_1$: focal length of the first lens element which makes up the first lens elements group
- $v_1$: Abbe number of the first lens element which makes up the first lens elements group
- $v_2$: Abbe number of the second lens element which makes up the first lens elements group
- $R_2$: paraxial radius of curvature of the object side surface of the first lens element which makes up the first lens elements group.

3. The zoom lens according to claim 1, satisfying the following conditional expression (7) with respect to the positive composite power that the third lens element and the fourth lens element which make up the second lens elements group possess, the following conditional expression (8) with respect to the chromatic dispersion properties that are distributed to each lens element of the second lens elements group, the following conditional expression (9) with respect to a relationship between refractive indexes that the third lens element and the fourth lens element possess, the following conditional expression (10) with respect to the configuration of an object side surface of the third lens element, and the following conditional expression (11) with respect to the configuration of an image side surface of the fifth lens element $$0.6 < f_w/f_{3,4} < 1.2 \quad (7)$$

$$30 < v_3 + v_4/2 - v_5 \quad (8)$$

$$n_3 + n_4/2 < 1.6 \quad (9)$$

$$0.4 < f_w/R_5 < 1.2 \quad (10)$$

$$0.8 < f_w/R_{10} < 2.5 \quad (11)$$

where,
- $f_{3,4}$: composite focal length of the third lens element and the fourth lens element which make up the second lens elements group
- $v_3$: Abbe number of the third lens element which makes up the second lens elements group
- $v_4$: Abbe number of the fourth lens element which makes up the second lens elements group
- $v_5$: Abbe number of the fifth lens element which makes up the second lens elements group
  (where, in the event that the fifth lens element makes up a compound lens, Abbe number of a glass material of a base lens element, and the resin portion is not taken into consideration)
- $n_3$: refractive index relative to the d line of the third lens element which makes up the second lens elements group
- $n_4$: refractive index relative to the d line of the fourth lens element which makes up the second lens elements group
- $R_5$: paraxial radius of curvature of the object side surface of the third lens element which makes up the second lens elements group
- $R_{10}$: paraxial radius of curvature of the image side surface of the fifth lens element which makes up the second lens elements group
  (where, in the event that the fifth lens element makes up a compound lens, paraxial radius of curvature of the surface of those of the base lens element and the resin portion which is closest to the image side).

4. The zoom lens according to claim 1, satisfying the following conditional expression (12) with respect to the configuration of an object side surface of the seventh lens element which makes up the third lens element group $$-1.2 < f_w/R_{13} < -0.25 \quad (12)$$

where,
- $R_{13}$: paraxial radius of curvature of the object side surface of the seventh lens element which makes up the third lens element group.

5. A camera which installs thereon the zoom lens according to claim 1.

6. A camera which installs thereon the zoom lens according to claim 2.

7. A camera which installs thereon the zoom lens according to claim 3.

8. A camera which installs thereon the zoom lens according to claim 4.

9. A zoom lens comprising, sequentially from an object side thereof, a first lens elements group, a second lens elements group and a third lens element group, wherein the first lens elements group having a negative refraction power as a whole and being made up by disposing a first lens element which is a lens having a negative refraction power (hereinafter, referred to as a negative lens) and a second lens element which is a lens having a positive refraction power (hereinafter, referred to as a positive lens) and which constitutes a meniscus lens which is convex on an object side surface thereof, the second lens elements group having a positive refraction power as a whole and being made up by disposing a third lens element which is a positive lens, a fourth lens element which is a negative lens and a fifth lens element which is a positive lens, and the third lens element group having a negative refraction power as a whole and being made up by disposing a sixth lens element which is a negative lens, and wherein a variable power is realized by shifting the positions of the first lens elements group and the second lens elements group in a direction of an optical axis thereof, or so shifting, in addition to the first lens elements group and the second lens elements group, the position of the third lens element group, and the zoom lens satisfies the following conditional expression (13) with respect to the power that the first lens elements group possesses, the following conditional expression (14) with respect to the power that the third lens element group possesses, and the following conditional expression (15) with respect to the size of a whole lens system $$-0.8 < f_w/f_I < -0.4 \quad (13)$$

$$-0.4 < f_w/f_{III} < 0 \quad (14)$$

$$4.5 < TL_w/f_w < 7.5 \quad (15)$$

where,
- $f_w$: composite focal length of the whole lens system at a wide-angle end
- $f_I$: composite focal length of the first lens elements group
- $f_{III}$: composite focal length of the third lens element group
- $TL_w$: distance from an object side surface of the first lens element making up the first lens elements group to an image plane at the wide-angle end (where, a parallel plane glass portion is converted into an air space distance).

10. The zoom lens according to claim 9, wherein at least one of the object side and image side surfaces of the first lens element which makes up the first lens elements group is an aspherical surface, and wherein the embodiment satisfies the following conditional expression (16) with respect to the power of the same lens element, the following conditional expression (17) with respect to the chromatic dispersion properties that are distributed to each lens element of the first lens elements group, and the following conditional expression (18) with respect to the configuration of an object side surface of the first lens element $$-1.2 < f_w/f_1 < -0.7 \qquad (16)$$

$$15 < \upsilon_1 - \upsilon_2 \qquad (17)$$

$$0.7 < f_w/R_2 < 1.2 \qquad (18)$$

where,
- $f_1$: focal length of the first lens element which makes up the first lens elements group
- $\upsilon_1$: Abbe number of the first lens element which makes up the first lens elements group
- $\upsilon_2$: Abbe number of the second lens element which makes up the first lens elements group
- $R_2$: paraxial radius of curvature of the object side surface of the first lens element which makes up the first lens elements group.

11. The zoom lens according to claim 9, satisfying the following conditional expression (19) with respect to the power that the third lens element which makes up the second lens elements group possesses, the following conditional expression (20) with respect to the chromatic dispersion properties that are distributed to each lens element of the second lens elements group, the following conditional expression (21) with respect to the relationship with the refractive index that the third lens element possesses, the following conditional expression (22) with respect to the configuration of an object side surface of the third lens element, and the following conditional expression (23) with respect to a relationship between the configuration of the object side surface of the third lens element and the configuration of the image side surface of the fifth lens element $$0.7 < f_w/f_3 < 1.2 \qquad (19)$$

$$25 < \upsilon_3 - \upsilon_4 \qquad (20)$$

$$n_3 < 1.7 \qquad (21)$$

$$0.7 < f_w/R_5 < 1.3 \qquad (22)$$

$$-1.6 < R_5/R_{10} < -0.8 \qquad (23)$$

where,
- $f_3$: composite focal length of the third lens element and the fourth lens element which make up the second lens elements group
- $\upsilon_3$: Abbe number of the third lens element which makes up the second lens elements group
- $\upsilon_4$: Abbe number of the fourth lens element which makes up the second lens elements group
- $n_3$: refractive index relative to the d line of the third lens element which makes up the second lens elements group
- $R_5$: paraxial radius of curvature of the object side surface of the third lens element which makes up the second lens elements group
- $R_{10}$: paraxial radius of curvature of the image side surface of the fifth lens element which makes up the second lens elements group.

12. The zoom lens according to claim 9, satisfying the following conditional expression (24) with respect to the configuration of an object side surface of the sixth lens element which makes up the third lens element group.

$$-1.5 < f_w/R_{11} < 0 \qquad (24)$$

where,
- $R_{11}$: paraxial radius of curvature of the object side surface of the sixth lens element which makes up the third lens element group.

13. A camera which installs thereon the zoom lens according to claim 9.

14. A camera which installs thereon the zoom lens according to claim 10.

15. A camera which installs thereon the zoom lens according to claim 11.

16. A camera which installs thereon the zoom lens according to claim 12.

* * * * *